US012681405B2

(12) United States Patent
Tateishi et al.

(10) Patent No.: US 12,681,405 B2
(45) Date of Patent: Jul. 14, 2026

(54) IMAGE FORMING APPARATUS

(71) Applicant: CANON KABUSHIKI KAISHA, Tokyo (JP)

(72) Inventors: Tomoya Tateishi, Kanagawa (JP); Shuma Hiasa, Kanagawa (JP); Jumpei Nitta, Kanagawa (JP); Takeo Kawanami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/969,018

(22) Filed: Dec. 4, 2024

(65) Prior Publication Data

US 2025/0199431 A1 Jun. 19, 2025

(30) Foreign Application Priority Data

Dec. 19, 2023 (JP) ................................ 2023-214293

(51) Int. Cl.
*G03G 15/08* (2006.01)
*G03G 15/00* (2006.01)
*G03G 15/01* (2006.01)

(52) U.S. Cl.
CPC ..... *G03G 15/0121* (2013.01); *G03G 15/0147* (2013.01); *G03G 15/0865* (2013.01); *G03G 15/50* (2013.01)

(58) Field of Classification Search
CPC ........... G03G 15/0121; G03G 15/0865; G03G 15/0875; G03G 15/0896; G03G 2215/066; G03G 2215/068
See application file for complete search history.

(56) References Cited

U.S. PATENT DOCUMENTS

2003/0031474 A1* 2/2003 Phillips .............. G03G 15/0865 399/27
2016/0169290 A1 6/2016 Matsumoto et al.
2017/0089400 A1 3/2017 Matsumoto et al.
2018/0113412 A1 4/2018 Koyama et al.
(Continued)

FOREIGN PATENT DOCUMENTS

JP 03136085 A * 6/1991
JP H04-159564 6/1992
(Continued)

OTHER PUBLICATIONS

JP 03136085 English machine translation, Shoji et al., Jun. 10, 91 (Year: 1991).*
(Continued)

*Primary Examiner* — Thomas S Giampaolo, II
(74) *Attorney, Agent, or Firm* — Venable LLP

(57) ABSTRACT

An image forming apparatus includes an apparatus body, a support member to which a cartridge is detachably attached and which is movable, a detection portion configured to output a signal and configured such that the signal changes in a case where the support member on which the cartridge is supported is moved from the second position toward the first position, a drive source configured to move the support member, and a controller configured to, in a case where the support member at the second position and not being moved by the drive source is moved toward the first position and the signal changes, cause the drive source to move the support member toward the first position.

12 Claims, 36 Drawing Sheets

(56) References Cited

U.S. PATENT DOCUMENTS

| | | | |
|---|---|---|---|
| 2020/0262664 | A1 | 8/2020 | Hayashi et al. |
| 2020/0264554 | A1 | 8/2020 | Sawashima et al. |
| 2023/0053404 | A1 | 2/2023 | Hayashi et al. |
| 2023/0418224 | A1 | 12/2023 | Miyashita et al. |
| 2025/0053135 | A1 | 2/2025 | Miyashita et al. |

FOREIGN PATENT DOCUMENTS

| | | |
|---|---|---|
| JP | 2003-217216 | 7/2003 |
| JP | 2007-183305 | 7/2007 |
| JP | 2008-096852 | 4/2008 |
| JP | 2016-157139 | 9/2016 |

OTHER PUBLICATIONS

U.S. Appl. No. 18/969,052, filed Dec. 4, 2024.
U.S. Appl. No. 18/970,374, filed Dec. 5, 2024.

* cited by examiner

IMAGE FORMING APPARATUS

BACKGROUND OF THE INVENTION

Field of the Invention

The present invention relates to an image forming apparatus that forms an image on a recording medium.

Description of the Related Art

In an image forming apparatus of an electrophotographic system, a rotary developing system that forms a color image by rotating a rotary including a plurality of developing members is known. Japanese Patent Application Laid-Open No. 2007-183305 and Japanese Patent Application Laid-Open No. 2008-096852 each disclose an image forming apparatus including a rotary including a plurality of developing rollers, and a plurality of toner cartridges (toner storage containers) each attachable to and detachable from the rotary.

SUMMARY OF THE INVENTION

The present disclosure provides a new form of an image forming apparatus that advances conventional technology.

According to an aspect of the present disclosure, an image forming apparatus includes an apparatus body, a support member to which a cartridge is detachably attached and which is movable to a first position in which the cartridge is positioned inside the apparatus body and a second position in which the cartridge is positioned outside the apparatus body, a detection portion configured to output a signal and configured such that the signal changes in a case where the support member on which the cartridge is supported is moved from the second position toward the first position, a drive source configured to move the support member, and a controller configured to, in a case where the support member at the second position and not being moved by the drive source is moved toward the first position and the signal changes, cause the drive source to move the support member toward the first position.

According to another aspect of the present disclosure, an image forming apparatus includes an apparatus body, a support member to which a cartridge is detachably attached and which is movable to a first position in which the cartridge is positioned inside the apparatus body and a second position in which the cartridge is positioned outside the apparatus body, a detection portion configured to output a signal and configured such that the signal changes in a case where the support member on which the cartridge is supported has received a force in a direction from the second position toward the first position, a drive source configured to move the support member, and a controller configured to, in a case where the support member at the second position and not being moved by the drive source has received the force in the direction from the second position toward the first position and the signal changes, cause the drive source to move the support member toward the first position.

Further features of the present invention will become apparent from the following description of exemplary embodiments with reference to the attached drawings.

DESCRIPTION OF THE EMBODIMENTS

Embodiments of the present disclosure will be described below with reference to drawings.

First Embodiment

An image forming apparatus 1 according to a first embodiment will be described with reference to FIGS. 1 to 12B. In the description below and each drawing, the vertical direction in the case where the image forming apparatus 1 is disposed on a horizontal surface will be referred to as a Z direction. A direction that intersects with the Z direction and that is the direction of a rotational axis 90C of a rotary body 90 (rotational axis direction of a rotary) that will be described later will be referred to as a Y direction. A direction intersecting with both the Z direction and the Y direction will be referred to as an X direction. The X direction and the Y direction are preferably horizontal directions. In addition, the X direction, the Y direction, and the Z direction are preferably orthogonal to each other. In addition, the sides pointed by arrows X, Y, and Z illustrated in each diagram will be respectively referred to as +X, +Y, and +Z sides, and sides opposite thereto will be respectively referred to as −X, −Y, and −Z sides.

Overall Configuration of Image Forming Apparatus

First, an overall configuration of the image forming apparatus 1 will be described. The image forming apparatus 1 is a laser beam printer that forms an image on a sheet S by using an electrophotographic method. Specifically, the image forming apparatus 1 is a color laser beam printer including four developing units 50*y*, 50*m*, 50*c*, and 50*k*. As the sheet S serving as a recording material (recording medium), various sheet materials of different sizes and different materials can be used. Examples of the various sheet materials include paper sheets such as plain paper sheets and cardboards, plastic films, cloths, surface-treated sheet materials such as coated paper sheets, and sheet materials of irregular shapes such as envelopes and index paper sheets.

Figure 1:
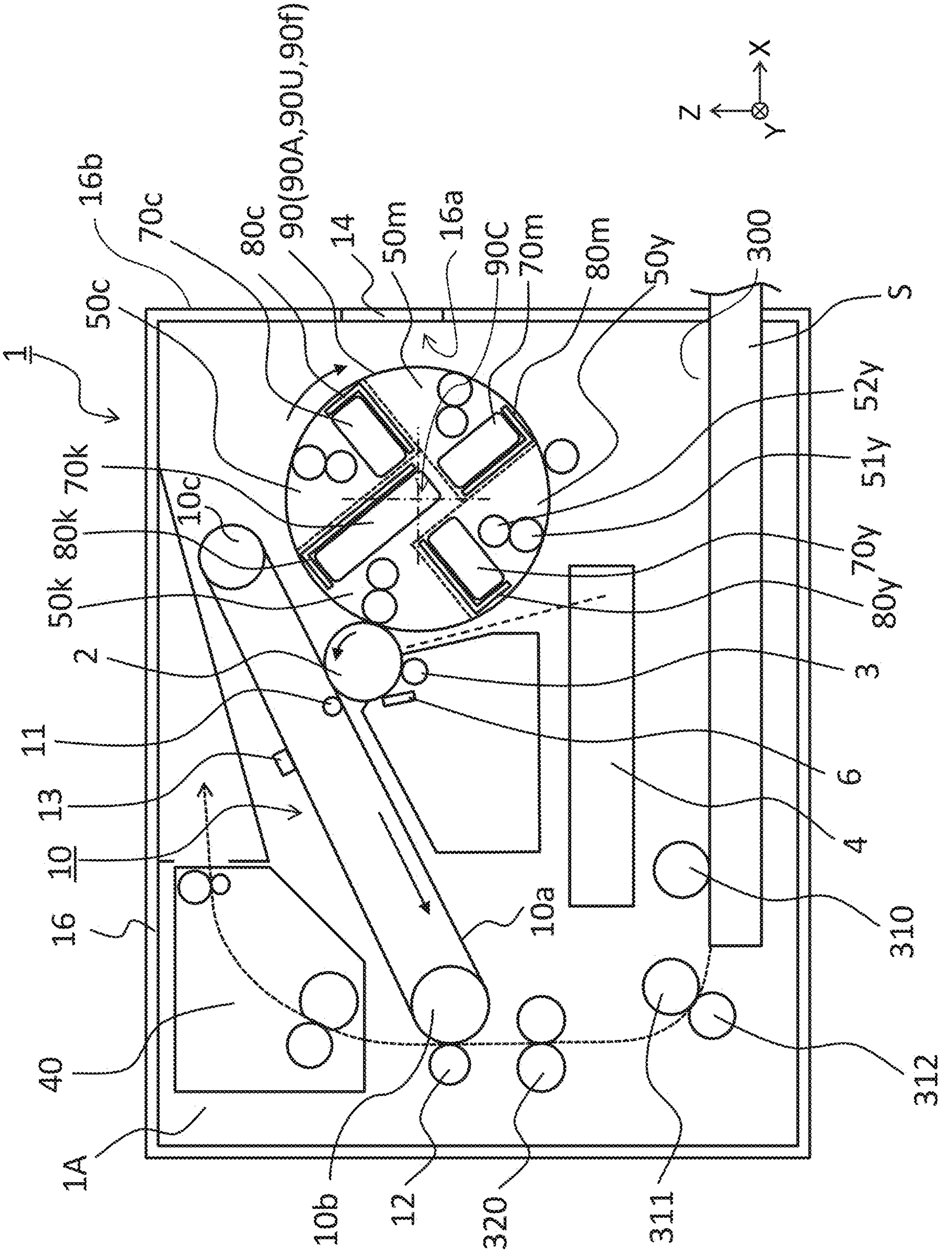
FIG. 1 is a schematic view of an image forming apparatus according to a first embodiment.
Figure 2:
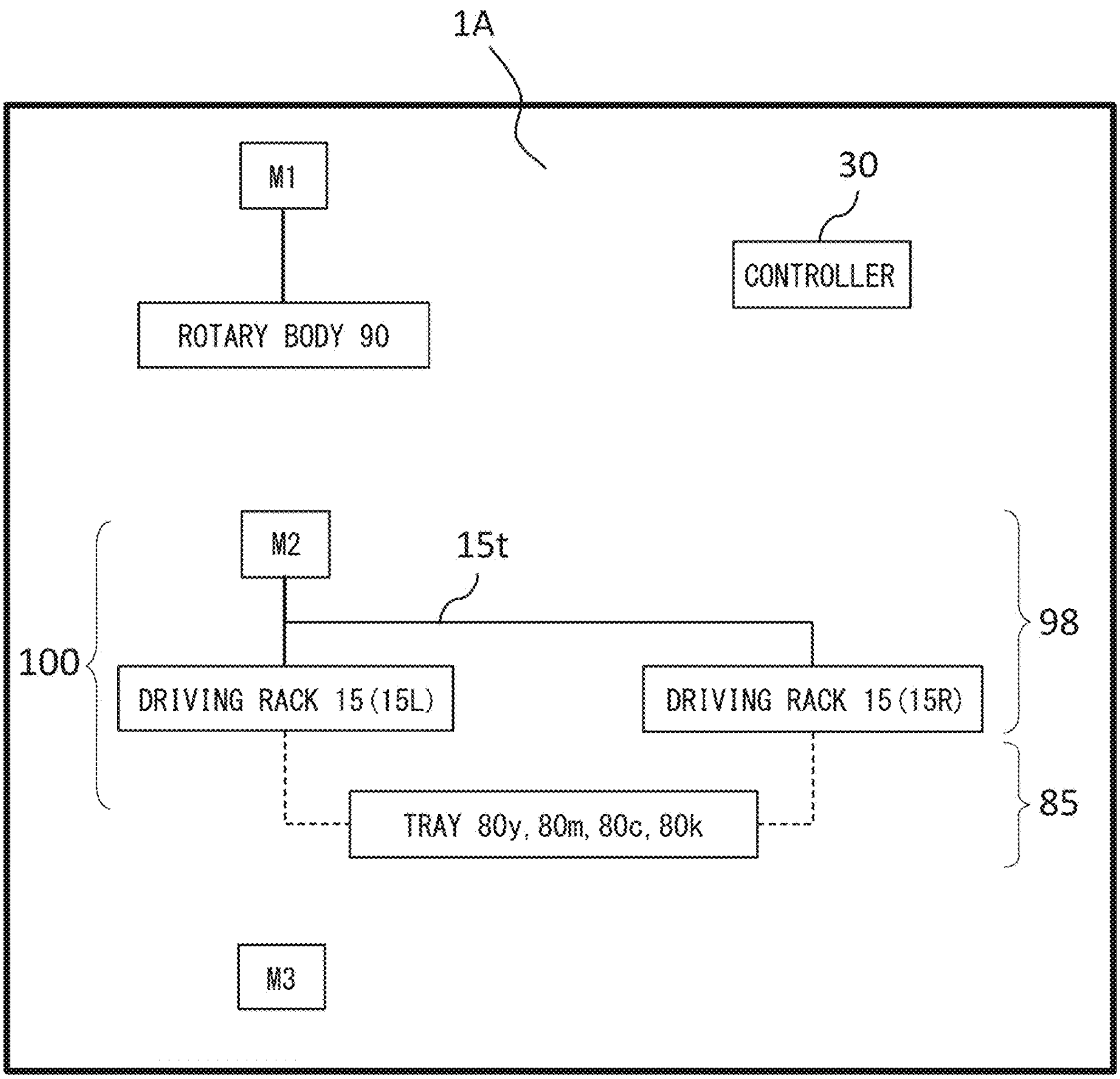
FIG. 2 is a configuration diagram of the image forming apparatus according to the first embodiment.
Figure 3:
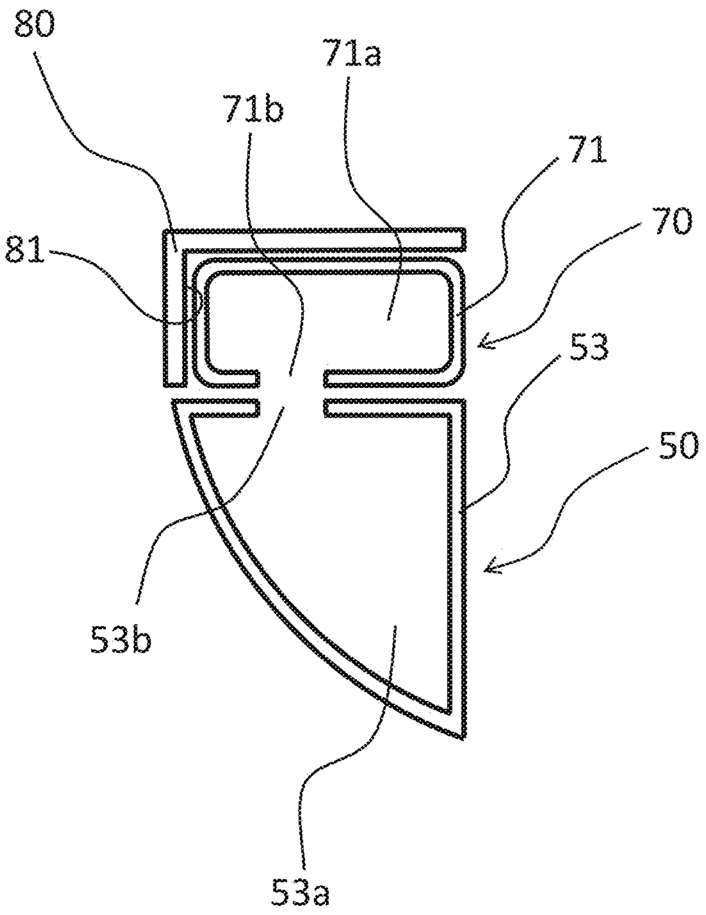
FIG. 3 is a schematic view of a developing unit, a toner cartridge, and a tray according to the first embodiment.

A schematic configuration of the image forming apparatus 1 and an image forming operation will be described with reference to FIGS. 1, 2, and 3. FIG. 1 is a schematic diagram illustrating a sectional configuration of the image forming apparatus 1. FIG. 2 is a diagram for describing drive sources of the image forming apparatus 1. FIG. 3 is a concept diagram illustrating elements for supplying toner from a toner cartridge 70 to a developing unit 50.

As illustrated in FIG. 1, the image forming apparatus 1 includes an image forming apparatus main body (hereinafter referred to as an apparatus body 1A), and toner cartridges 70*y*, 70*m*, 70*c*, and 70*k* that are attachable to and detachable from the apparatus body 1A. The apparatus body 1A of the present embodiment is a part of the image forming apparatus 1 excluding the toner cartridges 70*y*, 70*m*, 70*c*, and 70*k*.

The apparatus body 1A of the image forming apparatus 1 includes a photosensitive member 2 for use in an electrophotographic system. The photosensitive member has a drum shape (cylindrical shape) and is hereinafter referred to as a photosensitive drum 2. The photosensitive member 2 serves as an image bearing member that bears an electrostatic latent image. A charging roller 3, a scanner 4 serving as an exposing device, and a cleaning unit 6 are disposed around the photosensitive drum 2.

The charging roller 3 is an example of a charging means or a charging unit for uniformly charging the photosensitive drum 2. The scanner 4 is an example of an exposing means or an exposing unit that exposes the photosensitive drum 2 by irradiating the photosensitive drum 2 with laser light in accordance with image information. By irradiating the photosensitive drum 2 with the laser light after charging, an electrostatic latent image is formed on each surface of the photosensitive drum 2. The cleaning unit 6 is an example of a cleaning means or a cleaning portion that removes toner remaining on the surface of the photosensitive drum 2.

Further, the apparatus body 1A includes a sheet storage portion 300, a pickup roller 310, a feed roller 311, a separation roller 312, a conveyance roller pair 320, a secondary transfer roller 12, a fixing device 40, and an intermediate transfer unit 10. The pickup roller 310 is an example of a feeding means or a feeding unit that feeds the sheet S. The feed roller 311 and the separation roller 312 are an example of a separation conveyance unit that conveys sheets S while separating the sheets S from each other by frictional force. The secondary transfer roller 12 is an example of a transfer means or a transfer unit that transfers an image from an intermediate transfer belt 10*a* onto the sheet S.

The intermediate transfer unit 10 includes an intermediate transfer belt 10*a*, a belt driving roller 10*b*, a tension roller 10*c*, a cleaning device 13, and a primary transfer roller 11. The intermediate transfer belt 10*a* is an example of an intermediate transfer member that bears an image transferred from the photosensitive drum 2 through primary transfer and conveys the image so as to transfer the image onto the sheet S through secondary transfer. The intermediate transfer belt 10*a* is stretched over the belt driving roller 10*b* and the tension roller 10*c*. The belt driving roller 10*b* is a driving member that is rotationally driven by a drive source to convey the intermediate transfer belt 10*a*.

In addition, the apparatus body 1A includes a rotary body 90, which serves as a rotary, rotator, or developing device, including the developing units 50*y*, 50*m*, 50*c*, and 50*k*. As will be described later, trays 80*y*, 80*m*, 80*c*, and 80*k*, which serve as support members, are attached to the rotary body 90 in the present embodiment. Toner cartridges 70*y*, 70*m*, 70*c*, and 70*k* are detachably attached to the trays 80*y*, 80*m*, 80*c*, and 80*k*.

In the description below, a plurality of members having similar functions can be distinguished by numbers given thereto. For example, one of the toner cartridges 70*y*, 70*m*, 70*c*, and 70*k* may be referred to as a first toner cartridge, one of the remaining three may be referred to as a second toner cartridge, one of the remaining two may be referred to as a third toner cartridge, and the last one may be referred to as a fourth toner cartridge. Similarly, one of the trays 80y, 80m, 80c, and 80k may be referred to as a first tray, one of the remaining three may be referred to as a second tray, one of the remaining two may be referred to as a third tray, and the last one may be referred to as a fourth tray. That is, one of the trays 80y to 80k is an example of a first support member, another one of the trays 80y to 80k is an example of a second support member, yet another one of the trays 80y to 80k is an example of a third support member, and the last one of the trays 80y to 80k is an example of a fourth support member. This numbering is merely used for the sake of convenience of description, and can be interchanged appropriately in principle.

The developing units 50y, 50m, 50c, and 50k serving as first to fourth developing units are examples of developing means or developing portions that each develop (visualize) an electrostatic latent image formed on the photosensitive drum 2 into a toner image by using toner of a corresponding color. The developing units 50y, 50m, 50c, and 50k each develop the electrostatic latent image formed on the photosensitive drum 2 by using corresponding one of yellow toner, magenta toner, cyan toner, and black toner. That is, developers are used for development, and the image forming apparatus 1 uses first developer, second developer, third developer, and fourth developer, which differ in color from each other. The developing units 50y, 50m, 50c, and 50k may be arranged in an order different from the order illustrated in FIG. 1.

The developing unit 50y includes a developing roller 51y, a supply roller 52y, and a developing blade. The developing roller 51y is a developer bearing member that rotates while bearing toner serving as developer or developing agent, and supplies the toner to the photosensitive drum 2. The supply roller 52y is a supply member that is disposed in contact with the developing roller 51y and supplies toner to the developing roller 51y. The developing blade is a regulation member that regulates the thickness of a toner layer borne on the developing roller 51y. The other developing units 50m, 50c, and 50k respectively include developing rollers 51m, 51c, and 51k, supply rollers 52m, 52c, and 52k, and developing blades that are configured in a similar manner.

The toner cartridges 70y, 70m, 70c, and 70k corresponding to the developing units 50y, 50m, 50c, and 50k are attached to the rotary body 90. The toner cartridges 70y, 70m, 70c, and 70k respectively store therein yellow toner, magenta toner, cyan toner, and black tonner to be supplied to the developing units 50y, 50m, 50c, and 50k. One of the toners of four colors may be referred to as first toner, one of the toners of remaining three colors may be referred to as second toner, one of the toners of remaining two colors may be referred to as third toner, and the toner of the last remaining color may be referred to as fourth toner. For example, the black toner may be referred to as an example of first toner, and the magenta toner may be referred to as an example of second toner. This numbering is merely used for the sake of convenience of description, and can be interchanged appropriately in principle.

Here, the rotary body 90 includes a rotary frame 90f supporting the developing units 50y, 50m, 50c, and 50k. The developing units 50y, 50m, 50c, and 50k are supported by the rotary frame 90f that is a rotary support member that is rotatable.

In addition, the trays 80y, 80m, 80c, and 80k are attached to the rotary body 90. The rotary body 90 and the trays 80y, 80m, 80c, and 80k as a combination can be referred to as a rotary unit 90U. In other words, the rotary unit 90U includes the rotary body 90 and the trays 80y, 80m, 80c, and 80k.

The toner cartridges 70y to 70k are detachably held by the trays 80y to 80k. As will be described later, the trays 80y to 80k are supported so as to be slidable to the outside of the rotary body 90. The rotary unit 90U and the toner cartridges 70y, 70m, 70c, and 70k as combined can be referred to as a rotary assembly 90A. In other words, the rotary assembly 90A includes the rotary unit 90U and toner cartridges 70y, 70m, 70c, and 70k.

As will be described later, the rotary body 90 is rotatable about a rotational axis (rotational center) 90C. The rotational axis 90C coincides with a rotational axis of the rotary frame 90f, that of the rotary unit 90U, and that of the rotary assembly 90A. In addition, the rotational axis 90C is substantially parallel to the rotational axis (rotational center) of the photosensitive drum 2.

The rotary body 90 rotates about the rotational axis 90C, and thus can take developing postures in each of which any one of the developing rollers 51y, 51m, 51c, and 51k faces the photosensitive drum 2. A posture in which the developing roller 51y faces the photosensitive drum 2 will be referred to as a yellow developing posture. A posture in which the developing roller 51m faces the photosensitive drum 2 will be referred to as a magenta developing posture. A posture in which the developing roller 51c faces the photosensitive drum 2 will be referred to as a cyan developing posture. A posture in which the developing roller 51k faces the photosensitive drum 2 will be referred to as a black developing posture. That is, the rotary body 90 can rotate about the rotational axis 90C such that the positions of the developing rollers 51y, 51m, 51c, and 51k change with respect to the photosensitive drum 2. The black developing posture is an example of a first developing posture in which the first developing roller (e.g., developing roller 51k) faces the photosensitive drum 2. The other developing postures are examples of a second developing posture in which a second developing roller (e.g., one of the developing rollers 51y to 51c) faces the photosensitive drum 2. The yellow/magenta/cyan/black developing postures can be referred to as first to fourth developing postures. This numbering is merely used for the sake of convenience of description, and can be interchanged appropriately in principle.

As illustrated in FIG. 2, the apparatus body 1A includes motors M1, M2, and M3 serving as drive sources. As will be described later, the motor M1 supplies a driving force for rotating the rotary body 90 about the rotational axis 90C. In other words, the motor M1 rotates the rotary assembly 90A and the rotary unit 90U about the rotational axis 90C.

In addition, the apparatus body 1A includes a driving device 98 including the motor M2 and a transmission device. The transmission device includes driving racks 15L and 15R serving as driving gears and a transmission portion 15t that will be described later. The driving force of the motor M2 is transmitted to the driving racks 15L and 15R by the transmission portion 15t. In other words, the motor M2 is configured to drive the driving racks 15L and 15R, and moves the trays 80y, 80m, 80c, and 80k with respect to the rotary body 90 via the driving racks 15L and 15R.

The motor M3 drives members that are not driven by the motors M1 and M2. For example, the motor M3 drives the photosensitive drum 2, the developing units 50y, 50m, 50c, and 50k, the pickup roller 310, the feed roller 311, the conveyance roller pair 320, the secondary transfer roller 12, the belt driving roller 10b, and the fixing device 40.

To be noted, the members driven by the motors M1, M2, and M3 can be appropriately changed. In addition, the roles of two or three of the motors M1, M2, and M3 can be concentrated in one motor. In addition, a drive source other than the motors M1, M2, and M3 may be added.

Further, the apparatus body 1A includes a controller 30 serving as control means or control portion for controlling the operation of the image forming apparatus 1. The controller 30 includes a central processing unit (CPU) that executes a program, and a storage portion such as a read-only memory (ROM) or a random access memory (RAM). The CPU reads out and executes a program stored in the storage portion, and controls the operation of actuators provided in the image forming apparatus 1 such as motors M1, M2, and M3. The storage portion includes a nonvolatile storage medium and a volatile storage medium, and functions as a storage area for programs and data and also as a work space for the CPU executing the program. To be noted, each function of the controller 30 described below may be implemented in a circuit of the controller 30 as independent hardware such as an application specific integrated circuit (ASIC).

Here, the suffices y, m, c, and k given to the developing units 50*y*, 50*m*, 50*c*, and 50*k*, the toner cartridges 70*y*, 70*m*, 70*c*, and 70*k*, the trays 80*y*, 80*m*, 80*c*, and 80*k*, and the like indicate the colors of toner. The developing units 50*y*, 50*m*, 50*c*, and 50*k* basically have the same configuration and function. The toner cartridges 70*y*, 70*m*, 70*c*, and 70*k* basically have the same configuration and function. In addition, the trays 80*y*, 80*m*, 80*c*, and 80*k* basically have the same configuration and function. Therefore, in the case where these do not need to be distinguished, the suffices y, m, c, and k will be omitted, and arbitrarily selected one of the four units, four cartridges, and four trays will be described. In addition, in the case of distinguishing the four units, four cartridges, and four trays from each other, the subject elements are each denoted by one of the suffices y, m, c, and k, and described as one corresponding to the suffix among the four units, four cartridges, and four trays.

As illustrated in FIG. 3, the toner cartridge 70 includes a toner frame 71. The toner frame 71 includes a toner storage portion 71*a* that stores toner, and a discharge opening 71*b* communicating with the toner storage portion 71*a*.

The developing unit 50 includes a developing frame 53 serving as a storage frame. The developing frame 53 includes a developing-side storage portion 53*a* and an inlet opening 53*b* communicating with the developing-side storage portion (toner supply chamber) 53*a*. That is, the rotary body 90 includes a developing frame 53*y*, a developing frame 53*m*, a developing frame 53*c*, and a developing frame 53*k*. That is, the rotary body 90 includes a first developing chamber, a second developing chamber, a third developing chamber, and a fourth developing chamber. To be noted, as described above, although the developing unit 50 includes the developing roller 51, the supply roller 52, and the like, illustration of these members is omitted in FIG. 3.

Figure 4A:
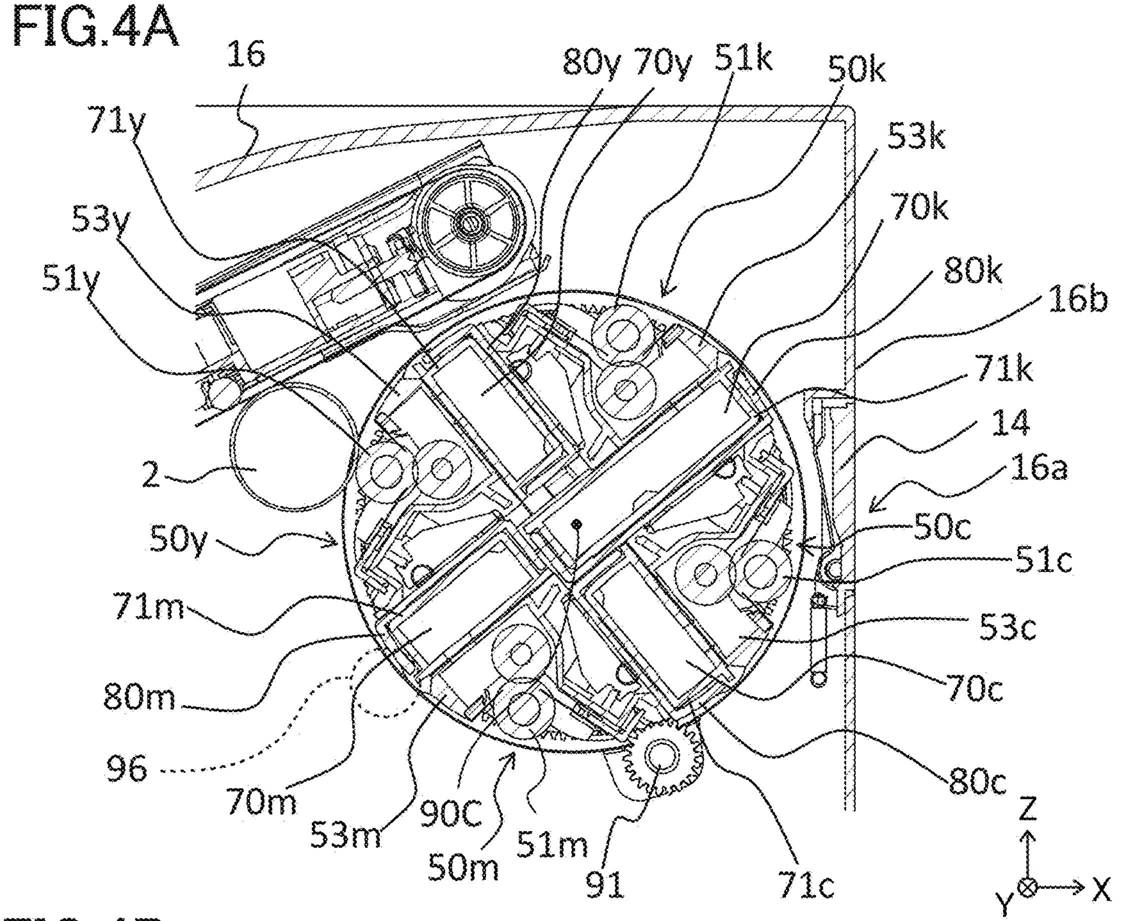
FIGS. 4A and 4B are each a section view of the image forming apparatus according to the first embodiment.

The developing roller 51*k* included in the developing unit 50*k* is an example of a first developing roller. The developing roller 51*m* included in the developing unit 50*m* is an example of a second developing roller. A developing frame 53*k* of the developing unit 50*k* including the developing-side storage portion 53*a* illustrated in FIG. 4A is an example of a first storage frame including a first storage portion. A developing frame 53*m* of the developing unit 50*m* including the developing-side storage portion 53*a* illustrated in FIG. 4A is an example of a second storage frame including a second storage portion. The rotary body 90 is an example of a rotary that is rotatable and includes a first developing roller, a second developing roller, a first storage frame including a first storage portion, and a second storage frame including a second storage portion. In the present embodiment, the rotary body 90 includes first to fourth developing rollers and first to fourth storage frames.

As will be described later, the toner cartridge 70 is movable to an attached position and a retracted position where the toner cartridge 70 is retracted from the attached position, with respect to the developing frame 53. In a state in which the toner cartridge 70 is at the attached position with respect to the developing frame 53, the discharge opening 71*b* faces the inlet opening 53*b*. That is, the toner storage portion 71*a* of the toner cartridge 70 and the developing-side storage portion 53*a* of the developing unit 50 communicate with each other via the discharge opening 71*b* and the inlet opening 53*b*. When toner is supplied from the toner cartridge 70 to the developing unit 50, at least part of the inlet opening 53*b* is positioned below at least part of the discharge opening 71*b*.

Then, toner stored in the toner storage portion 71*a* is discharged through the discharge opening 71*b*, and the toner discharged through the discharge opening 71*b* is stored in the developing-side storage portion 53*a* through the inlet opening 53*b*. That is, first developer, second developer, third developer, and fourth developer are respectively supplied to the first developing chamber, the second developing chamber, the third developing chamber, and the fourth developing chamber included in the rotary body 90.

The toner stored in the developing-side storage portion 53*a* is supplied to the developing roller 51 by the supply roller 52. The toner stored in the toner storage portion 71*a* is supplied to the developing roller 51 through such a path.

The toner cartridge 70 preferably includes an unillustrated sealing member (first sealing member) that covers the discharge opening 71*b*. In addition, the developing unit 50 preferably includes an unillustrated sealing member (second sealing member) that covers the inlet opening 53*b*.

In a state in which the toner cartridge 70 is not attached to the developing unit 50, the discharge opening 71*b* and the inlet opening 53*b* are preferably each covered by a sealing member such that leakage of toner through the discharge opening 71*b* and the inlet opening 53*b* is suppressed.

Image Forming Operation

An image forming operation in the present embodiment will be described. First, the photosensitive drum 2 is rotated in an arrow direction (counterclockwise direction) in FIG. 1 in synchronization with the rotation of the intermediate transfer belt 10*a*. Further, the surface of the photosensitive drum 2 is uniformly charged by the charging roller 3.

In the case of forming a color image on the sheet S, the rotary body 90 rotates in an arrow direction (clockwise direction) in FIG. 1 while supporting the developing units 50*y*, 50*m*, 50*c*, and 50*k*. Then, an electrophotographic process is repeatedly performed while moving the developing rollers 51*y*, 51*m*, 51*c*, and 51*k* to a developing position one by one.

First, the scanner 4 emits laser light based on image data corresponding to a yellow image, and thus forms an electrostatic latent image corresponding to the yellow image on the surface of the photosensitive drum 2. In parallel with the formation of this electrostatic latent image, the motor M1 rotates the rotary body 90, and the rotary body 90 takes the yellow developing posture. When the rotary body 90 is in the yellow developing posture, the developing roller 51*y* is in the developing position, and the electrostatic latent image formed on the photosensitive drum 2 is developed with yellow toner.

Here, in the present embodiment, the developing rollers 51*y*, 51*m*, 51*c*, and 51*k* are each an elastic roller formed by covering a metal shaft with rubber. At the developing position, the developing rollers 51*y*, 51*m*, 51*c*, and 51*k* each develop the electrostatic latent image in a state of being in contact with the photosensitive drum 2. That is, a contact development system is employed for the image forming apparatus 1 of the present embodiment. However, at the developing position, each of the developing rollers 51*y*, 51*m*, 51*c*, and 51*k* may develop the electrostatic latent image with a gap between the developing roller and the photosensitive drum 2. That is, a non-contact development system may be employed for the image forming apparatus 1.

After the yellow toner image is developed, the yellow toner image on the photosensitive drum 2 is transferred onto the intermediate transfer belt 10*a* through primary transfer by the primary transfer roller 11 disposed on the inner peripheral side of the intermediate transfer belt 10*a*.

After this, toner images of respective colors are formed by rotating the rotary body 90 and thus sequentially moving the developing rollers 51*m*, 51*c*, and 51*k* to the developing position. That is, after the yellow toner image is formed on the intermediate transfer belt 10*a*, the rotary body 90 takes a magenta developing posture, and a magenta toner image is formed on the intermediate transfer belt 10*a*. After the magenta toner image is formed on the intermediate transfer belt 10*a*, the rotary body 90 takes a cyan developing posture, and a cyan toner image is formed on the intermediate transfer belt 10*a*. After the cyan toner image is formed on the intermediate transfer belt 10*a*, the rotary body 90 takes a black developing posture, and a black toner image is formed on the intermediate transfer belt 10*a*. After the black toner image is formed on the intermediate transfer belt 10*a*, the rotary body 90 rotates about the rotational axis 90C in an arrow direction (clockwise direction) illustrated in FIG. 1, and returns to the yellow developing posture. To be noted, the color of the image to be formed first on the intermediate transfer belt 10*a* can be arbitrarily selected, and for example, the black toner image may be formed first.

Then, primary transfer is repeated so as to superimpose the toner images of four colors on each other on the intermediate transfer belt 10*a*, and thus a color image is formed on the intermediate transfer belt 10*a*. To be noted, before the color image is formed on the intermediate transfer belt 10*a*, the secondary transfer roller 12 and the cleaning device 13 are not in contact with the intermediate transfer belt 10*a*.

Meanwhile, the sheet S is fed by the pickup roller 310 from the sheet storage portion 300 provided in a lower portion of the apparatus body 1A. The sheet S is conveyed to the conveyance roller pair 320 in a state in which one sheet S is separated from a stack of sheets S by the feed roller 311 and the separation roller 312. The conveyance roller pair 320 delivers out the fed sheet S to a transfer portion (secondary transfer portion) that is a nip portion between the intermediate transfer belt 10*a* and the secondary transfer roller 12. The color image on the intermediate transfer belt 10*a* is transferred onto the surface of the conveyed sheet S through secondary transfer.

The sheet S onto which a color image has been transferred is conveyed to the fixing device 40. In the fixing device 40, the sheet S is heated and pressurized, and thus the image is fixed to the sheet S. The sheet S having passed the fixing device 40 is discharged to the outside of the image forming apparatus 1 as a product.

In contrast, in the case of forming a black-and-white image (monochrome image) on the sheet S, the rotary body 90 takes the black developing posture. In this state, an electrostatic latent image is formed on the surface of the photosensitive drum 2 by charging and exposing the photosensitive drum 2, and then the electrostatic latent image is developed with black toner by the developing roller 51*k* positioned at the developing position. The black toner image is transferred onto the intermediate transfer belt 10*a* through primary transfer, and then the toner image is transferred onto the sheet S through secondary transfer. Steps after this are similar to the case of a color image.

Rotary Configuration

Figure 4B:
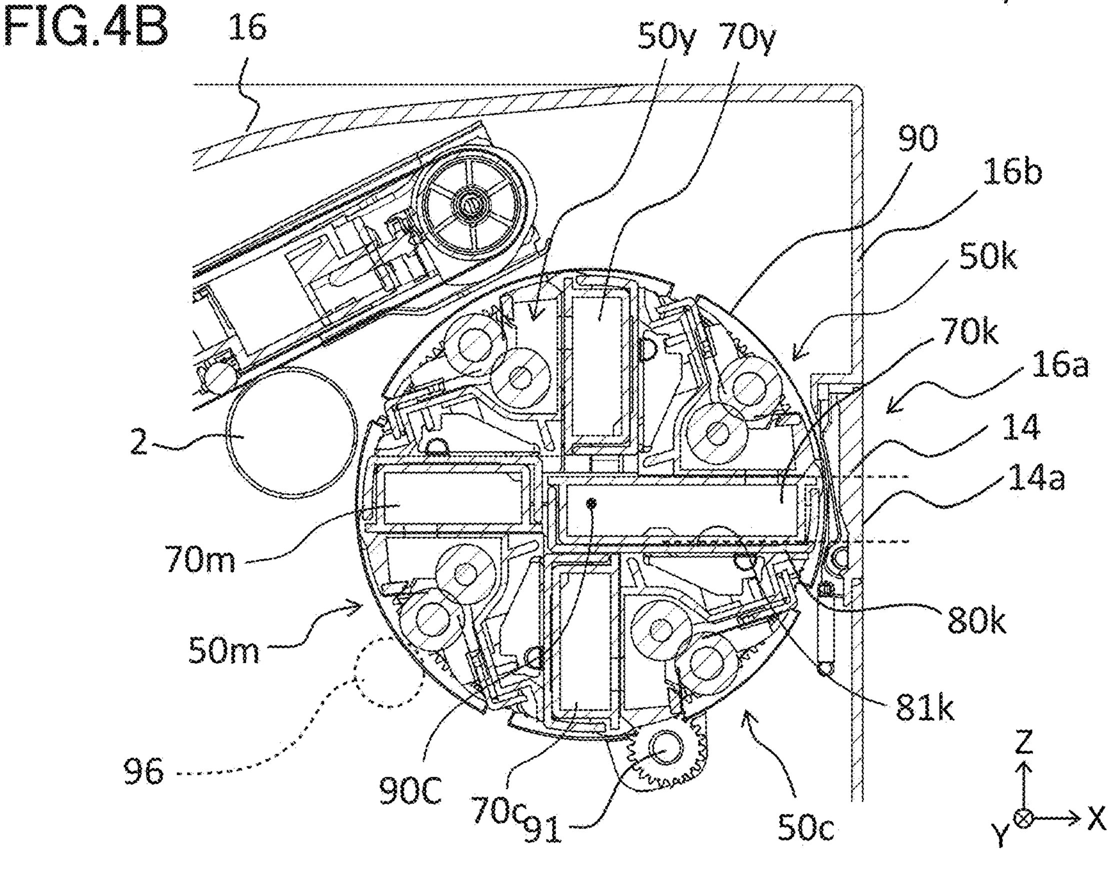
Figure 5:
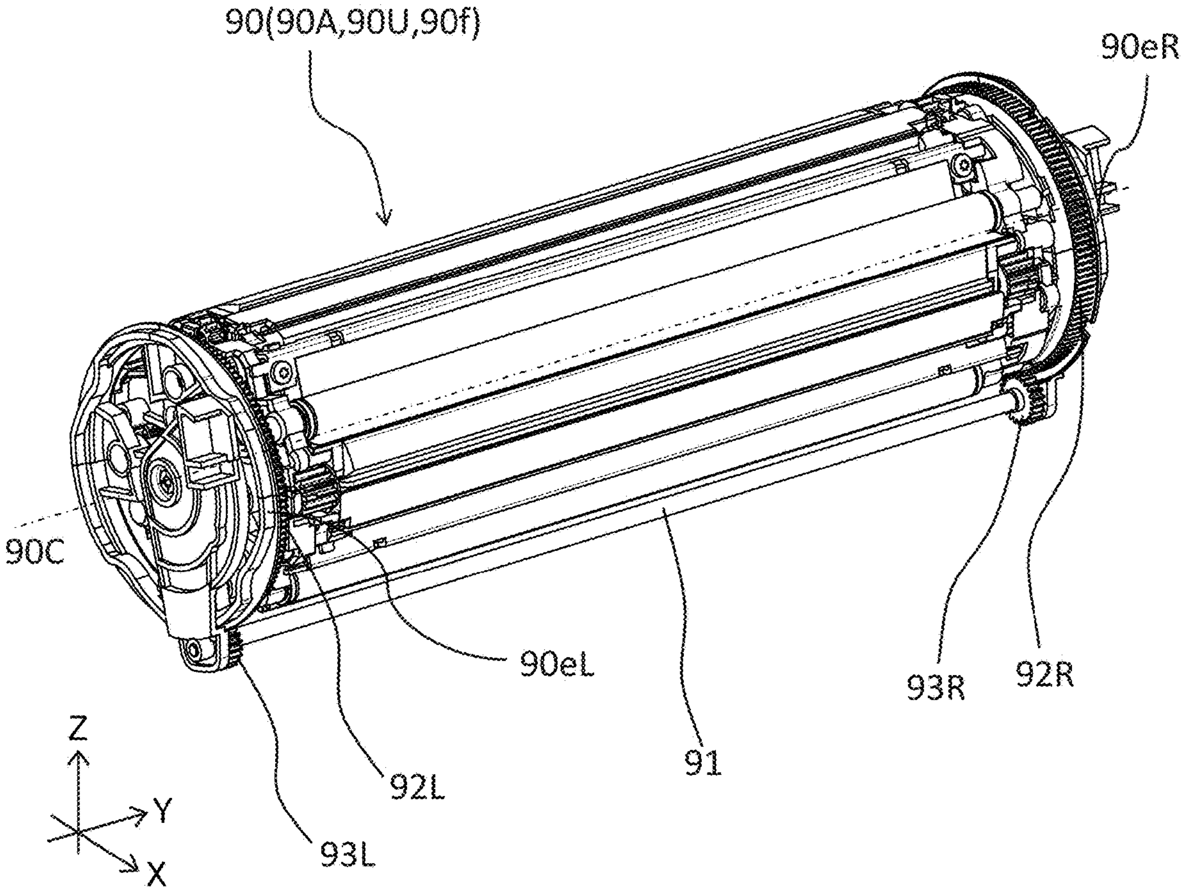
FIG. 5 is a perspective view of a rotary body according to the first embodiment.

The configuration of the rotary body 90 will be described with reference to FIGS. 1, 4A, 4B, and 5. FIGS. 4A and 4B are each a section view of the rotary body 90 of the image forming apparatus 1 and the surroundings thereof. To be noted, FIGS. 4A and 4B are each a section view taken along a virtual plane orthogonal to the rotational axis 90C of the rotary body 90. FIG. 5 is a perspective view of the rotary body 90.

As has been described, the toner cartridges 70*y* to 70*k* are attachable to and detachable from the rotary body 90. In the case where toner in the toner cartridges 70*y* to 70*k* has run out, the user can replenish the image forming apparatus 1 with toner by replacing the toner cartridges 70*y* to 70*k*.

As illustrated in FIG. 1, the apparatus body 1A includes a frame 16 accommodating the rotary body 90. The frame 16 is a body frame of the image forming apparatus 1 of the present embodiment. The frame 16 is a casing or skeleton of the apparatus body 1A constituted by a frame and exterior members, and has an approximately rectangular parallelepiped shape.

The frame 16 has an opening 16*a*. More specifically, the frame 16 has a side surface 16*b* extending in a direction intersecting with the horizontal direction. The side surface 16*b* constitutes at least part of the exterior surface of the apparatus body 1A on the +X side. The opening 16*a* is provided in the side surface 16*b*. The side surface 16*b* is a side surface disposed on the downstream side of the discharge port in a discharge direction in which the sheet S on which an image has been formed is discharged from the apparatus body 1A through the discharge port. From the side surface 16*b* side of the image forming apparatus 1, the user can access the sheet storage portion 300 to replenish the sheet storage portion 300 with sheets S, and can obtain the sheet S discharged through the discharge port. Therefore, the side surface 16*b* can be referred to as the front surface of the apparatus body 1A.

The toner cartridges 70*y*, 70*m*, 70*c*, and 70*k* are attachable to and detachable from the rotary body 90 through the opening 16*a*. That is, the toner cartridge 70*k* can be referred to as an example of a first toner cartridge that stores toner to be supplied to the first developing roller (developing roller 51*k*) and that is attachable to and detachable from the rotary (rotary body 90) through the opening 16*a* of the frame 16 of the apparatus body 1A. The toner cartridge 70*m* can be referred to as an example of a second toner cartridge that stores toner to be supplied to the second developing roller (developing roller 51*m*) and that is attachable to and detachable from the rotary (rotary body 90) through the opening 16*a* of the frame 16 of the apparatus body 1A.

In the present embodiment, the toner cartridges 70*y*, 70*m*, 70*c*, and 70*k* are attached to and detached from the rotary body 90 through the opening 16*a* in the state of being supported by the trays 80*y* to 80*k*. In other words, the user can attach and detach the toner cartridges 70*y* to 70*k* to and from the rotary body 90 via the trays 80*y* to 80*k*.

The opening 16*a* is disposed in the side surface 16*b* of the frame 16. In the present embodiment, the side surface 16*b* is a surface approximately parallel to the rotational axis 90C of the rotary body 90. Therefore, in the case of replacing the toner cartridge 70, the toner cartridge 70 passes through the opening 16*a* in a direction intersecting with the rotational axis 90C (preferably a direction orthogonal to the rotational axis 90C).

The image forming apparatus 1 includes a door 14 that covers the opening 16*a* of the frame 16. The door 14 is an opening/closing member movable to a closed position illustrated in FIG. 6A where the door 14 covers the opening 16*a* and an open position illustrated in FIGS. 6B and 6C where the opening 16*a* is exposed.

As described above, in the present embodiment, the toner cartridge 70 is configured to be attachable to and detachable from the rotary body 90 via the tray 80. Therefore, the toner cartridge 70 can be stably attached to and detached from the rotary body 90.

More specifically, the user can replace the toner cartridge 70 by an operation of attaching and detaching the toner cartridge 70 to and from the tray 80 configured to be movable with respect to the rotary body 90 (that is, with respect to the apparatus body 1A). In the case of a configuration in which the toner cartridge is replaced by the user directly inserting and removing the toner cartridge in and from the apparatus body, the user is required to insert the toner cartridge to a predetermined attached position in the apparatus body. In the present embodiment, the tray 80 is capable of moving such that the toner cartridge 70 moves to the attached position in a state in which the tray 80 is supporting the toner cartridge 70. Therefore, the user can replace the toner cartridge 70 by a simple operation of placing the toner cartridge 70 on the tray 80, and thus the operability is improved.

To be noted, the toner cartridge 70 has a thin elongated shape with the Y direction parallel to the rotational axis 90C of the rotary body 90 as a longitudinal direction. That is, the dimension of the toner cartridge 70 in the longitudinal direction is larger than its height and width in a cross-section orthogonal to the longitudinal direction. In the case of using the toner cartridge 70 having a thin elongated shape as described above, the toner cartridge 70 can be passed through the opening 16*a* in a short movement distance by providing the opening 16*a* in the side surface 16*b* of the frame 16 that is approximately parallel to the longitudinal direction (Y direction) of the toner cartridge 70. The replacement of the toner cartridge 70 becomes easier than, for example, a case where the toner cartridge 70 is inserted or removed through an opening provided in a side surface on one side (+Y side or −Y side) of the frame 16 in the longitudinal direction of the toner cartridge 70.

The rotary body 90 rotates about the rotational axis 90C, and thus can take a replacement posture in which detachment of one of the toner cartridges 70*y* to 70*k* from the rotary body 90 is allowed. A posture in which the detachment of the toner cartridge 70*y* is allowed will be referred to as a yellow replacement posture. A posture in which the detachment of the toner cartridge 70*m* is allowed will be referred to as a magenta replacement posture. A posture in which the detachment of the toner cartridge 70*c* is allowed will be referred to as a cyan replacement posture.

A posture in which the detachment of the toner cartridge 70*k* is allowed will be referred to as a black replacement posture. The black replacement posture is an example of a first replacement posture in which detachment of a first toner cartridge from the rotary body 90 is allowed. The yellow/magenta/cyan replacement postures are examples of a second replacement posture in which detachment of a second toner cartridge from the rotary body 90 is allowed. The yellow/magenta/cyan/black replacement postures can be referred to as first to fourth replacement postures. This numbering is merely used for the sake of convenience of description, and can be interchanged appropriately in principle.

The rotary body 90 rotates about the rotational axis 90C in a counterclockwise direction of FIG. 1, and can sequentially take the yellow/magenta/cyan/black replacement postures. In the present embodiment, the rotary body 90 rotates about the rotational axis 90C in the counterclockwise direction of FIG. 1, and thus the developing posture and the replacement posture can be switched alternately. For example, in FIG. 1, the rotary body 90 is in the black developing posture. By rotating the rotary body 90 in the clockwise direction from this state, the posture of the rotary body 90 can be switched in the order of the cyan replacement posture, the yellow developing posture, the black replacement posture, the magenta developing posture, the yellow replacement posture, the cyan developing posture, and the magenta replacement posture. By rotating the rotary body 90 in the clockwise direction from the magenta replacement posture, the rotary body 90 returns to the black developing posture. That is, the rotary body 90 can rotate more than once (360°) in the clockwise direction.

FIG. 4A illustrates a cross-section of the rotary body 90 in a developing posture (specifically, the yellow developing posture). FIG. 4B illustrates a cross-section of the rotary body 90 in a replacement posture (specifically, the black replacement posture).

As illustrated in FIGS. 4A and 4B, the four trays 80*y* to 80*k* are attached to the rotary body 90. The trays 80*y* to 80*k* respectively hold the toner cartridges 70*y* to 70*k*. In FIGS. 4A and 4B, the trays 80*y* to 80*k* are accommodated in the rotary body 90, and this state can be referred to as a state in which the toner cartridges 70*y* to 70*k* are attached to the developing units 50*y*, 50*m*, 50*c*, and 50*k*.

As described above, the toner cartridge 70 is movable to an attached position and a retracted position where the toner cartridge 70 is retracted from the attached position, with respect to the developing frame 53 of the developing unit 50. That is, the first toner cartridge (toner cartridge 70*k*) is movable to a first attached position and a first retracted position with respect to a first storage frame (developing frame 53*k*). The second toner cartridge (toner cartridge 70*m*) is movable to a second attached position and a second retracted position with respect to a second storage frame (developing frame 53*m*).

In a state in which the toner cartridge 70 is at the attached position with respect to the developing frame 53, the discharge opening 71*b* and the inlet opening 53*b* face each other as illustrated in FIG. 3. The toner cartridge 70 is configured to supply toner to the developing-side storage portion 53*a* through the inlet opening 53*b* (opening of the storage frame) in this state.

The apparatus body 1A includes a moving device 85 configured to move the toner cartridge 70 from the attached position to the retracted position with respect to the rotary body 90 (more specifically, with respect to the developing frame 53 of the developing unit 50). The moving device 85 will be described below with reference to FIG. 8 and the like. In the present embodiment, a plurality of moving devices 85*y* to 85*k* corresponding to the plurality of toner cartridges 70y to 70k are disposed in the rotary body 90. The trays 80y to 80k can be referred to as part of the moving devices 85y to 85k.

In the present embodiment, the toner cartridge 70k storing the black toner is larger in size than the toner cartridges 70y to 70c storing yellow toner, magenta toner, and cyan toner, and is capable of storing more toner. In other words, the first toner cartridge is capable of storing a first amount of toner, the second toner cartridge is capable of storing a second amount of toner, and the first amount is larger than the second amount.

Specifically, the length of the black toner cartridge 70k in a first radial direction with respect to the rotational axis 90C of the rotary body 90 is larger than the length of the magenta toner cartridge 70m in a second radial direction. Here, the first radial direction is a rotational radius direction (radial direction of a virtual circle centered on the rotational axis 90C) of the rotary body 90, and is a direction in which the toner cartridge 70k extends with respect to the rotational axis 90C as viewed in the direction of the rotational axis 90C. The second radial direction is a rotational radius direction of the rotary body 90, and is a direction in which the toner cartridge 70m extends with respect to the rotational axis 90C as viewed in the direction of the rotational axis 90C. Similarly, the length of the black toner cartridge 70k in the first radial direction is larger than the lengths of the other toner cartridges 70y and 70c in the radial directions corresponding to the toner cartridges 70y and 70c.

Accordingly, the tray 80k holding the black toner cartridge 70k is larger in size than the trays 80y to 80c holding the other toner cartridges 70y, 70m, and 70c. That is, the four toner cartridges 70y to 70k and the trays 80y to 80k having different sizes are disposed in the rotary body 90. In other words, the toner cartridge 70k serving as an example of a first toner cartridge and the toner cartridge 70y serving as an example of a second toner cartridge smaller than the first toner cartridge are attachable to and detachable from the rotary body 90. In accordance with this, the tray 80k serving as an example of a first support member that supports the first toner cartridge and the tray 80y serving as an example of a second support member smaller than the first support member are provided in the rotary body 90. In addition, the toner cartridges 70m and 70c serving as examples of a third toner cartridge and a fourth toner cartridge that are smaller in size than the first toner cartridge are attachable to and detachable from the rotary body 90. In accordance with this, the trays 80m and 80c serving as examples of a third support member and a fourth support member that are smaller in size than the first support member are provided in the rotary body 90.

Here, rotational driving of the rotary body 90 will be described with reference to FIG. 5. As illustrated in FIG. 5, disk gears 92L and 92R are formed on respective end portions of the rotary body 90. In addition, rotary driving gears 93L and 93R are formed on respective end portions of a swing shaft 91 in a manner capable of transmitting a driving force. Here, the driving force of the motor M1 is transmitted to the rotary driving gear 93R via a drive transmission mechanism. Next, the driving force is transmitted to the disk gears 92L and 92R via the rotary driving gears 93L and 93R, and thus the rotary body 90 is rotationally driven. The rotary body 90 rotates about the rotational axis 90C in the clockwise direction in FIG. 1.

In addition, the rotary body 90 is supported so as to be swingable about the swing shaft 91. The rotary body 90 is urged in a counterclockwise direction in FIGS. 4A and 4B about the swing shaft 91 by an urging member. This direction can be referred to as a direction in which the developing rollers 51y to 51k each approach the photosensitive drum 2. As a result of this, one of the developing rollers 51y to 51k is in contact with the photosensitive drum 2 in a state in which the rotary body 90 is in a developing posture.

Meanwhile, as illustrated in FIG. 5, rotary cams 90eL and 90eR are provided on respective end portions of the rotary body 90. When the rotary body 90 rotates about the rotational axis 90C in a clockwise direction in FIGS. 4A and 4B, the rotary cams 90eL and 90eR come into contact with a roller 96 supported by the frame 16 illustrated in FIGS. 4A and 4B. Then, the rotary body 90 moves in the clockwise direction in FIGS. 4A and 4B about the swing shaft 91. This direction can be referred to as a direction in which the developing rollers 51y to 51k each move away from the photosensitive drum 2. In addition, this direction can be referred to as a direction in which the rotary body 90 approaches the opening 16a of the frame 16 and the door 14.

As a result of this, when the rotary body 90 rotates and switches from the developing posture to the replacement posture, the rotary body 90 swings about the swing shaft 91. In a state in which the rotary body 90 is in the replacement posture, the developing roller 51 is separated from the photosensitive drum 2.

As illustrated in FIG. 4B, in the black replacement posture, the toner cartridge 70k stops at a position where the toner cartridge 70k faces the opening 16a and the door 14 provided on the side surface 16b of the apparatus body 1A. When the tray 80k is slid from the attached position for the developing unit 50k to the outside of the rotary body 90 from this state, the user can replace the toner cartridge 70k.

Replacement Operation of Toner Cartridge

Figure 6A:
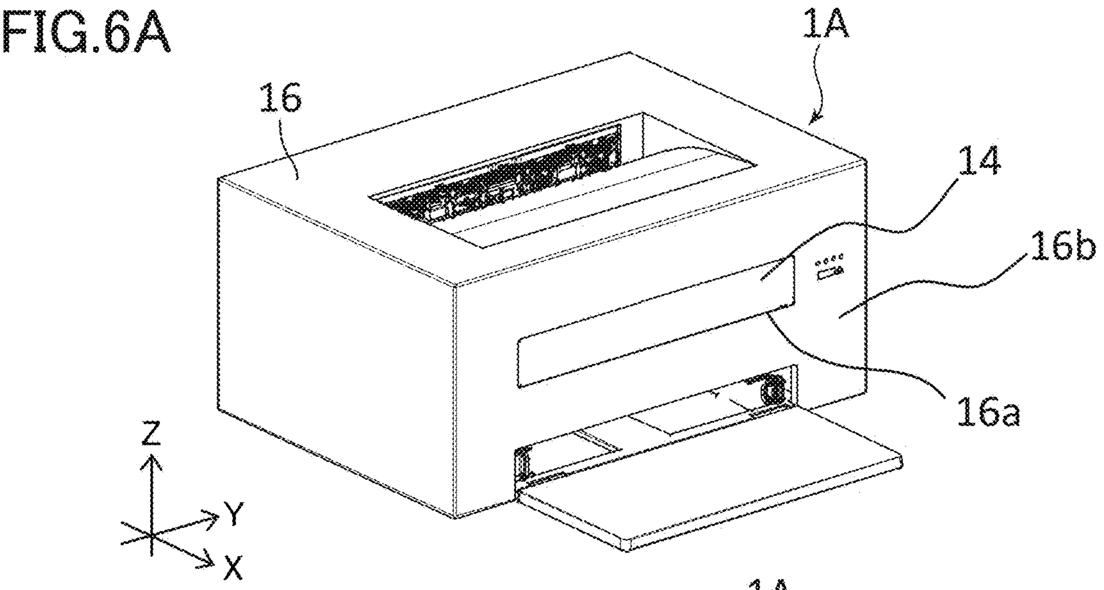
FIGS. 6A to 6C are each a perspective view of the image forming apparatus according to the first embodiment.
Figure 6B:
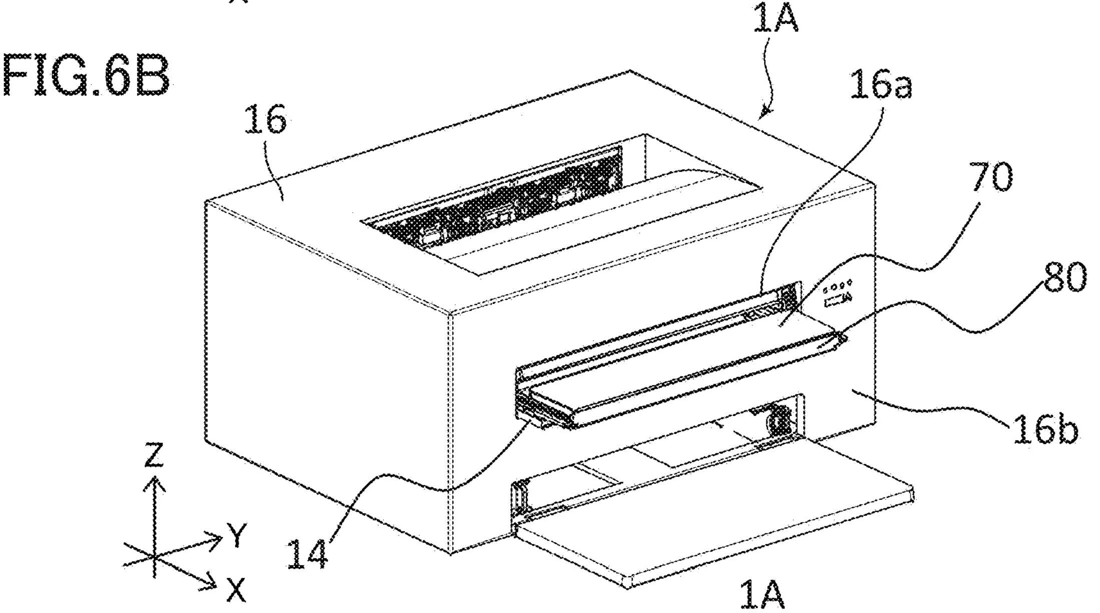
Figure 6C:
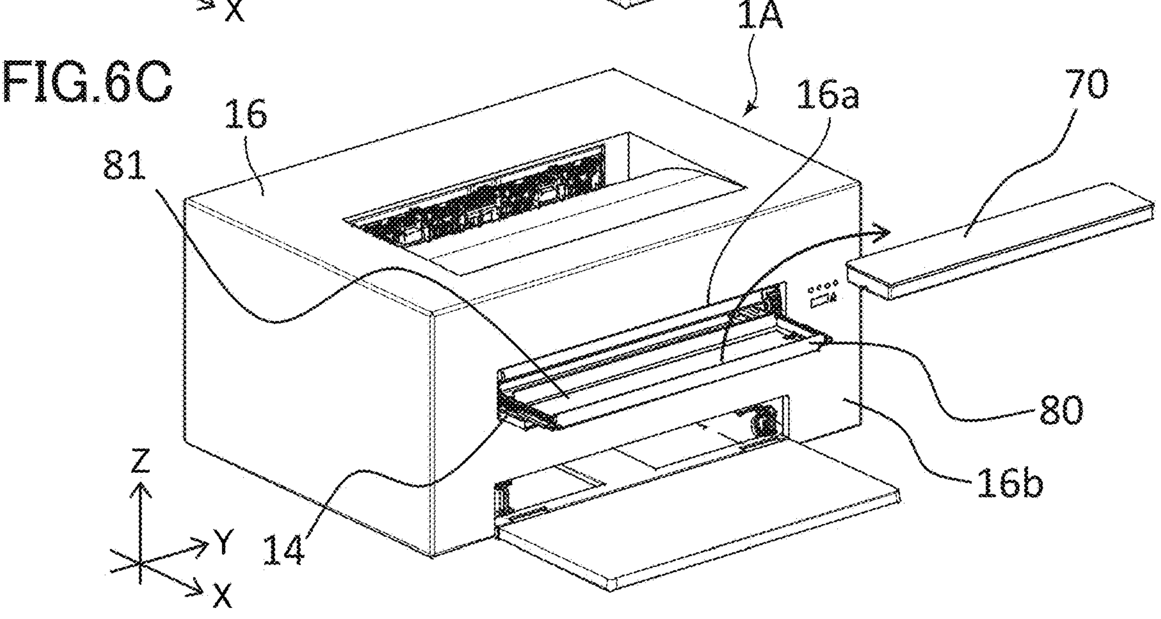
Figure 7A:
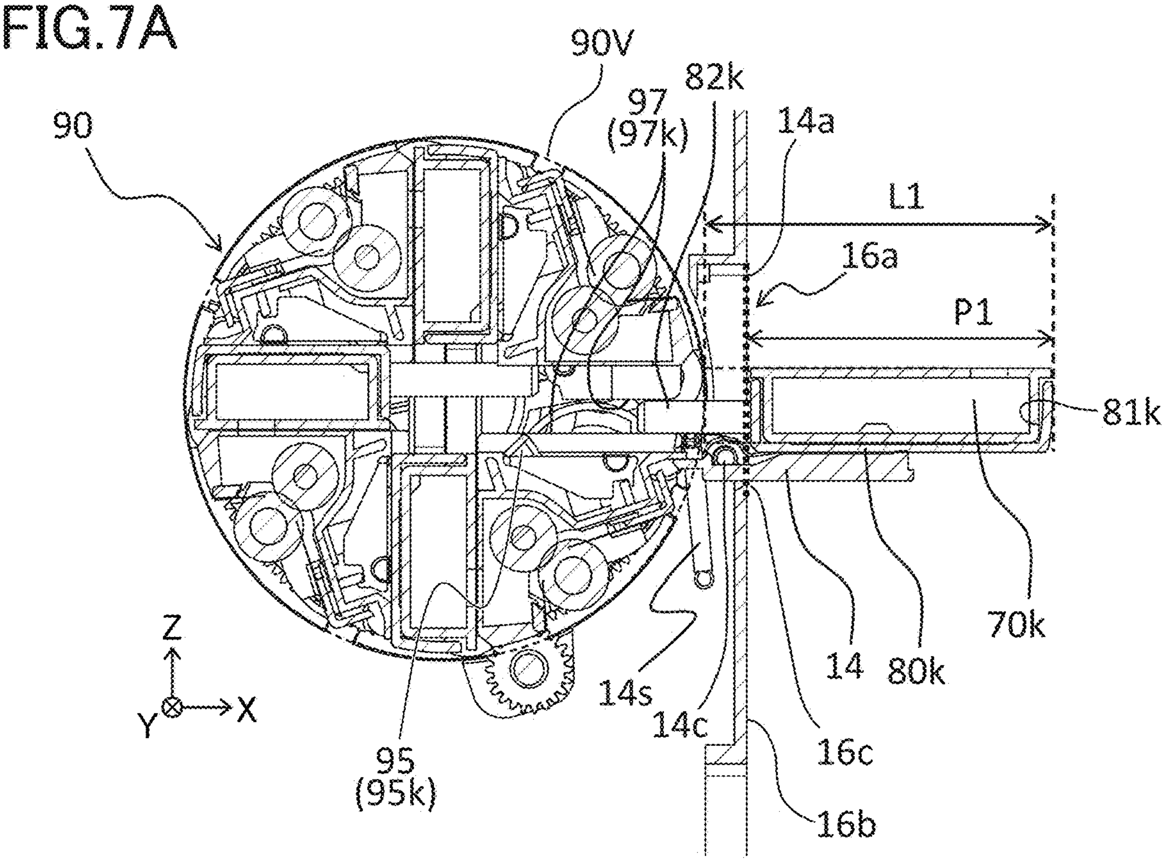
FIGS. 7A and 7B are each a section view of the image forming apparatus according to the first embodiment.
Figure 7B:
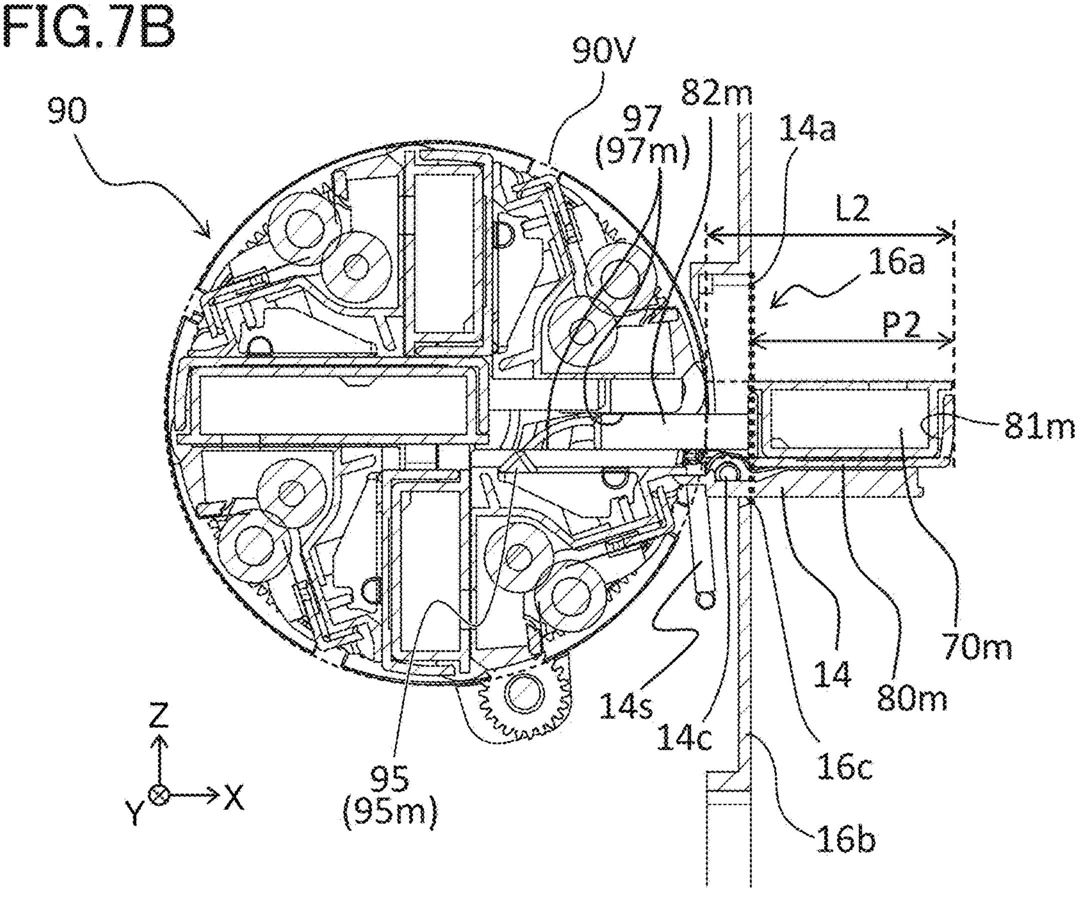

A toner cartridge replacement operation will be described with reference to FIGS. 4A, 6A to 6C, 7A, and 7B. FIGS. 6A to 6C are each an exterior view of the apparatus body 1A. FIGS. 7A and 7B are each a section view of the rotary body 90 and the surroundings thereof in toner cartridge replacement. To be noted, FIGS. 7A and 7B are each a section view of the apparatus taken along a virtual plane orthogonal to the rotational axis 90C of the rotary body 90.

FIG. 6A illustrates an external appearance of the apparatus body 1A during the image forming operation and in a standby state. During the image forming operation is during a period in which a series of operations of the image forming apparatus 1 feeding a sheet S, forming an image on the sheet S, and then discharging the sheet S as a product are executed. The standby state is a state in which the image forming operation can be started if the image forming apparatus 1 receives an image forming instruction (printing instruction), and a state in which the image forming apparatus 1 is standing by for the image forming instruction from the user. As illustrated in FIG. 6A, the door 14 is closed during the image forming operation and in the standby state.

FIG. 6B illustrates the external appearance of the apparatus body 1A at the time of toner cartridge replacement. At the time of toner cartridge replacement, the door 14 is opened, and the tray 80 and the toner cartridge 70 are moved to the outside of the apparatus body 1A.

The toner cartridge 70 is movable to an attached position and a retracted position where the toner cartridge 70 is retracted from the attached position, with respect to the developing frame 53 of the developing unit 50. In a state in which the toner cartridge 70 is at the attached position with respect to the developing frame 53, the discharge opening 71b and the inlet opening 53b face each other as illustrated in FIG. 3. As illustrated in FIGS. 4A and 4B, the rotary body 90 is configured to rotate about the rotational axis 90C to take the developing posture and the replacement posture in a state in which the toner cartridge 70 is at the attached position.

The toner cartridge replacement operation will be described. First, the user instructs the controller 30 of the apparatus body 1A a toner cartridge replacement operation. The instruction of toner cartridge replacement operation is given by, for example, input via an operation panel (operation portion) provided on the apparatus body 1A.

When the controller 30 receives the instruction of the toner cartridge replacement operation, the rotary body 90 rotates to the replacement posture of the toner cartridge 70 serving as a replacement target (toner cartridge 70 whose toner has run out), and stops. That is, the controller 30 rotates the rotary body 90 to the replacement posture of a toner cartridge specified in the instruction of the toner cartridge replacement (in FIG. 4B, the black replacement posture for replacing the black toner cartridge 70*k*). In the replacement posture, the tray 80 supporting the toner cartridge 70 whose replacement has been instructed faces the opening 16*a* of the frame 16 of the apparatus body 1A.

For example, the rotary body 90 of FIG. 4A is in the yellow developing posture in which the yellow developing roller 51*y* faces the photosensitive drum 2. At this time, the black toner cartridge 70*k* and the tray 80*k* do not have to face the opening 16*a* and the door 14. In other words, the toner cartridge 70 and the tray 80 do not have to face the opening 16*a* and the door 14 in the case where the rotary body 90 is in a developing posture or a replacement posture other than the replacement posture of the toner cartridge. Therefore, the opening 16*a* may have such a size that each of the toner cartridges 70 can individually pass therethrough. When the rotary body 90 rotates in the clockwise direction in the drawings by a predetermined angle from the yellow developing posture, the black toner cartridge 70*k* and the tray 80*k* face the opening 16*a* and the door 14 as illustrated in FIG. 4B.

Here, "the tray 80 facing the opening 16*a*" means that the tray 80 is positioned so as to be able to move to the outside of the apparatus body 1A through the opening 16*a*. That is, in the case where the tray 80 faces the opening 16*a*, a moving mechanism that will be described later moves the tray 80 outward in the rotational radius direction of the rotary body 90, and therefore the tray 80 and the toner cartridge 70 supported by the tray 80 are capable of projecting to the outside of the apparatus body 1A. In FIG. 4A, none of the trays 80*y* to 80*k* faces the opening 16*a*. In FIG. 4B, only the black tray 80*k* faces the opening 16*a*, and the other trays 80*y* to 80*c* do not face the opening 16*a*.

When the rotary body 90 is positioned in the replacement posture, the motor M2 moves the tray 80 supporting the toner cartridge 70 serving as a replacement target to the outside of the apparatus body 1A.

As a result of this, the toner cartridge 70 serving as a replacement target moves from the attached position to the retracted position with respect to the rotary body 90. In addition, as illustrated in FIGS. 6B, 6C, 7A, and 7B, the tray 80 and the toner cartridge 70 serving as a replacement target supported by the tray 80 projects to the outside of the apparatus body 1A through the opening 16*a*.

More specifically, the tray 80 is movable to an accommodation position and a detachment position with respect to the rotary body 90. That is, the first tray is movable to the accommodation position (first position) and the detachment position (second position). In addition, the second tray is movable to the accommodation position (third position) and the detachment position (fourth position). The accommodation position is a position where the tray 80 is accommodated in the rotary body 90. The detachment position is a position (removal position or replaceable position) where the tray 80 projects to the outside of the rotary body 90 and the toner cartridge 70 can be detached from the tray 80. The positions of the trays 80*y* to 80*k* in FIGS. 4A and 4B serve as examples of the accommodation position. The position of the tray 80 in FIGS. 6B and 6C, the position of the tray 80*k* in FIG. 7A, and the position of the tray 80*m* in FIG. 7B serve as examples of the detachment position.

When the tray 80 is at the accommodation position, the toner cartridge 70 attached to the tray 80 is inside the rotary body 90, and is positioned at the attached position. When the tray 80 is at the detachment position, the toner cartridge 70 attached to the tray 80 is outside the rotary body 90, and is positioned at the retracted position.

Figure 8:
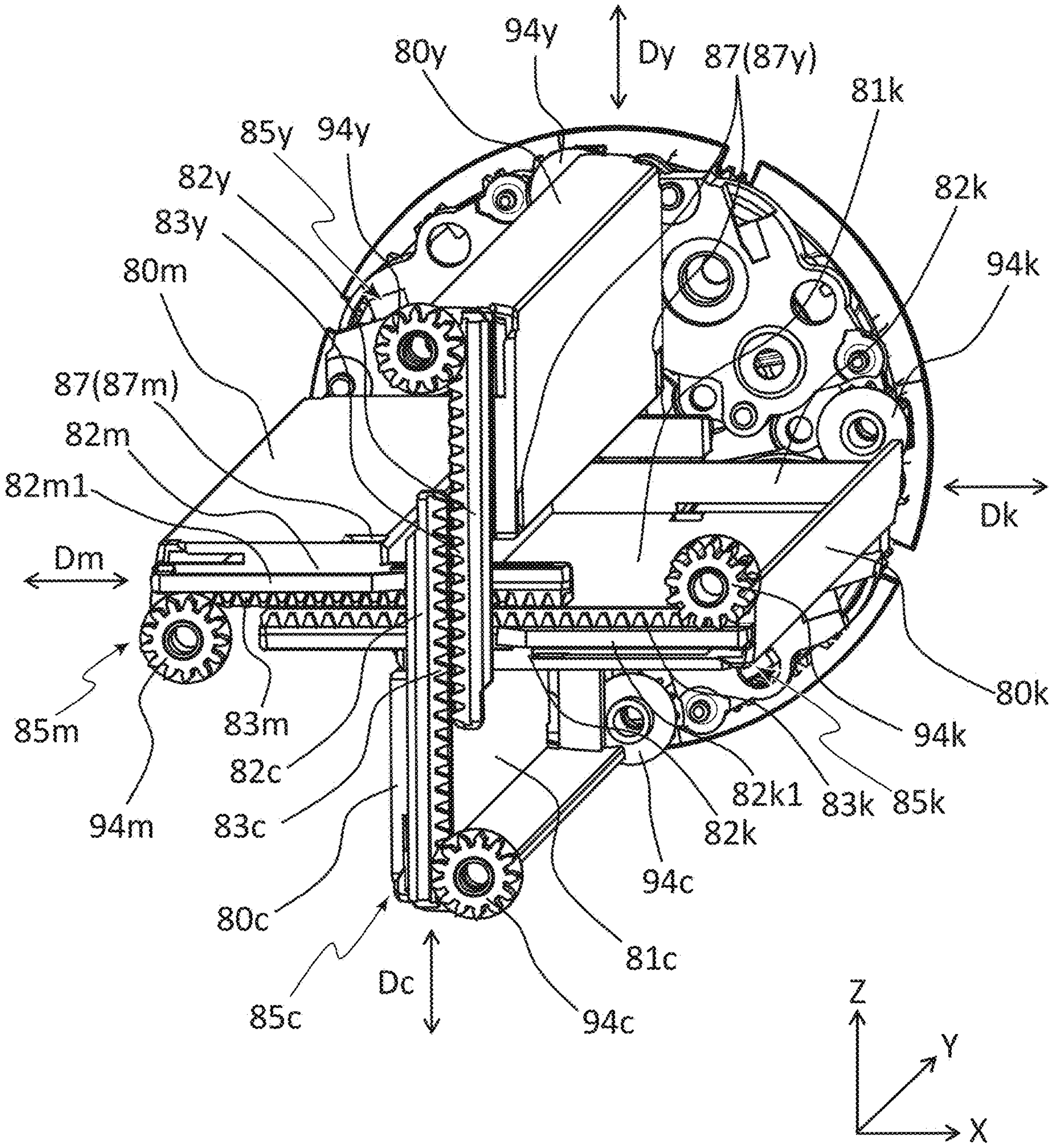
FIG. 8 is an explanatory diagram of the rotary body according to the first embodiment.

Here, as illustrated in FIGS. 7A and 7B, the rotary body 90 has projection portions 95 for holding the tray 80 at the accommodation position and holding the toner cartridge 70 at the attached position. As illustrated in FIG. 8, the tray 80 has recess portions 87 configured to be fit on the projection portions 95. FIGS. 7A and 7B illustrate projection portions 95*k* and 95*m* corresponding to the trays 80*k* and 80*m*, and FIG. 8 illustrates recess portions 87*y* and 87*m* of the trays 80*y* and 80*m*. The projection portion 95 and the recess portion 87 are provided for each of the trays 80*y* to 80*k*. The projection portion 95 is preferably urged in such a direction as to engage with the recess portion 87.

The projection portion 95 fits in the recess portion 87 of the tray 80, and thus the tray 80 is locked with respect to the rotary frame 90*f*. As a result of this, the tray 80 stays in the accommodation position even when the rotary body 90 rotates, and thus movement of the toner cartridge 70 from the attached position can be suppressed. To be noted, in the case where the tray 80 is moved between the accommodation position and the detachment position by the moving device that will be described below, the projection portion 95 can be configured to be moved by the tray 80 and thus disengaged from the recess portion 87.

In the present embodiment, the door 14 is supported so as to be pivotable with respect to the apparatus body 1A. As illustrated in FIG. 7A, the door 14 is urged from the open position to the closed position by a spring 14*s*. The spring 14*s* is, for example, a tension spring, and urges the door 14 such that a moment in a counterclockwise direction in FIGS. 7A and 7B is generated about a support shaft 14*c* of the door 14.

The tray 80 pushes the door 14, and thus the door 14 takes the open state illustrated in FIG. 6B. This state can be referred to as a state in which the tray 80 is supported by the door 14. The door 14 supports at least part of the tray 80 projecting to the outside of the apparatus body 1A, and thus the toner cartridge 70 can be supported more stably. In other words, when the first toner cartridge (toner cartridge 70*k*) is at the first retracted position, the opening/closing member (door 14) at the open position supports the first support member (tray 80*k*). In addition, when the second toner cartridge (one of the toner cartridges 70*y* to 70*c*) is at the second retracted position, the opening/closing member (door 14) at the open position supports the second support member (one of the trays 80*y* to 80*c*).

To be noted, the door 14 is configured such that the door 14 at the open position comes in contact with part (for example, a lower edge 16*c* of the opening 16*a*) of the frame 16 of the apparatus body 1A and not to pivot downward beyond the open position. When the tray 80 is pulled back into the apparatus body 1A from the outside, the door 14 returns to the closed position by the urging force of the spring 14*s*.

The toner cartridge 70 is detachably held by the tray 80. Therefore, as illustrated in FIG. 6C, the user can perform a work (replacement work) of detaching the toner cartridge 70 from the tray 80 and attaching a new toner cartridge 70. To be noted, in the case of replacing a plurality of toner cartridges 70, the replacement work can be performed by repeating the operation described above.

FIGS. 7A and 7B illustrate a cross-section of the rotary body 90 and the surroundings thereof at the time of toner cartridge replacement. FIG. 7A illustrates a state at the time of replacing the black toner cartridge 70*k*. FIG. 7B illustrates a state at the time of replacing the magenta toner cartridge 70*m*.

The image forming apparatus 1 includes the moving devices 85*y*, 85*m*, 85*c*, and 85*k* illustrated in FIG. 8 that respectively move the toner cartridges 70*y*, 70*m*, 70*c*, and 70*k* from the attached position to the retracted position. When referring to a "moving device 85" in which the suffices y, m, c, and k are omitted, it basically represents arbitrary one of the moving devices 85*y*, 85*m*, 85*c*, and 85*k*. In the present embodiment, it can be said that the moving device 85 includes the tray 80. A moving device 85*k* including the tray 80*k* can be referred to as an example of a first moving device including a first support member. A moving device 85*m* including the tray 80*m* can be referred to as an example of a second moving device including a second support member.

Even when the toner cartridge 70 is at the retracted position, the tray 80 is coupled to the rotary body 90 (supported by the rotary body 90). To easily detach the toner cartridge 70 from the rotary body 90, it is preferable that the length by which the toner cartridge 70 projects from the rotary body 90 at the retracted position is large. Since the toner cartridge 70 is configured to be attachable to and detachable from the rotary body 90 via the tray 80, the toner cartridge 70 can be stably supported by the tray 80 even in the case where the length by which the toner cartridge 70 projects from the rotary body 90 is large.

The movement direction of the toner cartridge 70 in which the toner cartridge 70 moves from the attached position to the retracted position will be referred to as a retraction direction. In the present embodiment, the retraction direction of the toner cartridge 70 is a direction intersecting with the direction of the rotational axis 90C (Y direction). Therefore, as illustrated in FIGS. 7A and 7B, as viewed in the direction of the rotational axis 90C (Y direction), the retraction direction of the toner cartridge 70 is a direction orthogonal to the direction of the rotational axis 90C (Y direction). In addition, the retraction direction of the toner cartridge 70 can be referred to as a direction outward in the rotational radius direction of the rotary body 90, that is, a direction away from the rotational axis 90C.

As illustrated in FIGS. 7A and 7B, since the user detaches the toner cartridge 70 from the rotary body 90, it is preferable that the at least part of the toner cartridge 70 projects from the rotary body 90 at the time of detaching the toner cartridge 70. In the present embodiment, the entirety of the toner cartridge 70 projects from the rotary body 90 when the toner cartridge 70 is at the retracted position.

It can be said that when the rotary body 90 rotates about the rotational axis 90C, the rotational trajectory of the rotary body 90 matches a circumscribed circle of the rotary body 90 centered on the rotational axis 90C, that is, a virtual circle 90V indicated by a broken line in FIGS. 7A and 7B. When the toner cartridge 70 is at the retracted position, half the length or more of the toner cartridge 70 in the retracted direction is preferably outside the rotational trajectory of the rotary body 90. That is, as viewed in the rotational axis direction of the rotary, half the total length or more of the toner cartridge is preferably positioned outside the rotational trajectory of the rotary in the movement direction of the toner cartridge from the attached position to the retracted position. This applies to the toner cartridges 70 including the toner cartridge 70*k* serving as an example of the first cartridge and the toner cartridge 70*m* serving as an example of the second cartridge. In addition, in the present embodiment, the entirety of the toner cartridge 70 is outside the rotational trajectory (virtual circle 90V) of the rotary body 90 when the toner cartridge 70 is at the retracted position as illustrated in FIGS. 7A and 7B.

Further, to make it easier for the user to grab the toner cartridge 70, at least part of the toner cartridge 70 is preferably outside the image forming apparatus 1, that is, outside the apparatus body 1A when the toner cartridge 70 is at the retracted position. The outside of the apparatus mentioned herein refers to a space that is outside the image forming apparatus 1 (outside the apparatus body 1A) when the image forming apparatus 1 is used for, for example, an image forming operation on the sheet S.

In the present embodiment, the exterior surface of the apparatus body 1A is constituted by the exterior surface of the frame 16. That is, outside the apparatus can be also referred to as outside the frame 16. Therefore, a state in which at least part of the toner cartridge 70 is outside the apparatus can be also referred to as a state in which at least part of the toner cartridge 70 projects to the outside of the frame 16 through the opening 16*a* of the frame 16 of the apparatus body 1A.

In the present embodiment, when the door 14 is at the closed position, the opening 16*a* of the frame 16 of the apparatus body 1A is covered by the door 14. Further, the exterior surface 14*a* of the door 14 at the closed position constitutes part of the exterior surface of the apparatus body 1A. In this case, outside of the apparatus refers to the outside of the exterior surface 14*a* of the door 14 at the closed position. That is, in the case where the position of the exterior surface 14*a* of the door 14 at the closed position is referred to as an exterior position, at least part of the toner cartridge 70 is positioned more outward than the exterior position with respect to the apparatus body 1A when the toner cartridge 70 is at the retracted position.

In other words, at least part of the toner cartridge 70 is positioned in a space that would be outside the apparatus body 1A if the door 14 were at the closed position. Further, at least part of the toner cartridge 70 is positioned downstream of the exterior position in the retraction direction of the toner cartridge 70.

In addition, in the case where the side surface 16*b* having the opening 16*a* is the front surface of the apparatus body 1A, it can be said at least part of the toner cartridge 70 projects to the front side more than the exterior surface on the front side of the apparatus body 1A when the toner cartridge 70 is at the retracted position. In this case, the user can easily access the toner cartridge 70 from the front side of the image forming apparatus and replace the toner cartridge 70.

To be noted, when the toner cartridge 70 is at the retracted position, half the length or more of the toner cartridge 70 in the retraction direction is preferably outside the apparatus. That is, as viewed in the rotational axis direction of the rotary, half the total length or more of the toner cartridge is preferably positioned outside the body frame in the movement direction of the toner cartridge from the attached position to the retracted position in a state in which the toner cartridge is at the retracted position. This applies to the toner cartridges 70 including the toner cartridge 70*k* serving as an example of the first toner cartridge and the toner cartridge 70*m* serving as an example of the second toner cartridge. In addition, the entirety of the toner cartridge 70 is preferably outside the apparatus when the toner cartridge 70 is at the retracted position. To be noted, although the exterior surface 14*a* of the door 14 and the side surface 16*b* constitute the exterior surface on the front side of the apparatus body 1A in the present embodiment, the configuration of the door 14 is not limited to this. For example, the size of the door 14 may be set so as to cover the entirety of the side surface 16*b*. In this case, the exterior surface 14*a* of the door 14 constitutes the exterior surface on the front side of the apparatus body 1A.

The tray 80 includes a cartridge holding portion 81 illustrated in FIGS. 3 and 6C that holds the toner cartridge 70. The cartridge holding portion 81 is an attached portion to which the toner cartridge 70 is attached. When the tray 80 is at the detachment position, the entirety of the cartridge holding portion 81 is preferably outside the rotational trajectory of the rotary body 90 in the retraction direction. When the tray 80 is at the detachment position, half the length or more of the cartridge holding portion 81 is preferably outside the apparatus in the retraction direction.

Here, as described above, the toner cartridge 70*k* and the tray 80*k* are larger in size than the other toner cartridges 70*y* to 70*c* and the other trays 80*y* to 80*c*. Therefore, as illustrated in FIGS. 7A and 7B, in the present embodiment, the movement amount of the tray 80 in toner cartridge replacement is changed in accordance with the size of the toner cartridge 70.

Specifically, as illustrated in FIG. 7A, the movement distance of the tray 80*k* (first support member) from the accommodation position (first accommodation position) to the detachment position (first detachment position) is L1. The movement distance of the tray 80*m* (second support member) from the accommodation position to the detachment position (third detachment position) is L2. Although a state in which the toner cartridge 70*m* and the tray 80*m* are moved is illustrated in FIG. 7B, the movement distance of the trays 80*y* and 80*c* from the accommodation position to the detachment position is also L2. In this case, L1 is larger than L2. In other words, it can be said that the movement distance of the first support member in the case where the first toner cartridge moves from the first attached position to the first retracted position is larger than the movement distance of the second support member in the case where the second toner cartridge moves from the second attached position to the second retracted position.

In addition, as illustrated in FIG. 7A, in a state in which the tray 80*k* is at the detachment position and the toner cartridge 70*k* is at the retracted position, the toner cartridge 70*k* projects from the exterior surface of the apparatus body 1A to the outside of the apparatus by a distance P1. In the present embodiment, the tray 80*k* also projects from the exterior surface of the apparatus body 1A to the outside of the apparatus by the distance P1.

In addition, as illustrated in FIG. 7B, in a state in which the tray 80*m* is at the detachment position and the toner cartridge 70*m* is at the retracted position, the toner cartridge 70*m* projects from the exterior surface of the apparatus body 1A to the outside of the apparatus by a distance P2. In the present embodiment, the tray 80*m* also projects from the exterior surface of the apparatus body 1A to the outside of the apparatus by the distance P2. To be noted, the toner cartridges 70*y* and 70*c* also project from the exterior surface of the apparatus body 1A to the outside of the apparatus by the distance P2.

The distance P1 described above is larger than the distance P2. That is, the length by which the first toner cartridge at the first retracted position projects through the opening 16*a* of the apparatus body 1A will be referred to as a first length (P1), and the length by which the second toner cartridge at the second retracted position projects through the opening 16*a* will be referred to as a second length (P2). In this case, it can be said that the first length is larger than the second length.

It is more preferable in terms of strength that the distance P2 by which the toner cartridges 70*y* to 70*c* smaller in size than the toner cartridge 70*k* project to the outside of the apparatus at the retracted position is smaller than the distance P1 by which the toner cartridge 70*k* projects to the outside at the retracted position. The reason for this is as follows. When the toner cartridge 70 is at the retracted position, at least part of the toner cartridge 70 projects to the outside of the apparatus from the outside of the rotational trajectory of the rotary body 90 or the exterior surface of the apparatus body 1A. At this time, the tray 80 supports the weight of the toner cartridge 70 in a state in which one side thereof is supported by the rotary body 90. Therefore, reducing the distance P2 by which the toner cartridges 70*y* to 70*c* project to the outside of the apparatus at the retracted position can reduce the load on the trays 80*y* to 80*c* or guide portions 97 of the rotary body 90 supporting the trays 80*y* to 80*k*. In addition, since the toner cartridges 70*y* to 70*c* are smaller than the toner cartridge 70*k*, the operability in the cartridge replacement for the trays 80*y* to 80*c* can be maintained even if the distance P2 is set to be smaller than the distance P1.

Tray Arrangement in Rotary

Figure 9:
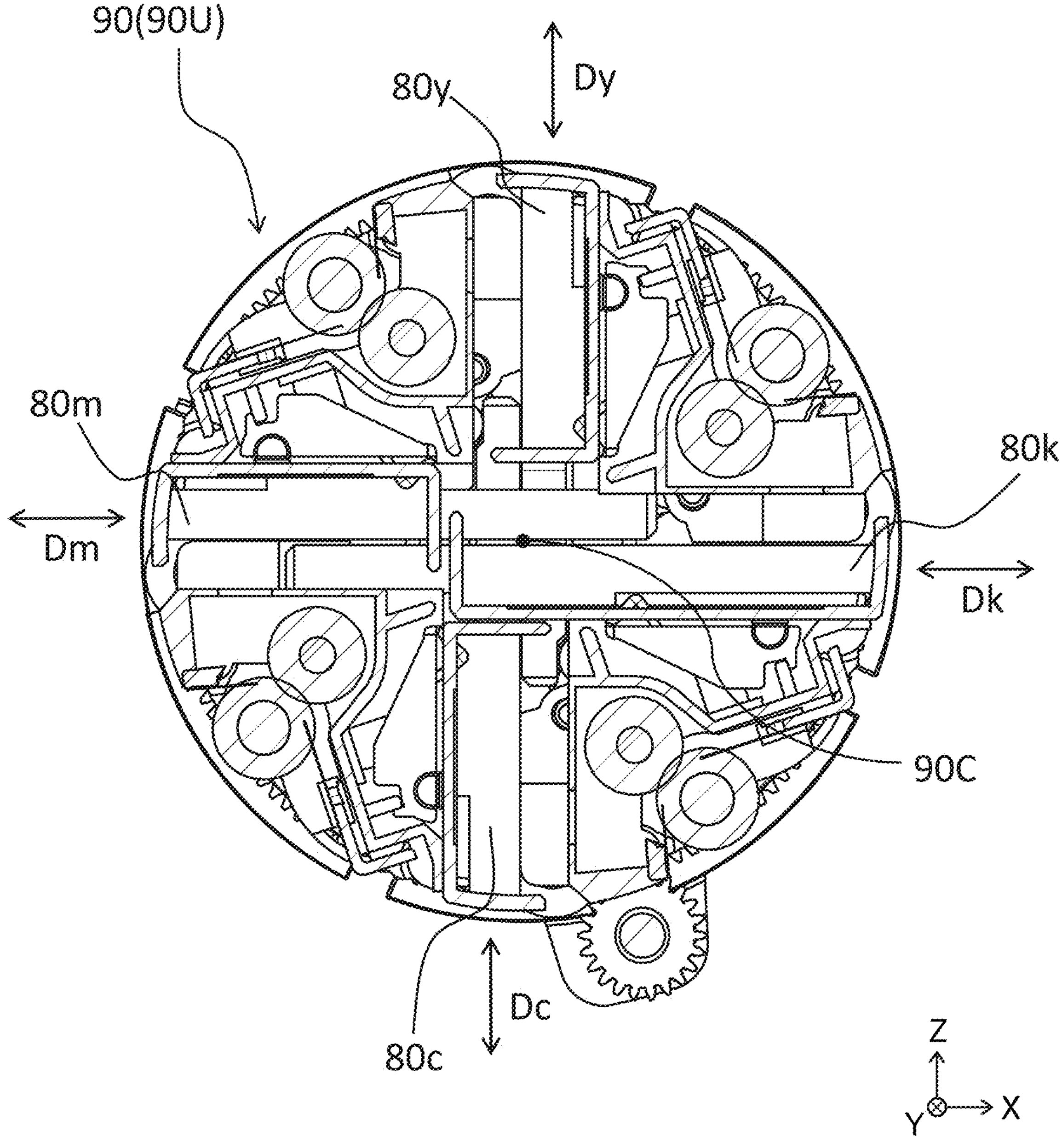
FIG. 9 is an explanatory diagram of the rotary body according to the first embodiment.
Figure 10:
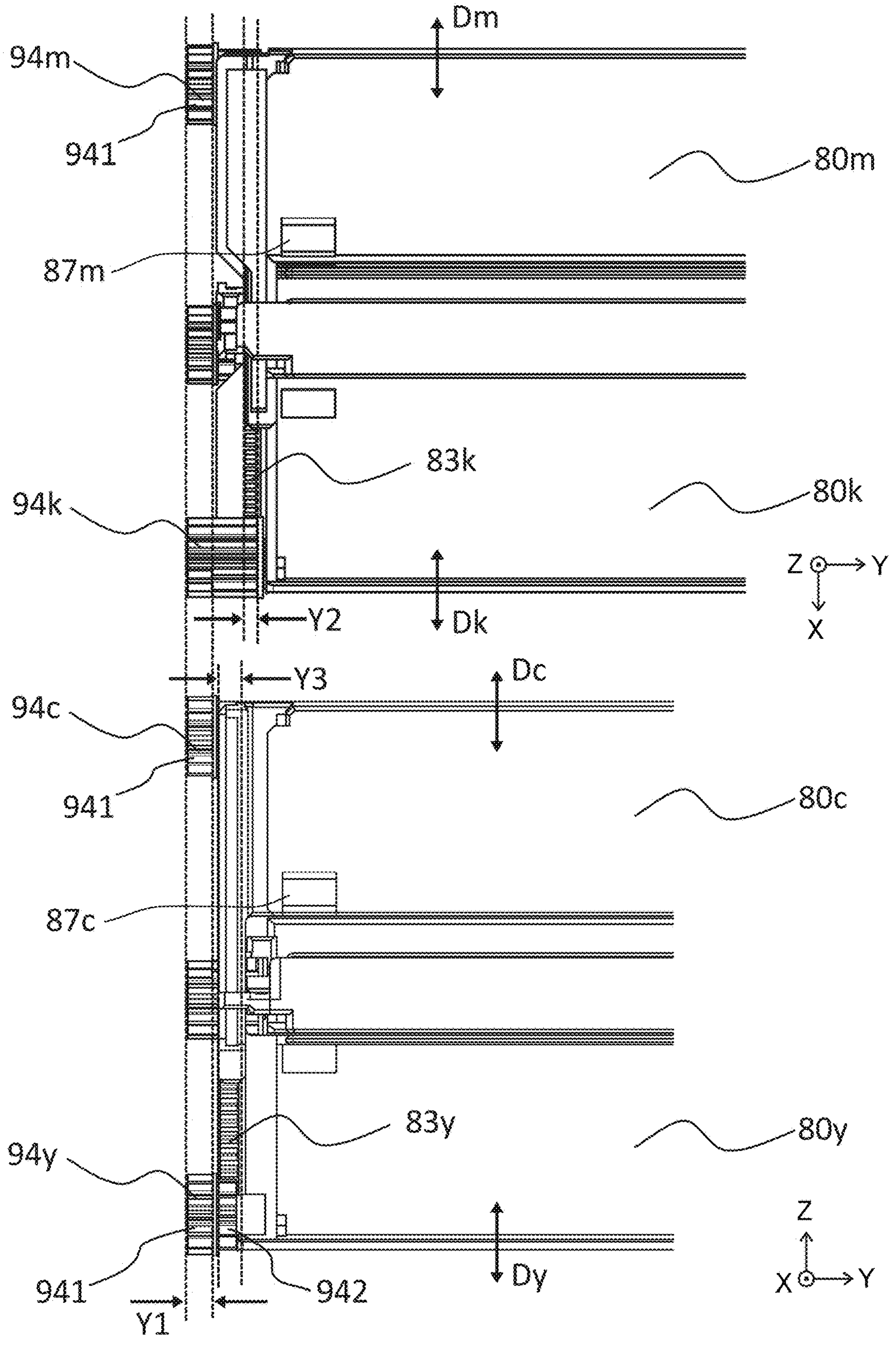
FIG. 10 is an explanatory diagram of the rotary body according to the first embodiment.

The arrangement of the trays 80*y* to 80*k* in the rotary body 90 will be described with reference to FIGS. 8, 9, and 10. FIG. 8 is a perspective view illustrating the arrangement of the trays 80*y* to 80*k* in the rotary body 90. FIG. 9 is a section view illustrating the arrangement of the trays 80*y* to 80*k* in the rotary body 90. FIG. 10 is a diagram illustrating the member arrangement of the trays 80*y* to 80*k* on one end side in the Y direction. To be noted, FIG. 9 illustrates a cross-section of the rotary body 90 taken along a virtual plane orthogonal to the rotational axis 90C of the rotary body 90. In addition, the top half of FIG. 10 is a diagram of the rotary body 90 and the trays 80*m* and 80*k* of FIG. 8 as viewed from the upper-right side (+Z side) of FIG. 8, and the lower half of FIG. 10 is a diagram of the rotary body 90 and the trays 80*c* and 80*y* of FIG. 8 as viewed from the left side (−X) side of FIG. 8.

As illustrated in FIG. 8, the trays 80*y* to 80*k* are respectively provided with cartridge holding portions 81*y* to 81*k* and guided portions 82*y* to 82*k*.

The toner cartridges 70*y* to 70*k* are respectively attached to the cartridge holding portions 81*y* to 81*k*. The cartridge holding portions 81*y* to 81*k* respectively accommodate at least part of the toner cartridges 70*y* to 70*k* attached thereto.

The guided portions 82*y* to 82*k* are provided at respective end portions of the trays 80*y* to 80*k* such that the cartridge holding portions 81*y* to 81*k* are each interposed therebetween in the Y direction. The guided portions 82*y* to 82*k* are each a thin and long member extending in a direction orthogonal to the rotational axis of the rotary body 90.

Figure 11A:
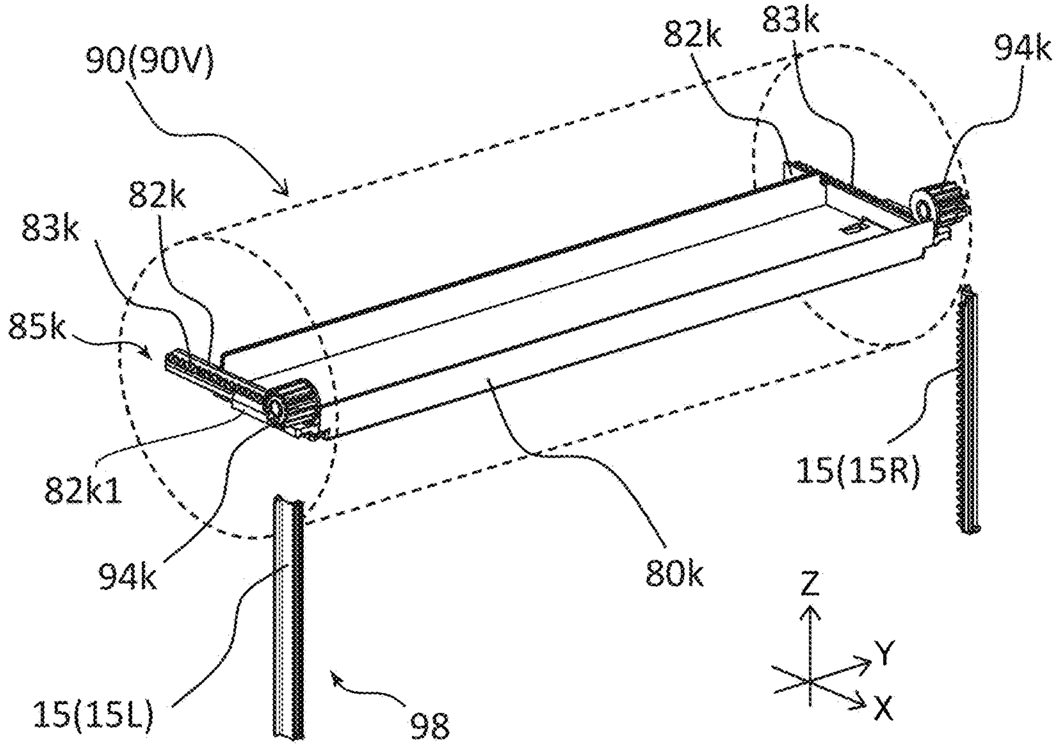
FIGS. 11A and 11B are each an explanatory diagram of elements related to the movement of the tray according to the first embodiment.
Figure 11B:
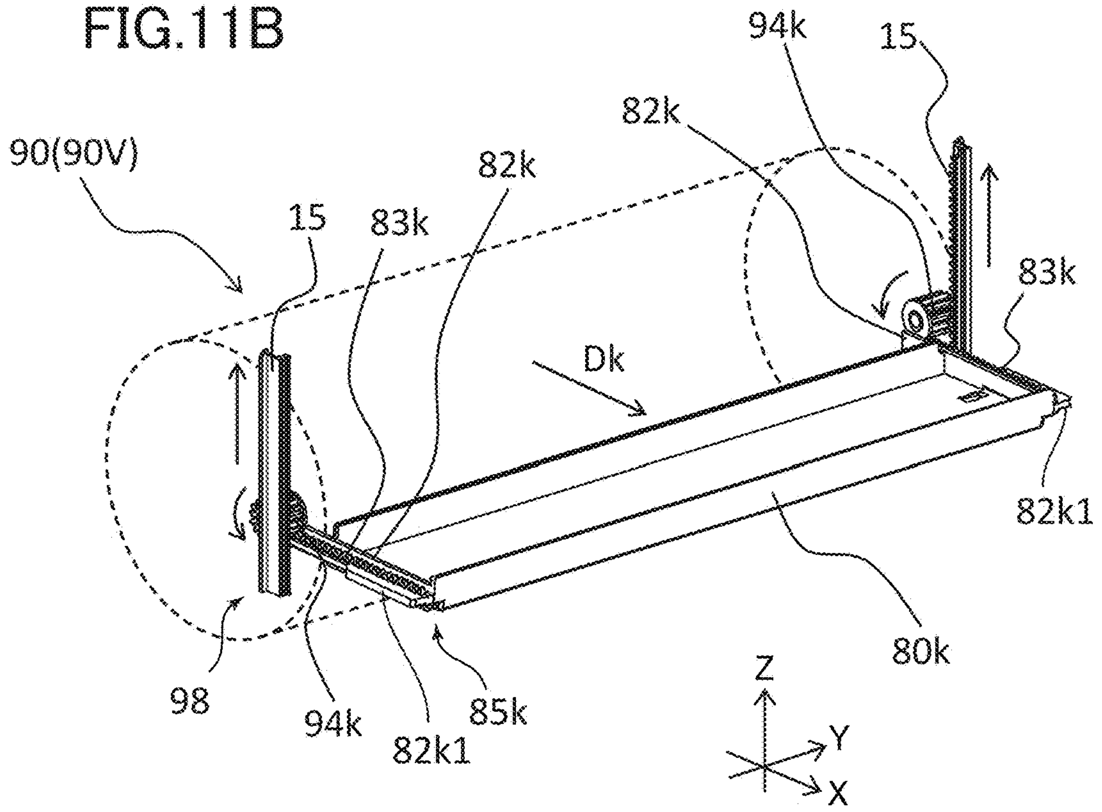

In the present embodiment, a reinforcing rib **82*k*1 is formed on part of the guided portion 82*k* in a movement direction Dk of the tray 80*k*, and a reinforcing rib 82*m*1 is formed on part of the guided portion 82*m* in a movement direction Dm of the tray 80*m* as illustrated in FIGS. 11A and 11B. The reinforcing ribs 82*k*1 and 82*m*1 are thin and long rib shapes (ridges) projecting outward in the Y direction from the guided portions 82*k* and 82*m* of the respective end portions of the trays 80*k* and 80*m* in the Y direction and extending in the movement directions Dk and Dm of the trays 80*k* and 80*m*. The reinforcing ribs 82*k*1 and 82*m*1 improve the stiffness of the guided portions 82*k* and 82*m***.

To be noted, although the lengths of the reinforcing ribs **82*m*1 and 82*k*1 in the present embodiment are restricted so as to avoid the guided portions 82*y* and 82*c*, the reinforcing ribs 82*m*1 and 82*k*1 may be provided for the entire lengths of the guided portions 82*m* and 82*k* unless interference with the guided portions 82*y* and 82*c* occurs. Reinforcing ribs may be added to the guided portions 82*y* and 82*c*. In addition, in the case where the stiffness of the guided portions 82*m* and 82*k* is sufficient, a configuration in which the reinforcing ribs 82*m*1 and 82*k*1** are not provided may be employed.

The guided portions **82*y* to 82*k* have rack portions (rack gears) 83*y* to 83*k* formed therein. In addition, pinion gears 94*y* to 94*k* are rotatably held in the rotary body 90. The pinion gears 94*y* to 94*k* are respectively engaged with the rack portions 83*y* to 83*k*** in a manner capable of transmitting a driving force.

The tray **80*y* is provided with one or more rack portions 83*y*. The rotary body 90 is provided with one or more pinion gears 94*y* corresponding to the one or more rack portions 83*y*. Similarly, the tray 80*m*, the tray 80*c*, and the tray 80*k* are respectively provided with one or more rack portions 83*m*, one or more rack portions 83*c*, and one or more rack portions 83*k*. The rotary body 90 is provided with one or more pinion gears 94*m* corresponding to the one or more rack portions 83*m*, one or more pinion gears 94*c* corresponding to the one or more rack portions 83*c*, and one or more pinion gears 94*k* corresponding to the one or more rack portions 83*k***.

The rack portions **83*y* to 83*k* and the pinion gears 94*y* to 94*k* are part of the moving devices 85*y* to 85*k* configured to move the toner cartridges 70*y* to 70*k* from the attached position to the retracted position. In addition, it can be said that the rack portions 83*y* to 83*k* and the pinion gears 94*y* to 94*k* are part of a driven device driven by the driving device 98 of the apparatus body 1A. It can be said that the pinion gears 94*y* to 94*k* are rotatable bodies (rotary members) that rotate to move the trays 80*y* to 80*k* with respect to the rotary body 90**.

The moving devices **85*y* to 85*k* are driven by the driving device 98 of the apparatus body. The pinion gears 94*y* to 94*k* and the rack portions 83*y* to 83*k* function as driven portions for the moving devices 85*y* to 85*k* of the rotary body 90 to receive the driving force from the driving device 98 of the apparatus body 1A. The pinion gear 94*k* and the rack portion 83*k* are examples of a first pinion gear and a first rack gear constituting at least part of a first driven portion included in a first moving device. The pinion gear 94*m* and the rack portion 83*m*** are examples of a second pinion gear and a second rack gear constituting at least part of a second driven portion included in a second moving device.

The rotary body 90 includes guide portions 97 illustrated in FIGS. 7A and 7B that respectively engage with the guided portions **82*y* to 82*k*. FIG. 7A illustrates the guide portion 97 (97*k*) that engages with the guided portion 82*k* of the tray 80*k*, and FIG. 7B illustrates the guide portion 97 (97*m*) that engages with the guided portion 82*m* of the tray 80*m*. The rotary body 90 includes similar guide portions that respectively engage with the guided portions 82*y* and 82*c* of the trays 80*y* and 80*c*. In addition, although the guide portions 97 provided on one side (+Y side) of the rotary body 90 in the Y direction are illustrated in FIGS. 7A and 7B, similar guide portions 97 are also provided on the other side (−Y side) of the rotary body 90** in the Y direction.

When the tray 80 moves between the accommodation position and the detachment position, the guide portion 97 maintains the state of engaging with the guided portion 82 in at least part of the movement range, and guides the movement direction of the tray 80. In the present embodiment, the guide portion 97 maintains the state of engaging with the guided portion **82*k* in the entirety of the movement range of the tray 80*k* between the accommodation position and the detachment position. In addition, in the present embodiment, the guide portion 97 maintains the state of engaging with the guided portion 82*m* in the entirety of the movement range of the tray 80*m*** between the accommodation position and the detachment position.

In addition, as illustrated in FIGS. 8 and 9, the four trays **80*y* to 80*k* are disposed in the rotary body 90** so as to overlap each other as will be described in detail below.

When the pinion gears **94*y* to 94*k* rotate, the rack portions 83*y* to 83*k* and the trays 80*y* to 80*k* move with respect to the rotary body 90. As illustrated in FIG. 9, the four trays 80*y* to 80*k* are arranged such that the movement directions thereof with respect to the rotary body 90 are rotated by 90° from each other. Therefore, the tray 80*y* and the tray 80*c* are held so as to be slidable in substantially the same direction (parallel directions) as each other, and the tray 80*m* and the tray 80*k* are held so as to be slidable in substantially the same direction (parallel directions) as each other. The movement directions of sliding of the trays 80*y* to 80*k* are regulated by the engagement between the guide portions 97 and the guided portions 82*y* to 82*k*** described above.

To be noted, the trays **80*y* to 80*k* move to the outside of the apparatus through the opening 16*a*. When the trays 80*y* to 80*k* each move to the outside of the apparatus through the opening 16*a***, the movement directions of the trays are substantially the same (parallel).

As illustrated in FIG. 9, the trays are disposed such that with respect to the movement direction Dk of the tray **80*k*, the range in which the tray 80*k* is disposed overlaps with the range in which the tray 80*y* is disposed and the range in which the tray 80*c*. In addition, with respect to the movement direction Dk of the tray 80*k*, the range in which the tray 80*k* is disposed overlaps with the rotational axis 90C of the rotary body 90. That is, it can be said that the toner cartridge 70*k* held by the cartridge holding portion 81*k* of the tray 80*k* overlaps with the rotational axis 90C of the rotary body 90 illustrated in FIG. 4**B.

In contrast, the trays are disposed in a displaced manner such that with respect to the movement direction Dm of the tray **80*m*, the range in which the tray 80*m* is disposed does not overlap with the range in which the tray 80*y* is disposed and the range in which the tray 80*c* is disposed. Further, the trays are disposed in a displaced manner such that with respect to a movement direction Dy of the tray 80*y*, the range in which the tray 80*y* is disposed does not overlap with the range in which the tray 80*m* is disposed and the range in which the tray 80*k* is disposed. Similarly, the trays are disposed in a displaced manner such that with respect to a movement direction Dc of the tray 80*c*, the range in which the tray 80***c* is disposed does not overlap with the range in which the tray 80*m* is disposed and the range in which the tray 80*k* is disposed.

The positional relationship between the trays 80 can be also expressed as follows. As viewed in the movement direction Dy of the tray 80*y*, the tray 80*y* and the tray 80*k* overlap with each other, but the tray 80*y* and the tray 80*m* do not overlap with each other. As viewed in the movement direction Dm of the tray 80*m*, the tray 80*m* and the tray 80*k* overlap with each other, but the tray 80*m* and the trays 80*y* and 80*c* do not overlap with each other. As viewed in the movement direction Dc of the tray 80*c*, the tray 80*c* and the tray 80*k* overlap with each other, but the tray 80*c* and the tray 80*m* do not overlap with each other.

Here, two elements (such as members, parts, and units) overlapping as viewed in a specific direction refers to a projected region of one element and a projected region of the other element at least partially overlapping with each other in the case where the elements are orthogonally projected onto a virtual plane orthogonal to the specific direction.

As illustrated in FIGS. 8 and 10, with respect to the direction of the rotational axis 90C (Y direction), a range in which the rack portion 83*m* and the guided portion 82*m* are disposed and a range in which the rack portion 83*k* and the guided portion 82*k* are disposed overlap with each other at least partially. That is, in the present embodiment, it can be said that with respect to the rotational axis direction of the rotary (Y direction), a range in which the first rack gear (rack portion 83*k*) is disposed and a range in which the second rack gear (rack portion 83*m*) is disposed overlap with each other at least partially. Therefore, as compared with a layout in which the rack portion 83*m* and the guided portion 82*m* do not overlap with the rack portion 83*k* and the guided portion 82*k*, the rack portions 83*m* and 83*k* and the guided portions 82*m* and 82*k* can be arranged in a smaller space in the Y direction.

With respect to the direction of the rotational axis 90C (Y direction), a range in which the rack portion 83*y* and the guided portion 82*y* are disposed and a range in which the rack portion 83*c* and the guided portion 82*c* are disposed overlap with each other at least partially. That is, in the present embodiment, it can be said that with respect to the rotational axis direction of the rotary (Y direction), a range in which the third rack gear (rack portion 83*y*) is disposed and a range in which the fourth rack gear (rack portion 83*c*) is disposed overlap with each other at least partially. Therefore, as compared with a layout in which the rack portion 83*y* and the guided portion 82*y* do not overlap with the rack portion 83*c* and the guided portion 82*c*, the rack portions 83*y* and 83*c* and the guided portions 82*y* and 82*c* can be arranged in a smaller space in the Y direction.

Here, an engagement position between the rack portion 83 and the pinion gear 94 will be described with reference to FIG. 10. A top half portion of FIG. 10 illustrates an engagement position between the rack portion 83*k* and the pinion gear 94*k*. A lower half portion of FIG. 10 illustrates an engagement position between the rack portion 83*y* and the pinion gear 94*y*.

In a region Y1 in the drawings in the direction of the rotational axis 90C of the rotary body 90 (Y direction), the driving force transmitted from the motor M2 illustrated in FIG. 2 serving as a drive source to a transmission device that will be described below is transmitted to the pinion gears 94*y* to 94*k*. In a region Y2 in the drawings in the Y direction, the pinion gear 94*k* is engaged with the rack portion 83*k* in a manner capable of transmitting the driving force. In a region Y3 in the drawings in the Y direction, the pinion gear 94*y* is engaged with the rack portion 83*y* in a manner capable of transmitting the driving force. To be noted, the rack portion 83*m* is engaged with the pinion gear 94*m* illustrated in FIG. 8 in the region Y2 similarly to the rack portion 83*k* in a manner capable of transmitting the driving force. The rack portion 83*c* is engaged with the pinion gear 94*c* illustrated in FIG. 8 in the region Y3 similarly to the rack portion 83*y* in a manner capable of transmitting the driving force.

Here, the regions Y2 and Y3 are at different positions in the Y direction, that is, are displaced from each other in the Y direction. In addition, the region Y1 is at a position different from both the regions Y2 and Y3 in the Y direction. That is, the region Y1 is displaced from the regions Y2 and Y3 in the Y direction.

Further, in a state in which the toner cartridges 70*y* and 70*c* are at the attached position, with respect to a movement direction of the rack portion 83*y* (movement direction Dy of the tray 80*y*), a range in which the rack portion 83*y* is disposed and a range in which the rack portion 83*c* is disposed overlap with each other at least partially. In the present embodiment, since the movement directions Dy and Dc of the trays 80*y* and 80*c* are substantially the same (parallel), also with respect to the movement direction Dc of the tray 80*c*, a range in which the rack portion 83*y* is disposed and a range in which the rack portion 83*c* is disposed overlap with each other at least partially. Therefore, in a state in which the toner cartridges 70*y* and 70*c* are at the attached position, the tooth surface of the rack portion 83*y* faces the tooth surface of the rack portion 83*c* in a direction (left-right direction of FIG. 8) orthogonal to the movement directions Dy and Dc of the rack portions 83*y* and 83*c*.

Further, in a state in which the toner cartridges 70*m* and 70*k* are at the attached position, with respect to a movement direction of the rack portion 83*m* (movement direction Dm of the tray 80*m*), a range in which the rack portion 83*m* is disposed and a range in which the rack portion 83*k* is disposed overlap with each other at least partially. In the present embodiment, since the movement directions Dm and Dk of the trays 80*m* and 80*k* are substantially the same (parallel), also with respect to the movement direction Dk of the tray 80*k*, a range in which the rack portion 83*m* is disposed and a range in which the rack portion 83*k* is disposed overlap with each other at least partially. Therefore, in a state in which the toner cartridges 70*m* and 70*k* are at the attached position, the tooth surface of the rack portion 83*m* faces the tooth surface of the rack portion 83*k* in a direction (up-down direction of FIG. 8) orthogonal to the movement directions Dm and Dk of the rack portions 83*m* and 83*k*.

Figure 12A:
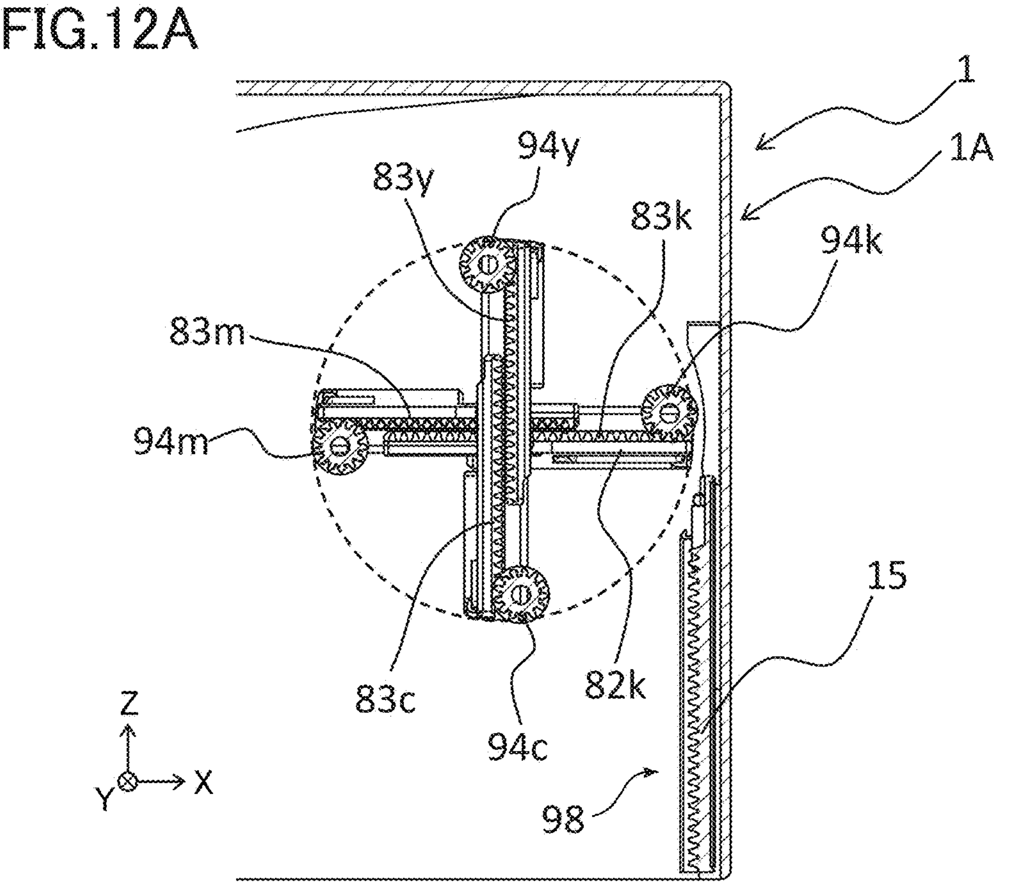
FIGS. 12A and 12B are each an explanatory diagram of elements related to the movement of the tray according to the first embodiment.

In addition, as also illustrated in FIG. 12A that will be described later, the rack portion 83*y* overlaps with the rack portions 83*m* and 83*k* as viewed in the direction (Y direction) of the rotational axis 90C. As viewed in the direction (Y direction) of the rotational axis 90C, the rack portion 83*m* overlaps with the rack portions 83*y* and 83*c*. As viewed in the direction (Y direction) of the rotational axis 90C, the rack portions 83*c* and 83*m* overlap with the rack portion 83*k*. As viewed in the direction of the rotational axis 90C (Y direction), the rack portions 83*k* and 83*y* overlap with the rack portion 83*c*. In other words, it can be said that with respect to the rotational axis direction of the rotary (Y direction), a range in which the first rack gear (rack portion 83*k*) is disposed does not overlap with a range in which the second rack gear (rack portion 83*y*) is disposed. In addition, it can be said that, as viewed in the rotational axis direction of the rotary (Y direction), in a state in which the first toner cartridge 70*k* is at the first attached position and the second toner cartridge 70*y* is at the second attached position, the first rack gear (rack portion 83*k*) and the second rack gear (rack portion 83*y*) overlap with each other.

As described above, since the positions where the rack portions 83*k* and 83*m* are disposed and the positions where the rack portions 83*y* and 83*c* are disposed are different in the Y direction, the rack portions can be arranged such that the rack portions 83*y* and 83*c* overlap with the rack portions 83*m* and 83*k* as viewed in the Y direction.

As a result of this, the space for arranging the four trays in the rotary body 90 can be reduced, and thus the size of the rotary body 90 in the rotational radius direction can be reduced. That is, when it is attempted to arrange the rack portions 83 such that the movement distances of the trays 80*y* to 80*k* are equivalent to those of the present embodiment and the rack portions 83 do not overlap with each other as viewed in the Y direction, the area required for the arrangement of the four rack portions is large as viewed in the Y direction. As compared with such a configuration, as a result of arranging the plurality of rack portions 83 in a displaced manner in the Y direction such that the rack portions 83 overlap with each other as viewed in the Y direction, the installation area for the rack portions 83 as viewed in the Y direction can be reduced.

In addition, in the present embodiment, two pairs of two of the four rack portions 83*y* to 83*k* are arranged in a displaced manner in the Y direction. That is, it can be said that with respect to in the rotational axis direction of the rotary (Y direction), the range in which the first rack gear is disposed and the range in which the second rack gear is disposed overlap with each other, and the range in which the third rack gear is disposed and the range in which the fourth rack gear is disposed overlap with each other. In addition, it can be said that with respect to the Y direction, the range in which the first rack gear and the second rack gear are disposed does not overlap with the range in which the third rack gear and the fourth rack gear are disposed. As a result of this, the size of the rotary body 90 in the Y direction can be reduced as compared with a case where all the four rack portions 83*y* to 83*k* are arranged in a displaced manner in the Y direction.

Moving Elements of Tray

Figure 12B:
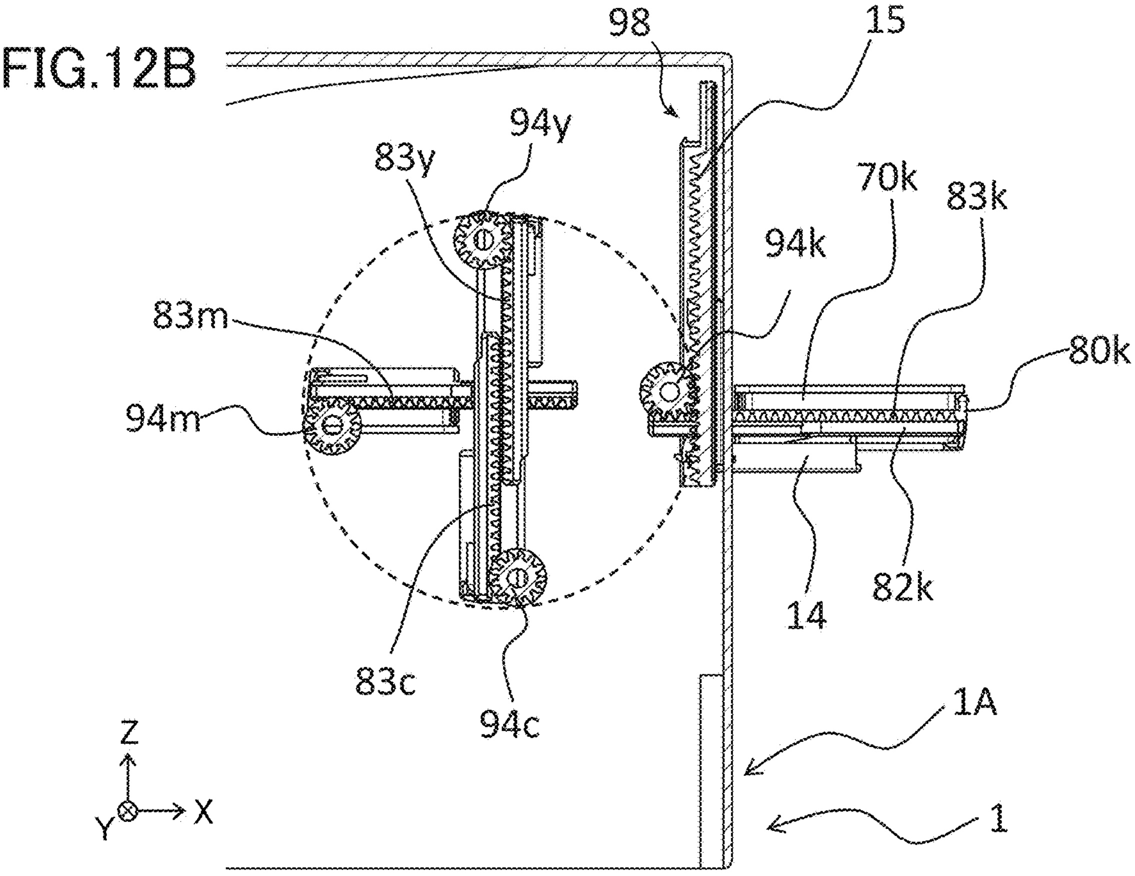

Elements related to the movement of the trays 80*y* to 80*k* disposed in the rotary body 90 will be described with reference to FIGS. 11A, 11B, 12A, and 12B. FIGS. 11A and 11B are each a perspective view of elements related to the movement of the tray 80*k*. FIGS. 12A and 12B are each a section view of elements related to the movement of the tray 80*k*.

In the present embodiment, the trays 80*y* to 80*k* are respectively driven by receiving the driving force of the motor M2 transmitted to the pinion gears 94*y* to 94*k* via the driving racks 15L and 15R serving as transmission devices. Here, the elements for moving the tray 80*k* with respect to the rotary body 90 will be described, and since the elements for moving the trays 80*y* to 80*c* with respect to the rotary body 90 are substantially the same as the elements for moving the tray 80*k*, description thereof will be omitted.

FIG. 11A illustrates a state in which the tray 80*k* is inside the rotary body 90, that is, in a state in which the toner cartridge 70*k* is attached to the developing unit 50*k*. That is, FIG. 11A illustrates a state in which the tray 80*k* is at the accommodation position, and corresponds to a state in which the toner cartridge 70*k* is at the attached position with respect to the developing frame 53*k* illustrated in FIG. 4A. FIG. 11B illustrates a state in which the tray 80*k* has slid to the outside of the rotary body 90. That is, FIG. 11B illustrates a state in which the tray 80*k* is at the detachment position, and corresponds to a state in which the toner cartridge 70*k* is at the retracted position with respect to the developing frame 53*k* illustrated in FIG. 4A.

The apparatus body 1A of the present embodiment includes the driving racks 15L and 15R serving as driving gears that drive the pinion gears 94. The driving racks 15L and 15R are each driven by the motor M2 via the transmission portion 15*t*. As illustrated in FIG. 11A, in a state in which the tray 80*k* is inside the rotary body 90 (that is, in a state in which the toner cartridge 70*k* is attached to the developing unit 50*k*), the driving racks 15L and 15R are at non-engagement positions separated from the pinion gears 94*k*. The driving racks 15L and 15R move from the non-engagement positions and engage with the pinion gears 94*k* so that the tray 80*k* is moved from the accommodation position to the detachment position and the toner cartridge 70*k* is moved from the attached position to the retracted position.

As described above, two rack portions 83*k* are formed at respective end portions of the tray 80*k* in the Y direction. Two pinion gears 94*k* and the driving racks 15L and 15R are disposed at positions respectively corresponding to the rack portions 83*k* at the respective end portions. That is, the apparatus body 1A of the present embodiment includes the driving racks 15L and 15R serving as the first driving gear and the second driving gear. It can be said that the driving rack 15L is an example of a first driving gear, and the driving rack 15R is an example of a second driving gear.

However, this numbering is merely used for the sake of convenience of description, and can be appropriately interchanged in principle. In the case where there is no need to distinguish the driving racks 15L and 15R from each other, the driving racks will be each described as a "driving rack 15".

The rack portions 83 of the present embodiment are configured as a pair of rack gears, and the pinion gears 94 of the present embodiment are configured as a pair of pinion gears. The pair of rack gears and the pair of pinion gears are disposed on the two end sides (i.e., one end side and the other end side) of the support member (tray 80) in the Y direction in the present embodiment, but the pair of rack gears and the pair of pinion gears may be disposed at other positions. The rack portions 83*k* and the pinion gears 94*k* of the moving device 85*k* corresponding to the tray 80*k* can be respectively referred to as examples of a first pair of rack gears and a first pair of pinion gears.

The rack portions 83*y* to 83*c* and the pinion gears 94*y* to 94*c* of the moving devices 85*y* to 85*c* respectively corresponding to any one of the other trays 80*y* to 80*c* can be respectively referred to as examples of second pairs of rack gears and second pairs of pinion gear.

One of the pair of rack gears engages with one of the pair of pinion gears, and the other of the pair of rack gears engages with the other of the pair of pinion gears. At least one of the pair of pinion gears is driven by the driving rack 15L serving as a first driving rack. In the present embodiment, two of the pair of pinion gears are simultaneously driven by the driving racks 15L and 15R serving as a first driving rack and a second driving rack. As a result of this, rotation of the tray 80 is less likely to occur, and thus stable movement of the toner cartridge 70 is made possible. To be noted, a configuration in which the tray 80 includes one rack portion 83 and is moved by one driving rack 15 via one pinion gear 94 may be employed.

The tray 80*k* is held to be slidable in a direction parallel to the guided portion 82*k* (that is, the movement direction Dk) with respect to the rotary body 90. The driving rack 15 is held to be slidable in a direction intersecting with the movement direction Dk of the tray 80*k* with respect to the apparatus body 1A. The driving rack 15 is configured to slide (reciprocate) in a first direction (vertically upward direction in the present embodiment) and a second direction (vertically downward direction in the present embodiment) opposite to the first direction, with respect to the apparatus body 1A. That is, the movement direction of the driving rack 15 of the present embodiment is a direction intersecting with (preferably orthogonal to) both the movement direction Dk of the tray 80*k* and the direction of the rotational axis 90C of the rotary body 90 (Y direction).

A tray moving operation of sliding the tray 80*k* between the accommodation position and the detachment position will be described with reference to FIGS. 11A and 11B. The tray moving operation of the tray 80*k* is performed by the motor M2 illustrated in FIG. 2, the transmission portion 15*t*, the driving rack 15, the pinion gear 94*k*, and the rack portion 83*k*.

First, a tray moving operation (tray pull-out operation) of detaching the toner cartridge 70*k* from the rotary body 90 will be described. In a state before the tray pull-out operation is started, the driving rack 15 illustrated in FIG. 11A is positioned below a position where the driving rack 15 engages with the pinion gear 94*k*. In addition, as described above, in the replacement operation of the toner cartridge 70*k*, the rotary body 90 takes the replacement posture illustrated in FIG. 4B for the toner cartridge 70*k*.

When the tray pull-out operation is started, the driving racks 15 are slid upward with respect to the apparatus body 1A by the driving force of the motor M2. In the course of movement of the driving racks 15, the driving racks 15 engage with the pinion gears 94*k*, and the pinion gears 94*k* are rotationally driven.

As illustrated in FIG. 11B, the pinion gears 94*k* are rotationally driven in an arrow direction in FIG. 11B, and thus the driving force is input to the rack portions 83*k* engaged with the pinion gears 94*k*. As a result of this, the tray 80*k* is pushed to the outside of the apparatus, and moves from the accommodation position to the detachment position with respect to the rotary body 90. The movement direction of the tray 80*k* in this movement is guided to the predetermined movement direction Dk by the engagement between the guided portion 82*k* and the guide portion 97*k* of the rotary body 90 illustrated in FIG. 7A. As a result of the tray 80*k* moving from the accommodation position to the detachment position, the toner cartridge 70*k* is moved from the attached position to the retracted position with respect to the developing unit 50*k*.

In a state in which the tray 80*k* is positioned at the detachment position and the toner cartridge 70*k* is positioned at the retracted position, the user can attach and detach the toner cartridge 70*k* to and from the tray 80*k*.

The tray moving operation (tray pull-in operation or tray insertion operation) at the time of attaching the toner cartridge 70 to the rotary body 90 is performed in a process reversed from the tray pull-out operation. For example, the tray pull-in operation is started in response to the user operating a predetermined operation portion. When the tray pull-in operation is started, the driving racks 15 are slid downward with respect to the apparatus body 1A by the driving force of the motor M2. Here, the rotational direction of the motor M2 in the tray pull-in operation is opposite to that in the tray pull-out operation.

As a result of the pinion gears 94*k* being rotationally driven in a direction opposite to the arrow of FIG. 11B, the driving force is input to the rack portions 83*k* engaged with the pinion gears 94*k*. As a result of this, the tray 80*k* is pulled into the apparatus, and moves from the detachment position to the accommodation position with respect to the rotary body 90.

The movement direction of the tray 80*k* is guided to the movement direction Dk opposite to the arrow of FIG. 11B by the engagement between the guided portion 82*k* and the guide portion 97*k* of the rotary body 90. As a result of the tray 80*k* moving from the detachment position to the accommodation position, the toner cartridge 70*k* is moved from the retracted position to the attached position with respect to the developing unit 50*k*.

Movement of the tray 80*k* and the toner cartridge 70*k* for black has been described above, and movement of the other trays 80*y* to 80*c* and toner cartridges 70*y* to 70*c* is also performed by a similar mechanism. That is, the driving racks 15 transmit drive to the pinion gears 94*y* to 94*c* in respective replacement postures of the toner cartridges.

The motor M2 provided in the apparatus body 1A and the transmission device including the driving racks 15 (15L and 15R) and the transmission portion 15*t* constitute the driving device 98 for driving the moving devices 85 provided in the rotary body 90.

As described above, in the present embodiment, a plurality of moving devices 85*y* to 85*k* corresponding to the plurality of toner cartridges 70*k* to 70*y* are disposed in the rotary body 90. The driving device 98 of the apparatus body 1A is a common driving device that drives the plurality of moving devices 85*y* to 85*k* (plurality of driven devices) of the rotary body 90.

In addition, in the present embodiment, the driving target of the driving device 98 switches in accordance with the rotation of the rotary body 90. In other words, the driving device of the present embodiment includes the driving racks 15 each serving as a transmission member that transmits the driving force of the drive source. The driving device can take a state in which the transmission member engages with a first driven portion (e.g., pinion gear 94*k*) in a manner capable of transmitting the driving force and a state in which the transmission member engages with a second driven portion (e.g., pinion gear 94*m*) in a manner capable of transmitting the driving force. In addition, the driving device can take a state in which the transmission member is disengaged from the first driven portion and the second driven portion.

As described above, the pinion gears 94*y* to 94*k* are held by the rotary body 90. Therefore, when the rotary body 90 rotates, it is preferable that the engagement between the driving racks 15 and the pinion gears 94*y* to 94*k* is released.

FIG. 12A illustrates a state in which the tray 80*k* is inside the rotary body 90, that is, a state in which the tray 80*k* is at the accommodation position. FIG. 12B illustrates a state in which the tray 80*k* has moved to the outside of the rotary body 90, that is, a state in which the tray 80*k* has moved to the detachment position.

As illustrated in FIG. 12A, when the tray 80*k* is inside the rotary body 90, the driving racks 15 are positioned in a lower portion in the apparatus body 1A. At this time, the driving racks 15 are retracted from the pinion gears 94*k*. Therefore, the rotary body 90 can be rotated without being interrupted by the driving racks 15. More specifically, the driving racks 15 can be retracted to the outside of the rotational trajectory of the rotary body 90 indicated by dotted lines in FIGS. 12A and 12B.

As described above, by rotationally driving the motor M2 in a normal direction and a reverse direction, the tray 80 attached to the rotary body 90 can be moved from the accommodation position to the detachment position and from the detachment position to the accommodation position with respect to the rotary body 90. That is, the driving device of the present embodiment can drive the moving devices such that not only the toner cartridges move from the attached position to the retracted position but also the toner cartridges move from the retracted position to the attached position.

Here, as described above, in the present embodiment, the movement amount of the tray 80 in toner cartridge replacement is changed in accordance with the size of the toner cartridge 70. Specifically, the movement distance L1 of the movement of the black tray 80*k* from the accommodation position to the detachment position is larger than the movement distance L2 of the movement of the other trays 80*y* to 80*c* from the accommodation position to the detachment position as illustrated in FIGS. 7A and 7B.

Therefore, in the present embodiment, when moving the toner cartridges 70*y* to 70*k* from the attached position to the retracted position, a value obtained by dividing the speed of the rack portions 83*k* by the speed of the driving racks 15 is larger than a value obtained by dividing the speed of the rack portions 83*y* to 83*c* by the speed of the driving racks 15.

For example, as illustrated in FIG. 10, the pinion gear 94*y* is formed as a stepped gear including a large-diameter gear 941 that engages with the driving rack 15 and a small-diameter gear 942 that has a smaller pitch radius than the large-diameter gear 941 and engages with the rack portion 83*y*. The pinion gears 94*m* and 94*c* are formed as similar stepped gears. In contrast, the pinion gear 94*k* is formed such that a portion thereof that engages with the driving rack 15 and a portion thereof that engages with the rack portion 83*k* have the same pitch radius. In this case, the pitch radius of the pinion gear 94*k* can be equal to the pitch radius of the large-diameter gear 941 of the pinion gears 94*y* to 94*c*. According to this configuration, the movement distance of the rack portions 83*k* can be made larger than the movement distance of the other rack portions 83*y* to 83*c* even in the case where the movement distance of the driving racks 15 is the same. That is, the movement distance L1 of the movement of the black tray 80*k* from the accommodation position to the detachment position can be made larger than the movement distance L2 of the movement of the other trays 80*y* to 80*c* from the accommodation position to the detachment position.

In addition, by forming the pinion gears 94*y* to 94*c* as stepped gears, the movement distance L1 of the tray 80*k* can be made larger than the movement distance L2 of the other trays 80*y* to 80*c* even in the configuration in which the pinion gears 94*y* to 94*k* receive the driving force from the same driving racks 15.

To be noted, the pinion gear 94*k* may be formed as a stepped gear instead of (or in combination with) the configuration in which the pinion gears 94*y* to 94*c* are formed as stepped gears. In this case, a portion of the pinion gear 94*k* that engages with the driving rack 15 may be formed as a small-diameter gear, and a portion of the pinion gear 94*k* that engages with the rack portion 83*k* may be formed as a large-diameter gear having a larger pitch radius than the small-diameter gear. In addition, the stepped gear is an example of a speed reduction mechanism, and may be replaced by a known speed reduction mechanism that makes the movement amount of a member on the input side (drive source side) smaller than a movement amount of a member on the output side (tray 80 side).

In addition, the movement amount of the driving rack 15 when the toner cartridge 70*k* moves from the attached position to the retracted position may be made larger than the movement amount of the driving rack 15 when the toner cartridges 70*y* to 70*c* move from the attached position to the retracted position.

Incidentally, in the case where the distance of the movement of the toner cartridge 70 from the attached position to the retracted position is smaller, the movement time of the toner cartridge 70 can be made shorter, and the time in which the user waits for the toner cartridge 70 to move can be made shorter. If a configuration in which the movement amount of the driving racks 15 for the toner cartridge 70*k* is larger than the movement amount of the driving racks 15 for the toner cartridges 70*y* to 70*c* is employed as described above, the time in which the user waits for the toner cartridges 70*y* to 70*c* to move can be made shorter.

According to the configurations described above, the movement distance L1 can be made larger than the movement distance L2. These configurations may be employed in combination.

Modification Example

Although a configuration in which the driven portion includes the pinion gears 94 that engage with both the driving racks 15 and the rack portions 83 has been described, the driven portion may include a gear that engages with the driving rack 15 and a gear that engages with the rack portion 83.

In addition, the configuration of the moving device 85 that move the tray 80 is not limited to a so-called rack-and-pinion configuration. For example, the member corresponding to the pinion gear 94 may be replaced by a roller that receives the drive of the motor M2 to rotate, and the tray 80 may be moved by friction between the roller and the tray 80.

In addition, in the case of using the roller that receives the drive of the motor M2 to rotate, the roller may be brought into contact with the toner cartridge 70. In this case, the toner cartridges 70*y* to 70*k* can be made directly attachable to and detachable from the rotary body 90 without using the trays 80*y* to 80*k*. In this case, the moving device 85 is constituted by a roller.

Figure 33A:
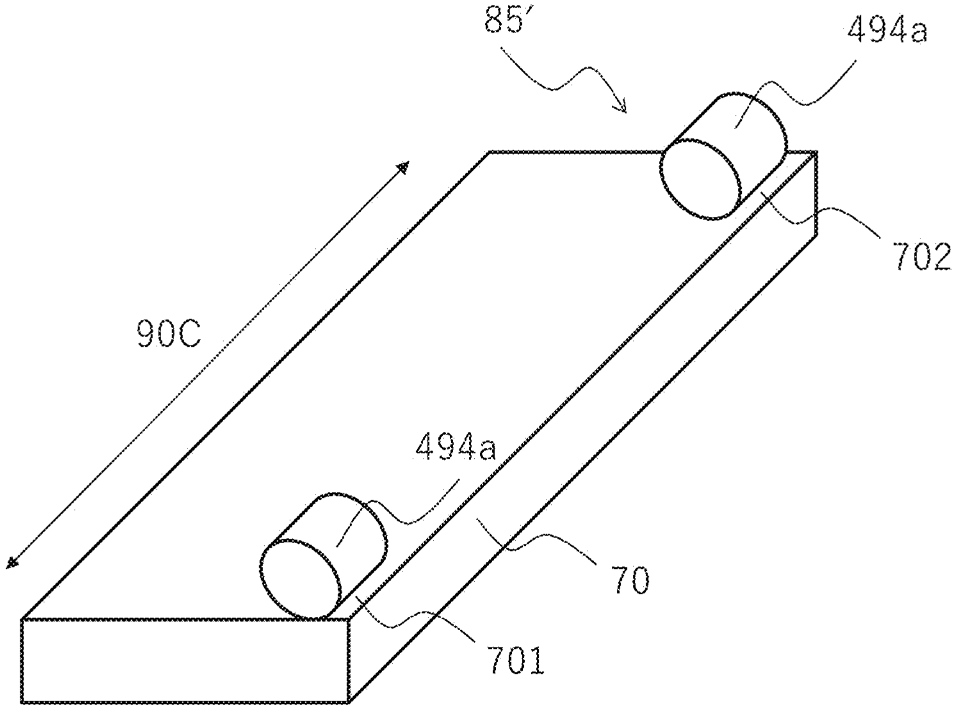
FIGS. 33A and 33B are each a diagram illustrating a moving device according to a modification example.
Figure 33B:
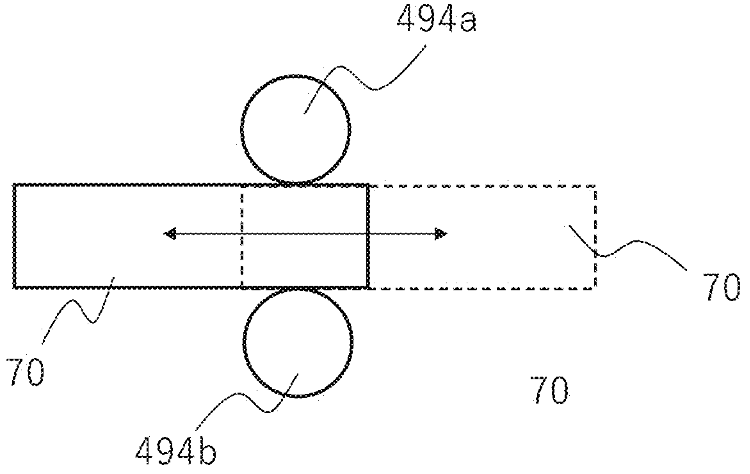

A moving device 85' serving as a modification example will be described with reference to FIGS. 33A and 33B. FIGS. 33A and 33B are diagrams illustrating the moving device 85' according to the present modification example. The moving device 85' includes a rotary member 494*a* that receives the driving force of the motor M2 to rotate.

In the present modification example, the direction of the rotational axis of the rotary member 494*a* is parallel to the direction of the rotational axis 90C of the rotary body 90. The rotary member 494*a* abuts the toner cartridge 70 and rotates, and thus the toner cartridge 70 can reciprocate between the attached position indicated by a solid line in FIG. 33B and the retracted position indicated by a dot line in FIG. 33B.

In the present modification example, the toner cartridge 70 receives the driving force of the motor M2 via two rotary members 494*a*, and thus moves to the attached position and the retracted position. That is, the toner cartridge 70 is another example of a moving member moved in a movement direction D by the driving force of the motor M2 serving as a drive source.

A first contact portion 701 where the toner cartridge 70 comes into contact with one of the rotary members 494*a* is an example of a first force receiving portion that receives the driving force from the drive transmission mechanism. A second contact portion 702 where the toner cartridge 70 comes into contact with the other of the rotary members 494*a* is an example of a second force receiving portion that receives the driving force from the drive transmission mechanism. The drive transmission mechanism that transmits the driving force from the motor M2 to the toner cartridge 70 may have, for example, a configuration in which the pinion gears 94*k*L and 94*k*R of the drive transmission mechanism 101 in the first embodiment are replaced with the two rotary members 494*a*. In this case, the drive transmission mechanism transmits the force that the one of the rotary members 494*a* has received from the first contact portion 701 of the toner cartridge 70 to the second contact portion 702. In addition, the drive transmission mechanism transmits the force that the other of the rotary members 494*a* has received from the second contact portion 702 of the toner cartridge 70 to the first contact portion 701. As a result of this, an advantage similar to that of the drive transmission mechanism 101 of the first embodiment can be obtained.

To be noted, the rotary member 494*a* may be a roller that moves the toner cartridge 70 by friction by abutting the toner cartridge 70 and rotating. In addition, the toner cartridge 70 may be moved by a configuration in which the rotary member 494*a* is a gear and the rotary member 494*a* engages with a gear shape (rack shape) formed on the toner cartridge 70.

The moving device 85' may include a plurality of rotary members 494*a*. The plurality of rotary members 494*a* may be arranged arbitrarily. For example, as illustrated in FIG. 33A, the moving device 85' may include a rotary member 494*a* that abuts one end portion of the toner cartridge 70 and a rotary member 494*a* that abuts the other end portion of the toner cartridge 70 in the longitudinal direction of the toner cartridge 70 parallel to the rotational axis 90C. In addition, the moving device 85' may include a rotary member 494*a* that abuts the center of the toner cartridge 70.

In addition, the moving device 85' may include only one rotary member 494*a*. In this case, the moving device 85' may be disposed at an arbitrary position. For example, the moving device 85' may include a rotary member 494*a* that abuts the center of the toner cartridge 70.

Further, the rotary members 494*a* may be urged toward the toner cartridge 70. In addition, the moving device 85' may include driven rollers 494*b* as illustrated in FIG. 33B. The toner cartridge 70 is interposed between the rotary members 494*a* and the driven rollers 494*b*. To be noted, with respect to the longitudinal direction of the toner cartridge 70, the positions of the rotary members 494*a* and the positions of the driven rollers 494*b* may overlap with each other, or may be different from each other. In addition, at least one of the rotary members 494*a* and the driven rollers 494*b* may be urged toward the toner cartridge 70.

In addition, the rotary members 494*a* and the driven rollers 494*b* may be provided in the rotary body 90.

Left-And-Right Linking Configuration of Tray Driving System

A driving system 100 for moving the tray 80*k* serving as an example of a moving member and a configuration (left-and-right linking configuration) for linking left-side and right-side driving racks 15L and 15R will be described with reference to FIGS. 13A, 13B, 14A, and 14B. The driving system 100 for moving the tray 80*k* with respect to the rotary body 90 will be described below. The driving system for moving the trays 80*y* to 80*c* serving as other examples of the moving member is substantially the same as the driving system 100 described below, and therefore the description thereof will be omitted.

For the sake of convenience of description, in some cases, when the apparatus body 1A is viewed from the −X side (from the front side), the +Y side will be referred to as the right side of the apparatus body 1A, and the −Y side will be referred to as the left side of the apparatus body 1A. For example, the driving rack 15L is provided on the left side of the apparatus body 1A, and the driving rack 15R is provided on the right side of the apparatus body 1A.

Figure 13A:
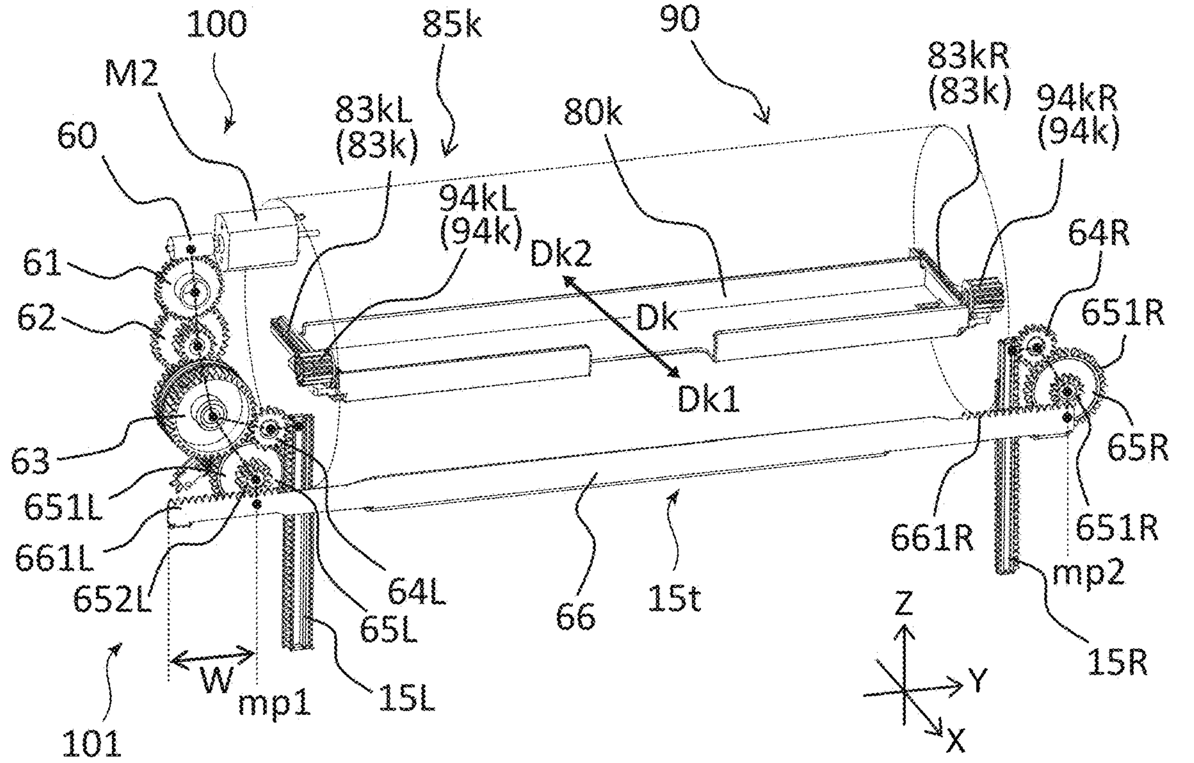
FIGS. 13A and 13B are each an explanatory diagram of elements related to a driving system of the tray according to the first embodiment.
Figure 13B:
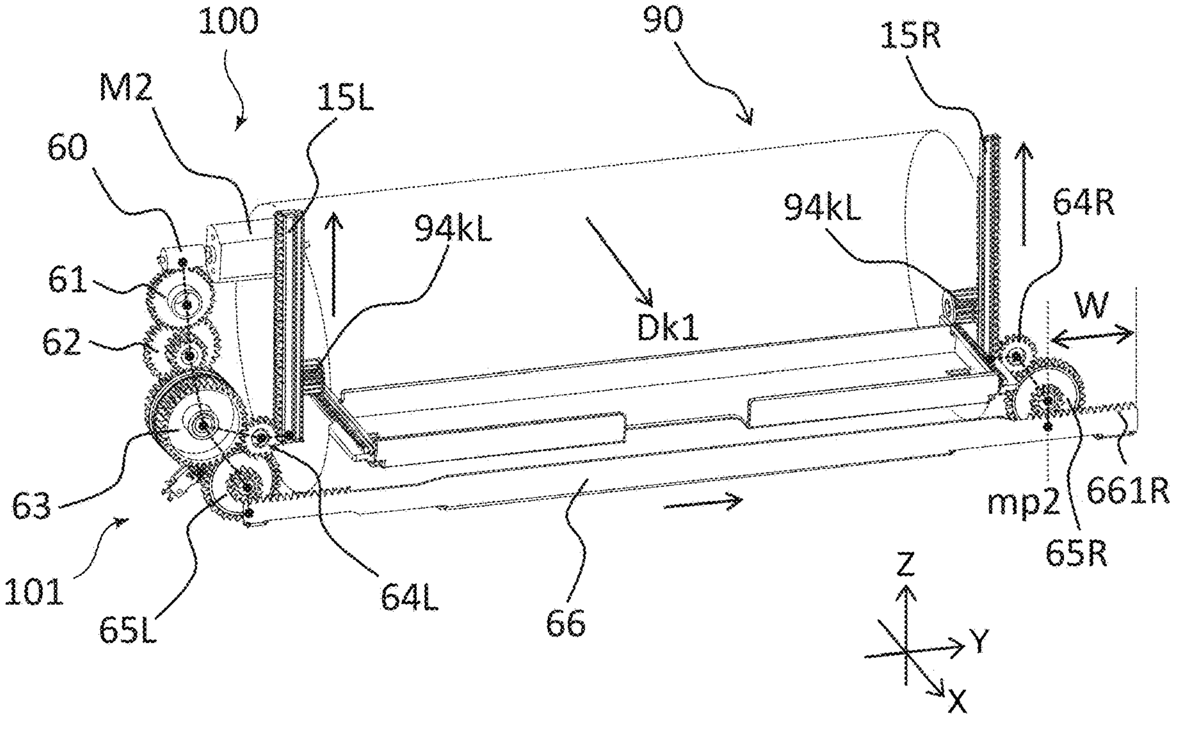
Figure 14A:
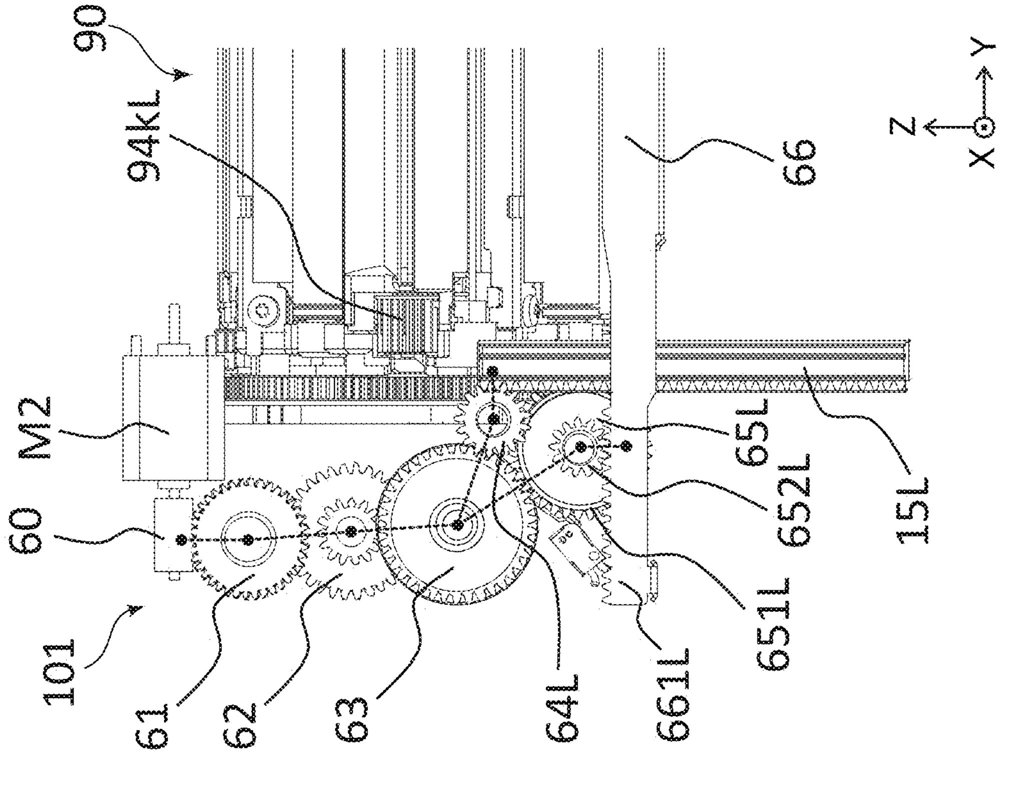
FIGS. 14A and 14B are each an explanatory diagram of elements related to the driving system of the tray according to the first embodiment.
Figure 14B:
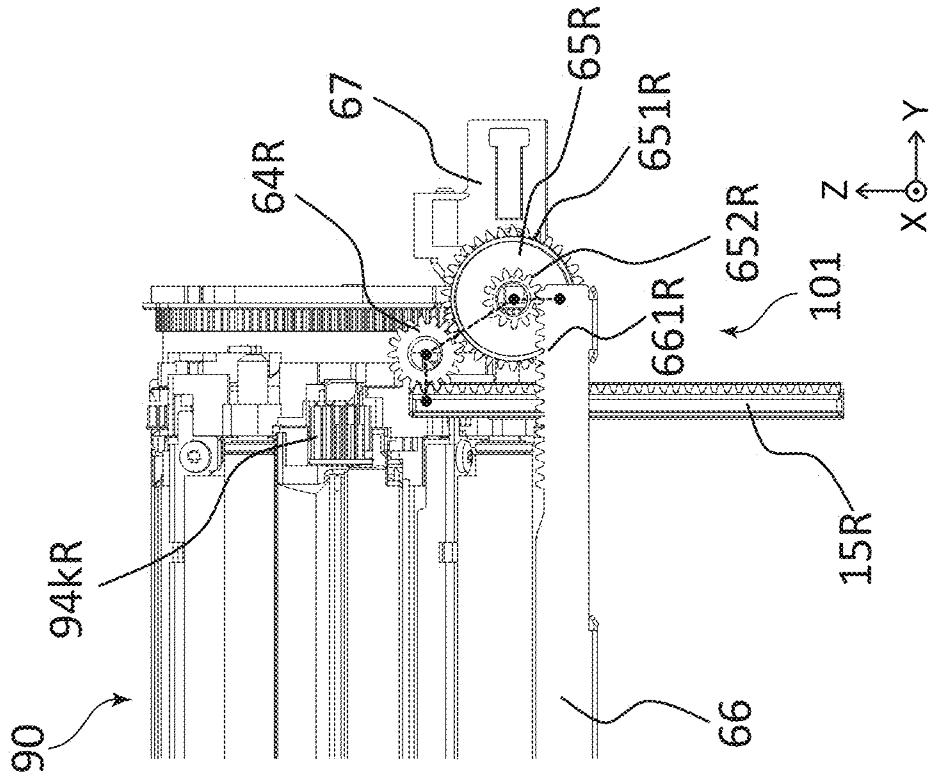

FIGS. 13A and 13B are each a perspective view of the driving system 100 of the tray 80*k*. FIG. 13A illustrates a state in which the tray 80*k* is inside the rotary body 90 (at the accommodation position). FIG. 13B illustrates a state in which the tray 80*k* has moved to the outside of the rotary body 90 (state in which the tray 80*k* is at the detachment position). FIGS. 14A and 14B are each an explanatory diagram illustrating a configuration of the driving system 100 of the tray 80*k*. FIG. 14A illustrates elements of the driving system 100 provided on the left side of the apparatus body 1A. FIG. 14B illustrates elements of the driving system 100 provided on the right side of the apparatus body 1A. In addition, FIGS. 14A and 14B each illustrate a state of the driving system 100 when the tray 80*k* is at the accommodation position.

As illustrated in FIGS. 13A and 13B, the driving system 100 of the tray 80*k* includes the motor M2 serving as a drive source, and a drive transmission mechanism 101 that transmits the driving force of the motor M2 to the tray 80*k*. The drive transmission mechanism 101 includes a rotary member that transmits the driving force of the motor M2 by rotating, and a linear motion member that transmits the driving force of the motor M2 by linear motion. More specifically, the drive transmission mechanism 101 of the present embodiment includes a worm gear 60, stepped gears 61 and 62, an idle gear 63, driving rack input gears 64L and 64R, and driving racks 15L and 15R. In addition, the drive transmission mechanism 101 of the present embodiment includes stepped gears 65L and 65R, a linking rack 66, and pinion gears 94*k* (94*k*L and 94*k*R). In addition, the tray 80*k* includes rack portions 83*k* (83*k*L and 83*k*R) serving as force receiving portions that receive a driving force from the drive transmission mechanism 101. The linking rack 66 is an example of the linear motion member.

To be noted, it can be also said that the driving system 100 of the tray 80*k* is constituted by the driving device 98 of the apparatus body 1A described above and the moving device 85*k* of the rotary body 90 (FIG. 2). The driving device 98 includes the motor M2, the driving racks 15L and 15R, and a transmission portion 15*t* that transmits a driving force from the motor M2 to the driving racks 15L and 15R. The transmission portion 15*t* includes the worm gear 60, the stepped gears 61 and 62, the idle gear 63, the driving rack input gears 64L and 64R, the stepped gears 65L and 65R, and the linking rack 66. The moving device 85*k* includes the pinion gears 94*k* (94*k*L and 94*k*R), and the rack portions 83*k* (83*k*L and 83*k*R). Therefore, it can be said that the “drive transmission mechanism 101” includes each element of the driving device 98 other than the motor M2, and each element of the moving device 85*k* other than elements (rack portions 83*k*L and 83*k*R) provided in the tray 80*k*

To be noted, the driving system of the tray 80*y* has a configuration in which the moving device 85*k* of the driving system 100 is replaced by a driving device 85*y* corresponding to the tray 80*y*, and the driving device 98 is shared with the driving system 100. The moving system of the tray 80*m* has a configuration in which the moving device 85*k* of the driving system 100 is replaced by a driving device 85*m* corresponding to the tray 80*m*, and the driving device 98 is shared with the driving system 100. The moving system of the tray 80*c* has a configuration in which the moving device 85*k* of the driving system 100 is replaced by a driving device 85*c* corresponding to the tray 80*c*, and the driving device 98 is shared with the driving system 100.

As illustrated in FIG. 13A, the tray 80*k* of the present embodiment is provided with the two rack portions 83*k*L and 83*k*R. The rack portion 83*k*L is an example of a first force receiving portion, and the rack portion 83*k*R is an example of a second force receiving portion.

The rack portion 83*k*R (second force receiving portion) is disposed at a position away from the rack portion 83*k*L (first force receiving portion) in a direction intersecting with a movement direction Dk of the tray 80*k*. In the present embodiment, the rack portion 83*k*R is disposed at a position away from the rack portion 83*k*L in the rotational axis direction (Y direction) of the rotary body 90. In addition, in the present embodiment, the rack portion 83*k*L is disposed at one end portion (left end portion) of the tray 80*k* in the rotational axis direction (Y direction) of the rotary body 90. In contrast, the rack portion 83*k*R is disposed at the other end portion (right end portion) of the tray 80*k* in the rotational axis direction (Y direction) of the rotary body 90.

In addition, the rotary body 90 of the present embodiment is provided with two pinion gears 94*k*L and 94*k*R corresponding to the two rack portions 83*k*L and 83*k*R. The two pinion gears 94*k*L and 94*k*R include the pinion gear 94*k*L corresponding to the rack portion 83*k*L and the pinion gear 94*k*R corresponding to the rack portion 83*k*R.

As illustrated in FIG. 13A, the worm gear 60 is attached to the output shaft of the motor M2. In the stepped gear 61, a large-diameter gear that engages with the worm gear 60 and a small-diameter gear having a smaller diameter than the large-diameter gear are integrated. In the stepped gear 62, a large-diameter gear that engages with the small-diameter gear of the stepped gear 61 and a small-diameter gear having a smaller diameter than the large-diameter gear are integrated. The idle gear 63 is engaged with each of the small-diameter gear of the stepped gear 62, the stepped gear 65L, and the driving rack input gear 64L. The driving rack input gear 64L is engaged with the driving rack 15L.

As illustrated in FIGS. 14A and 14B, in the stepped gear 65L, a large-diameter gear 651L that engages with the idle gear 63 and a small-diameter gear 652L (third small-diameter gear) having a smaller diameter than the large-diameter gear 651L are integrated. The stepped gear 65L is configured to transmit the driving force of the motor M2 that has been received by the large-diameter gear 651L to the linking rack 66 via the small-diameter gear 652L. The linking rack 66 includes a first rack portion 661L that engages with the small-diameter gear 652L of the stepped gear 65L and a second rack portion 661R that engages with a small-diameter gear 652R of the stepped gear 65R. In the stepped gear 65R, a large-diameter gear 651R that engages with the driving rack input gear 64R and a small-diameter gear 652R having a smaller diameter than the large-diameter gear 651R are integrated. The stepped gear 65R is configured to transmit the driving force of the motor M2 that the small-diameter gear 652R has received from the linking rack 66 to the rack portion 83*k*R via the large-diameter gear 651R. The driving rack input gear 64R is engaged with the driving rack 15R.

The linking rack 66 is a rack member capable of reciprocating in a direction intersecting with (preferably orthogonal to) the movement direction Dk of the tray 80*k*. In the present embodiment, the linking rack 66 reciprocates in the Y direction that is the rotational axis direction of the rotary body 90. That is, the linking rack 66 moves in a direction different from the movement direction (direction intersecting with the Y direction, Z direction in the present embodiment) of the driving racks 15L and 15R that are other rack members that the drive transmission mechanism 101 includes. In addition, the linking rack 66 of the present embodiment has a thin shape elongated in the Y direction. That is, the longitudinal direction of the linking rack 66 is the Y direction. The first rack portion 661L and the second rack portion 661R are respectively provided at one end portion and the other end portion of the linking rack 66 in the Y direction. The first rack portion 661L and the second rack portion 661R may be continuous with each other.

The left-side driving rack 15L is an example of a first transmission member for transmitting the driving force of the motor M2 to the rack portion 83*k*L of the tray 80*k* serving as a first force receiving portion. The right-side driving rack 15R is an example of a second transmission member for transmitting the driving force of the motor M2 to the rack portion 83*k*R of the tray 80*k* serving as a second force receiving portion. The left-side and right-side driving racks 15L and 15R are linked (connected) to each other so as to operate in an interlocked manner via the linking rack 66. Specifically, the left-side driving rack 15L is linked to the right-side driving rack 15R via the driving rack input gear 64L, the idle gear 63, the stepped gear 65L, the linking rack 66, the stepped gear 65R, and the driving rack input gear 64R.

The linking rack 66 is configured to transmit a force received from one of the driving racks 15L and 15R to the other of the driving racks 15L and 15R. In addition, the drive transmission mechanism 101 including the linking rack 66 is configured to transmit a force received from one of the two rack portions 83*k*L and 83*k*R of the tray 80*k* to the other of the rack portions 83*k*L and 83*k*R. The advantage of this configuration will be described later.

The operation of the driving system 100 in the case of moving the tray 80*k* from the accommodation position (FIG. 13A) to the detachment position (FIG. 13B) will be described. In the description below, the rotational direction (first rotational direction, first direction) of the motor M2 in the case of moving the tray 80*k* from the accommodation position to the detachment position will be referred to as a normal rotation direction. The rotational direction (second rotational direction, second direction) of the motor M2 in the case of moving the tray 80*k* from the detachment position to the accommodation position will be referred to as a reverse rotation direction. In addition, regarding the movement direction Dk in which the tray 80*k* moves between the detachment position and the accommodation position, a direction from the detachment position toward the accommodation position will be referred to as a pull-out direction Dk1, and a direction from the accommodation position toward the detachment position will be referred to as a pull-in direction Dk2.

When the motor M2 rotates in the normal rotation direction, the driving force is transmitted through the worm gear 60, the stepped gear 61, the stepped gear 62, and the idle gear 63 in this order. Then, the driving force is transmitted from the idle gear 63 to both the driving rack input gear 64L and the stepped gear 65L. The driving rack input gear 64L having received the driving force transmitted from the idle gear 63 slides the left-side driving rack 15L upward (in the +Z direction).

The left-side driving rack 15L engages with the left-side pinion gear 94*k*L in the course of the upward movement, and thus rotates the pinion gear 94*k*L. As a result of the rotation of the pinion gear 94*k*L, the driving force is transmitted to the rack portion 83*k*L of the tray 80*k* engaged with the pinion gear 94*k*L. As a result of this, the rack portion 83*k*L of the tray 80*k* receives a force in the pull-out direction Dk1 from the accommodation position toward the detachment position via a left-side driving train (driving rack input gear 64L, driving rack 15L, and pinion gear 94*k*L) of the drive transmission mechanism 101.

Meanwhile, the driving force of the idle gear 63 is also transmitted to the right-side driving train (driving rack input gear 64R, driving rack 15R, and pinion gear 94*k*R) of the drive transmission mechanism 101 via the stepped gear 65L and the linking rack 66. That is, the stepped gear 65L having received the driving force transmitted from the idle gear 63 slides the linking rack 66 rightward (in the +Y direction) with respect to the apparatus body 1A. As a result of the slide movement of the linking rack 66, the driving force is transmitted to the driving rack input gear 64R via the stepped gear 65R, and thus the right-side driving rack 15R slides upward (in the +Z direction).

The right-side driving rack 15R engages with the right-side pinion gear 94*k*R in the course of the upward movement, and thus rotates the pinion gear 94*k*R. As a result of the rotation of the pinion gear 94*k*R, the driving force is transmitted to the rack portion 83*k*R of the tray 80*k* engaged with the pinion gear 94*k*R. As a result of this, the tray 80*k* receives a force in the pull-out direction Dk1 from the accommodation position toward the detachment position via a right-side driving train (driving rack input gear 64R, driving rack 15R, and pinion gear 94*k*R) of the drive transmission mechanism 101.

As described above, in the case where the motor M2 rotates in the normal rotation direction, the tray 80*k* receives the force in the pull-out direction Dk1 at the left-side and right-side rack portions 83*k*L and 83*k*R, and thus moves from the accommodation position (FIG. 13A) toward the detachment position (FIG. 13B).

To be noted, the operation of the driving system 100 in the case of moving the tray 80*k* from the detachment position to the accommodation position is the same as the case of moving the tray 80*k* from the accommodation position to the detachment position except that the rotational direction or the slide direction of each element of the driving system 100 is reversed. That is, when the motor M2 rotates in the reverse rotation direction, the left-side driving rack 15L is slid downward (in the −Z direction) via the worm gear 60, the stepped gear 61, the stepped gear 62, the idle gear 63, and the driving rack input gear 64L. As a result of the slide movement of the driving rack 15L, the driving force in the pull-in direction Dk2 is transmitted to the rack portion 83*k*L of the tray 80*k* via the pinion gear 94*k*L. Meanwhile, the driving force is transmitted from the idle gear 63 to the linking rack 66 via the stepped gear 65L, and the linking rack 66 is slid leftward (in the −Y direction) with respect to the apparatus body 1A. As a result of the slide movement of the linking rack 66, the right-side driving rack 15R is slid downward (in the −Z direction) via the stepped gear 65R and the driving rack input gear 64R. As a result of the slide movement of the driving rack 15R, the driving force in the pull-in direction Dk2 is transmitted to the rack portion 83*k*R of the tray 80*k* via the pinion gear 94*k*R.

As described above, in the case where the motor M2 rotates in the reverse rotation direction, the tray 80*k* receives a force in the pull-in direction Dk2 at the left-side and right-side rack portions 83*k*L and 83*k*R, and thus moves from the detachment position (FIG. 13B) toward the accommodation position (FIG. 13A).

As described above, at the time of the tray pull-out operation and the tray pull-in operation (hereinafter collectively referred to as a pull-out/pull-in operation) of the tray 80*k*, the driving force of the motor M2 is transmitted to each of the left-side and right-side rack portions 83*k*L and 83*k*R of the tray 80*k* by the drive transmission mechanism 101. That is, in the tray pull-out operation, the driving force in the pull-out direction Dk1 is transmitted to each of the two rack portions 83*k*L and 83*k*R, and in the tray pull-in operation, the driving force in the pull-in direction Dk2 is transmitted to each of the two rack portions 83*k*L and 83*k*R. Therefore, as compared with a configuration in which the driving force is transmitted to only one rack portion of the tray 80*k* at the time of the pull-out/pull-in operation of the tray 80*k*, inclination of the tray 80*k* is less likely to occur, and the pull-out/pull-in operation can be performed more stably.

Advantage of Left-and-Right Linking Configuration

An advantage of the configuration in which the left-side and right-side driving racks 15L and 15R are linked by the linking rack 66 will be described below.

The linking rack 66 of the present embodiment transmits the force received from the left-side driving rack 15L to the right-side driving rack 15R, and transmits the force received from the right-side driving rack 15R to the left-side driving rack 15L. In addition, the drive transmission mechanism 101 of the present embodiment including the linking rack 66 transmits the force received from the left-side rack portion 83*k*L of the tray 80*k* to the right-side rack portion 83*k*R, and transmits the force received from the right-side rack portion 83*k*R of the tray 80*k* to the left-side rack portion 83*k*L. In other words, the drive transmission mechanism is configured to transmit a force that the drive transmission mechanism has received from the first force receiving portion of the moving member to the second force receiving portion and transmit a force that the drive transmission mechanism has received from the second force receiving portion of the moving member to the first force receiving portion.

Therefore, the left-side and right-side driving racks 15L and 15R are linked via the linking rack 66 so as to move in an interlocked manner with each other. In addition, the movement of the rack portion 83*k*L of the tray 80*k* and the movement of the rack portion 83*k*R of the tray 80*k* can be interlocked by the drive transmission mechanism 101 including the linking rack 66. As a result of this, the inclination of the tray 80*k* is less likely to occur.

More specifically, when the tray 80*k* is at the detachment position, the user can execute the tray pull-out operation by operating an operation portion (for example, a button of an operation panel) provided on the apparatus body 1A, and thus move the tray 80*k* to the accommodation position.

Meanwhile, the tray 80*k* is allowed to move to the accommodation position when the user pushes in the tray 80*k* in a state in which the tray 80*k* is at the detachment position (details of the mechanism allowing this will be described later). At this time, the user does not necessarily push the center portion of the tray 80*k* in the width direction (left-right direction, Y direction) of the apparatus body 1A. In the case where a portion near one end of the tray 80*k* in the Y direction is pushed by the user, thus the one end moves in the pull-in direction Dk2 and the other end does not move, the tray 80*k* is inclined. In the case where the tray 80*k* is inclined, it is difficult for the user to smoothly push the tray 80*k* into the rotary body 90. In addition, in the case where the tray 80*k* is inclined, it may be difficult for the driving system 100 to smoothly execute the tray pull-in operation.

As a result of the left-side and right-side driving racks 15L and 15R of the tray 80*k* are linked as in the present embodiment, the inclination of the tray 80*k* can be suppressed. This is because as a result of the left-side and right-side driving racks 15L and 15R being linked, the other end of the tray 80*k* in the Y direction also moves in the pull-in direction Dk2 in the case where the one end of the tray 80*k* in the Y direction is pushed and moved in the pull-in direction Dk2.

For example, it is assumed that the user has pushed in a portion near an end portion on the left side (−Y side) of the tray 80*k* in the pull-in direction Dk2 in a state of FIG. 13B. In this case, as a result of the movement of the rack portion 83*k*L in the pull-in direction Dk2, the driving rack 15L is moved downward via the pinion gear 94*k*L. As a result of the driving rack 15L moving downward, the driving rack input gear 64L, the idle gear 63, and the stepped gear 65L rotate, and the linking rack 66 moves leftward (in the −Y direction). As a result of the linking rack 66 moving leftward, the stepped gear 65R, and the driving rack input gear 64R rotate, and the driving rack 15R moves downward. As a result of the downward movement of the driving rack 15R, the rack portion 83*k*R receives a force in the pull-in direction Dk2 via the pinion gear 94*k*R.

That is, the tray 80*k* receives a force in the pull-in direction Dk2 from the user at a portion near the rack portion 83*k*L provided at an end portion on the left side (−Y side), and receives a force in the pull-in direction Dk2 also at a portion near the rack portion 83*k*R provided at an end portion on the right side (+Y side). The drive transmission mechanism 101 transmits part of the force that the driving rack 15L receives via the pinion gear 94*k*L from the tray 80*k* to the driving rack 15R via the pinion gear 94*k*R, and thus enables transmission of the force in the pull-in direction Dk2 to the rack portion 83*k*R. Therefore, the inclination of the tray 80*k* can be suppressed as compared with a configuration in which force in the pull-in direction Dk2 acts only on an end portion on the left side (−Y side) of the tray 80*k*. This also applies to a case where the vicinity of the rack portion 83*k*R is pushed in in the pull-in direction Dk2.

To be noted, the drive transmission mechanism 101 is configured such that in the case where the tray 80*k* is pushed in the pull-in direction Dk2, the force thereof rotates the idle gear 63 but the force is not transmitted from the idle gear 63 to the motor M2. In the present embodiment, the transmission path of the force in the case where the tray 80*k* is pushed in the pull-in direction dk2 is blocked by the idle gear 63 as will be described later. Therefore, in the case where one end of the tray 80*k* in the Y direction is pushed and moved in the pull-in direction Dk2, the other end of the tray 80*k* can move in the pull-in direction Dk2 in an interlocked manner without being affected by the static torque of the motor M2.

Therefore, the inclination of the tray 80*k* is less likely to occur, and a smooth operability of the push-in operation of the tray 80*k* by the user can be realized.

Advantage of Using Stepped Gears for Left-And-Right Linking Configuration

As illustrated in FIG. 13A, in a state in which the tray 80*k* is at the accommodation position, the linking rack 66 is engaged with both the left-side and right-side stepped gears 65L and 65R. As illustrated in FIG. 13B, also in a state in which the tray 80*k* is at the detachment position, the linking rack 66 is engaged with both the left-side and right-side stepped gears 65L and 65R.

As described above, the linking rack 66 moves rightward (in the +Y direction) with respect to the apparatus body 1A when the tray 80*k* moves from the accommodation position to the detachment position. The movement amount of the linking rack 66 in the movement of the tray 80*k* from the accommodation position to the detachment position will be denoted by W. In this case, in a state in which the tray 80*k* is at the accommodation position (FIG. 13A), the first rack portion 661L of the linking rack 66 extends leftward (in the −Y direction) from an engagement position mp1 with the stepped gear 65L at least by a length of the movement amount W. In addition, in a state in which the tray 80*k* is at the detachment position (FIG. 13B), the second rack portion 661R of the linking rack 66 extends rightward (in the −Y direction) from an engagement position mp2 with the stepped gear 65R at least by a length of the movement amount W. In other words, the length of the linking rack 66 in the movement direction (Y direction in the present embodiment) of the linking rack 66 is equal to or larger than the sum of the distance between the engagement position mp1 with the stepped gear 65L and the engagement position mp2 with the stepped gear 65R and the movement amount W of the linking rack 66.

Therefore, to reduce the size of the apparatus body 1A in the left-right direction (width direction, Y direction), it is preferable that the movement amount W of the linking rack 66 is small. In the description below, a configuration in which the movement amount W of the linking rack 66 is reduced to realize miniaturization of the apparatus body 1A in the width direction (Y direction) will be described.

As illustrated in FIG. 14A, the stepped gear 65L (first stepped gear) includes the large-diameter gear 651L (first large-diameter gear) and the small-diameter gear 652L (first small-diameter gear) having a smaller pitch circle radius than the large-diameter gear 651L. The large-diameter gear 651L is engaged with the idle gear 63, and is capable of receiving the driving force of the motor M2 via the idle gear 63. That is, the large-diameter gear 651L (first large-diameter gear) is linked to the motor M2 (drive source) such that drive can be transmitted. The small-diameter gear 652L is engaged with the first rack portion 661L of the linking rack 66.

In addition, the large-diameter gear 651L is linked to the rack portion 83*k*L of the tray 80*k* via the idle gear 63, the driving rack input gear 64L, the driving rack 15L, and the pinion gear 94*k*L. That is, the large-diameter gear 651L (first large-diameter gear) is linked to the rack portion 83*k*L (first force receiving portion) such that drive can be transmitted.

A ratio (r2/r1) between a pitch circle radius r1 of the large-diameter gear 651L and a pitch circle radius r2 of the small-diameter gear 652L will be referred to as a pitch circle radius ratio of the stepped gear 65L. In the configuration in which the driving force is transmitted to the linking rack 66 via the stepped gear 65L, the movement amount W of the linking rack 66 decreases in accordance with the pitch circle radius ratio (r2/r1) of the stepped gear 65L. That is, by speed reduction by the stepped gear 65L, the movement amount W of the tray 80*k* in the pull-out/pull-in operation can be reduced, and thus miniaturization of the apparatus body 1A in the width direction (Y direction) can be realized.

More specifically, if drive is transmitted via a spur gear that engages with both the idle gear 63 and the linking rack 66 instead of via the stepped gear 65L, the ratio of the movement distance of the linking rack 66 to the movement distance of teeth of the idle gear 63 is 1. The movement distance of teeth of the idle gear 63 is the length of an arc drawn by one point on a pitch circle of the idle gear 63 in accordance with the rotation of the idle gear 63. In contrast, in the case where the stepped gear 65L is interposed between the idle gear 63 and the linking rack 66, the ratio of the movement distance of the linking rack 66 to the movement distance of the teeth of the idle gear 63 is less than 1. In other words, the stepped gear 65L can transmit the movement of the teeth of the idle gear 63 while reducing a speed to the linking rack 66. Therefore, the movement amount W of the linking rack 66 can be reduced.

Here, it is preferable that the movement amounts of the left-side and right-side rack portions 83*k*L and 83*k*R in the movement of the tray 80*k* are equal. In addition, it is preferable that the movement speeds of the left-side and right-side rack portions 83*k*L and 83*k*R in the movement of the tray 80*k* are equal. This is because, in the case where the movement amounts (movement speeds) of the left-side and right-side rack portions 83*k*L and 83*k*R are different, the tray 80*k* is inclined during the movement and it becomes difficult to stably move the tray 80*k*. In the present embodiment, the number of teeth is the same for the left-side and right-side pinion gears 94*k*L and 94*k*R. That is, it is preferable that the movement amounts (movement speeds) of the left-side and right-side driving racks 15L and 15R are equal.

To be noted, as described above, the stepped gear 65L transmits the movement of teeth of the idle gear 63 while reducing the speed to the linking rack 66. Therefore, the movement amount (movement speed) of the driving rack 15R can be smaller (lower) than the movement amount (movement speed) of the driving rack 15L depending on the configuration of the drive transmission from the linking rack 66 to the driving rack 15R.

Therefore, in the present embodiment, the stepped gear 65R is interposed between the linking rack 66 and the driving rack input gear 64R. The stepped gear 65R has a function of increasing the movement amount (movement speed) of the driving rack 15R with respect to the movement amount (movement speed) of the linking rack 66.

As illustrated in FIG. 14B, the stepped gear 65R (second stepped gear) includes the large-diameter gear 651R (second large-diameter gear) and the small-diameter gear 652R (second small-diameter gear) having a smaller pitch circle radius than the large-diameter gear 651R. The large-diameter gear 651R is engaged with the driving rack input gear 64R, and is linked to the rack portion 83*k*R of the tray 80*k* via the driving rack input gear 64R, the driving rack 15R, and the pinion gear 94*k*R. That is, the large-diameter gear 651R (second large-diameter gear) is linked to the rack portion 83*k*R (second force receiving portion) such that drive can be transmitted. The small-diameter gear 652R (second small-diameter gear) is engaged with the second rack portion 661R of the linking rack 66.

As a result of transmitting a driving force to the driving rack 15R from the linking rack 66 via the stepped gear 65R, the movement amount of the driving rack 15R with respect to the movement amount W of the linking rack 66 is larger than in the case of using a spur gear instead of the stepped gear 65R. In addition, the movement amount of the driving rack 15R with respect to the movement amount W of the linking rack 66 increases in accordance with the pitch circle radius ratio of the stepped gear 65R. In other words, the stepped gear 65R can transmit the movement of the linking rack 66 in an accelerated state to the driving rack 15R.

A ratio (r3/r4) between a pitch circle radius r3 of the small-diameter gear 652R and a pitch circle radius r4 of the large-diameter gear 651R will be referred to as a pitch circle radius ratio of the stepped gear 65R. To equalize the movement amounts (movement speeds) of the rack portions 83*k*L and 83*k*R, a configuration in which (pitch circle radius of the large-diameter gear 651L)/(pitch circle radius of the small-diameter gear 652L)×(pitch circle radius of the small-diameter gear 652R)/(pitch circle radius of the large-diameter gear 651R)=1 is satisfied may be employed. That is, the ratio of the pitch circle radius of the first small-diameter gear to the pitch circle radius of the first large-diameter gear is preferably equal to the ratio of the pitch circle radius of the second small-diameter gear to the pitch circle radius of the second large-diameter gear. For example, the pitch circle radiuses of the large-diameter gears 651L and 651R of the left-side and right-side stepped gears 65L and 65R are set to be equal, and the pitch circle radiuses of the small-diameter gears 652L and 652R are set to be equal. As a result of this, the pitch circle radius ratio of the stepped gear 65L and the pitch circle radius ratio of the stepped gear 65R can be equalized, and thus the movement amounts (movement speeds) of the rack portions 83*k*L and 83*k*R can be equalized. Further, in addition to the advantage in the miniaturization by using the stepped gear 65L described above, more stable movement of the tray 80*k* can be realized.

In the present embodiment, the movement amounts of the rack portion 83*k*L and the driving rack 15L are approximately equal, and the movement amounts of the rack portion 83*k*R and the driving rack 15R are approximately equal. Meanwhile, the movement amount W of the linking rack 66 is smaller than the movement amounts of the rack portion 83*k*L and the driving rack 15L and the movement amounts of the rack portion 83*k*R and the driving rack 15R. Therefore, the movement amount W of the linking rack 66 can be reduced with respect to the movement amounts of the tray 80*k* and the driving rack 15R in the pull-out/pull-in operation of the tray 80*k*. Therefore, the tray 80*k* can be moved by a desired movement amount, and miniaturization of the apparatus body 1A in the width direction (Y direction) can be realized.

Locking Mechanism of Rotary

In the case where the tray 80 is moved to attach or detach the toner cartridge 70, the pinion gears 94 are preferably positioned such that the pinion gears 94 (driven portions) of the rotary body 90 reliably engage with the driving racks 15 (driving member) of the apparatus body 1A. The pinion gears 94 are preferably accurately positioned at positions (hereinafter referred to as engagement positions) where the pinion gears 94 can appropriately engage with the corresponding ones of the driving racks 15.

As a cause of displacement of the pinion gear 94 from the engagement position, variations in the position of the rotary body 90 in the yellow/magenta/cyan/black replacement postures can be mentioned. When the pinion gear 94 engages with the driving rack 15, the gear tooth surface of the pinion gear 94 receives force from the gear tooth surface of the driving rack 15. In the case where the rotary body 90 is rotated about the rotational axis 90C by this force, the pinion gear 94 can be displaced from the engagement position. In addition, in the case where the user touches the rotary body 90 and rotates the rotary body 90 in a state in which the tray 80 is at the detachment position, the pinion gear 94 can be moved from the engagement position.

Therefore, in the present embodiment, a locking mechanism 90L that restricts (locks) the rotation of the rotary body 90 in a state in which the rotary body 90 is in the replacement posture is provided. The locking mechanism 90L switches between a locking state in which the locking mechanism 90L restricts the rotation of the rotary body 90, and a lock releasing state in which the locking mechanism 90L allows the rotation of the rotary body 90. The locking mechanism 90L is configured to take the locking state when the rotary body 90 is in any of the yellow/magenta/cyan/black replacement postures. The locking mechanism 90L of the present embodiment switches between the locking state and the lock releasing state in an interlocked manner with the pull-out/pull-in operation of the tray 80.

Figure 15A:
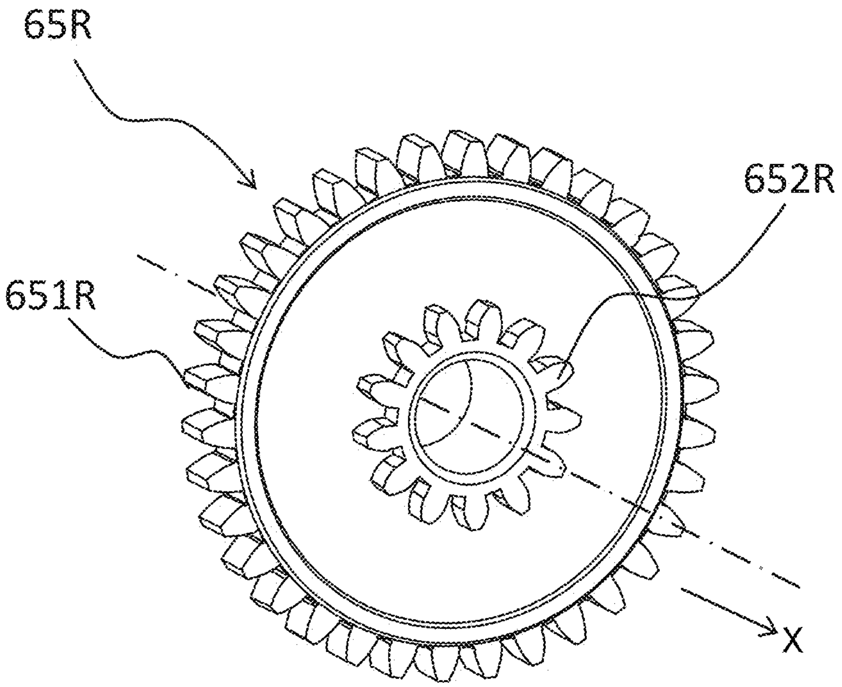
FIGS. 15A and 15B are each a perspective view of a stepped gear according to the first embodiment.
Figure 15B:
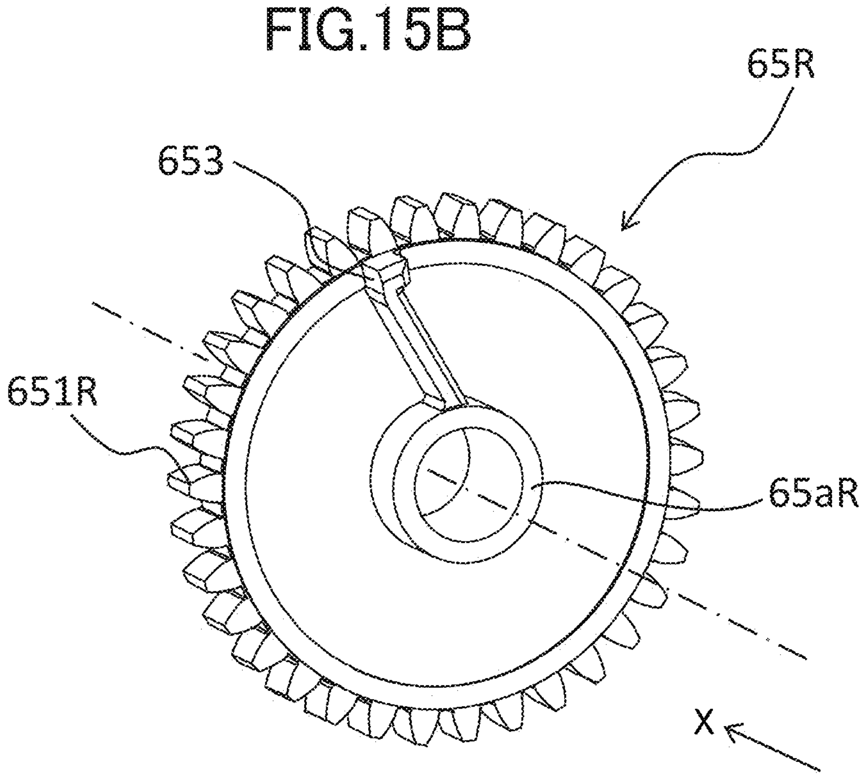
Figure 16:
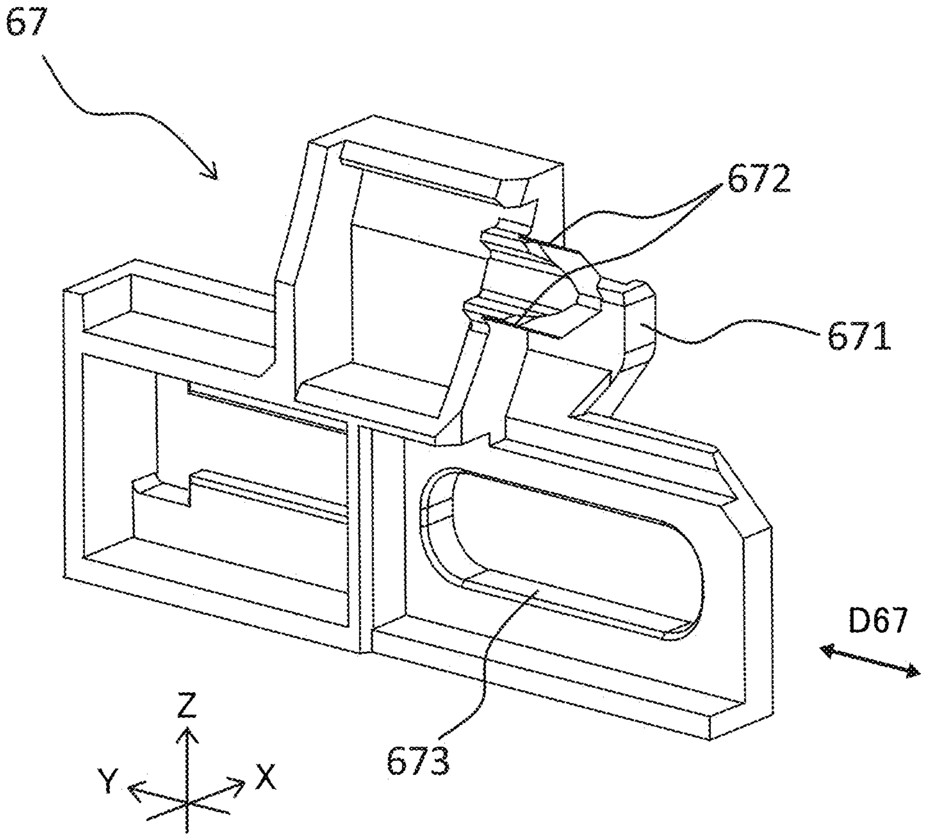
FIG. 16 is a perspective view of a locking member according to the first embodiment.
Figure 17A:
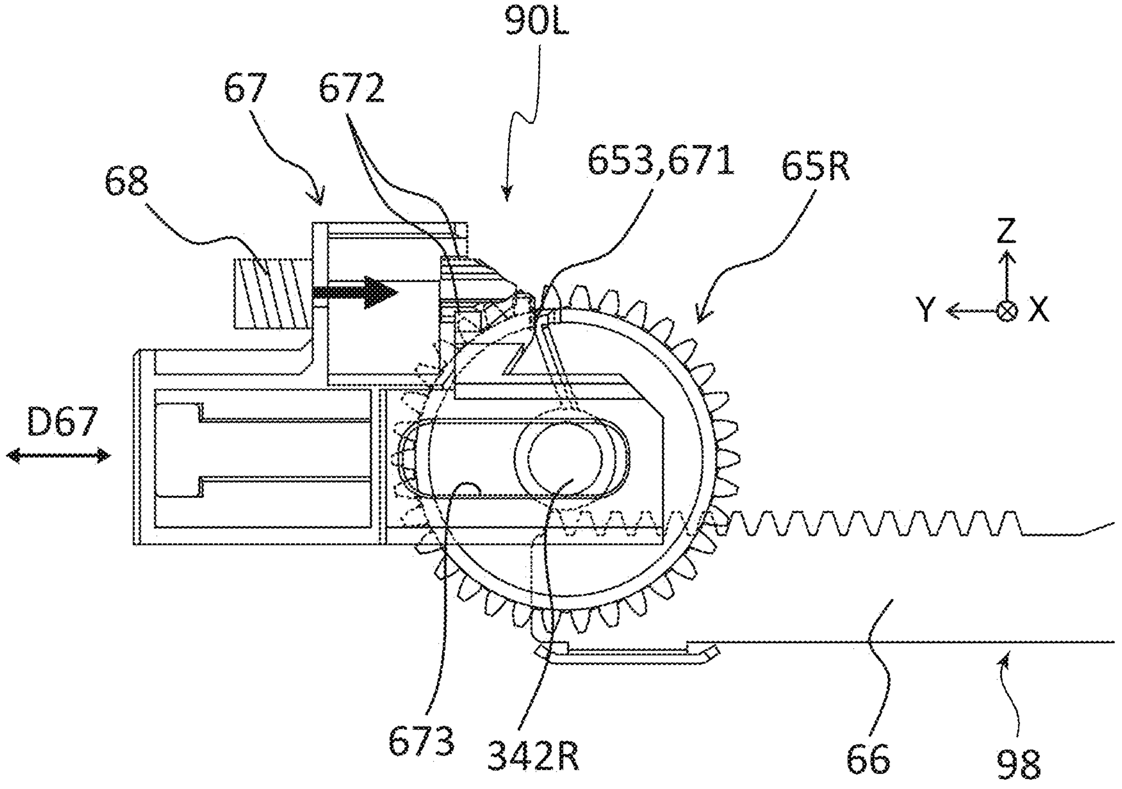
FIGS. 17A and 17B are each an explanatory diagram of elements related to a locking mechanism of the rotary body according to the first embodiment.
Figure 17B:
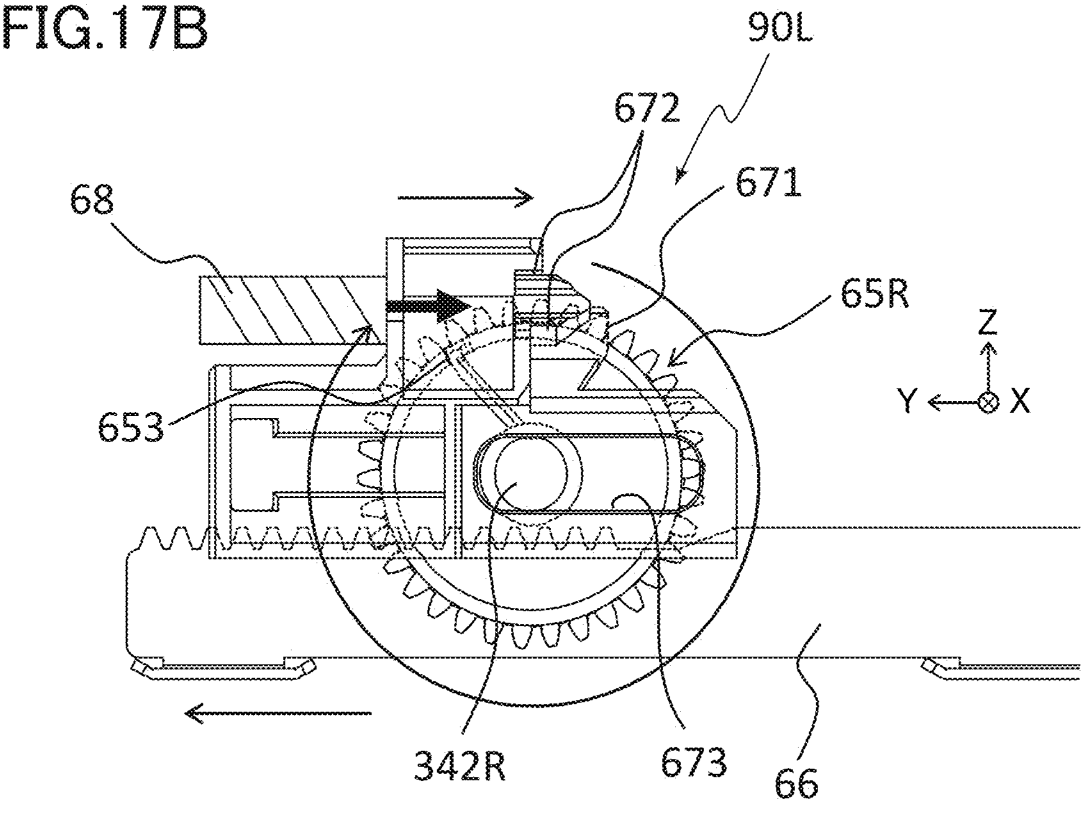
Figure 18A:
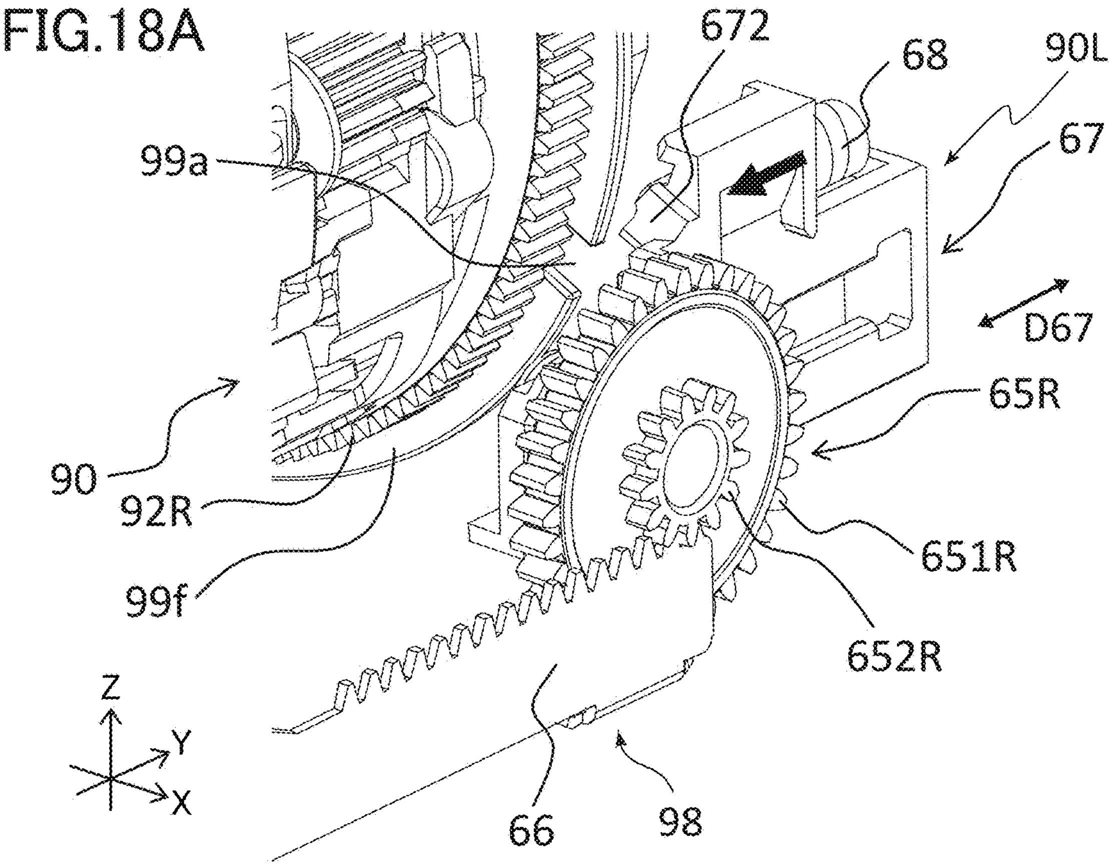
FIGS. 18A and 18B are each an explanatory diagram of elements related to the locking mechanism of the rotary body according to the first embodiment.
Figure 18B:
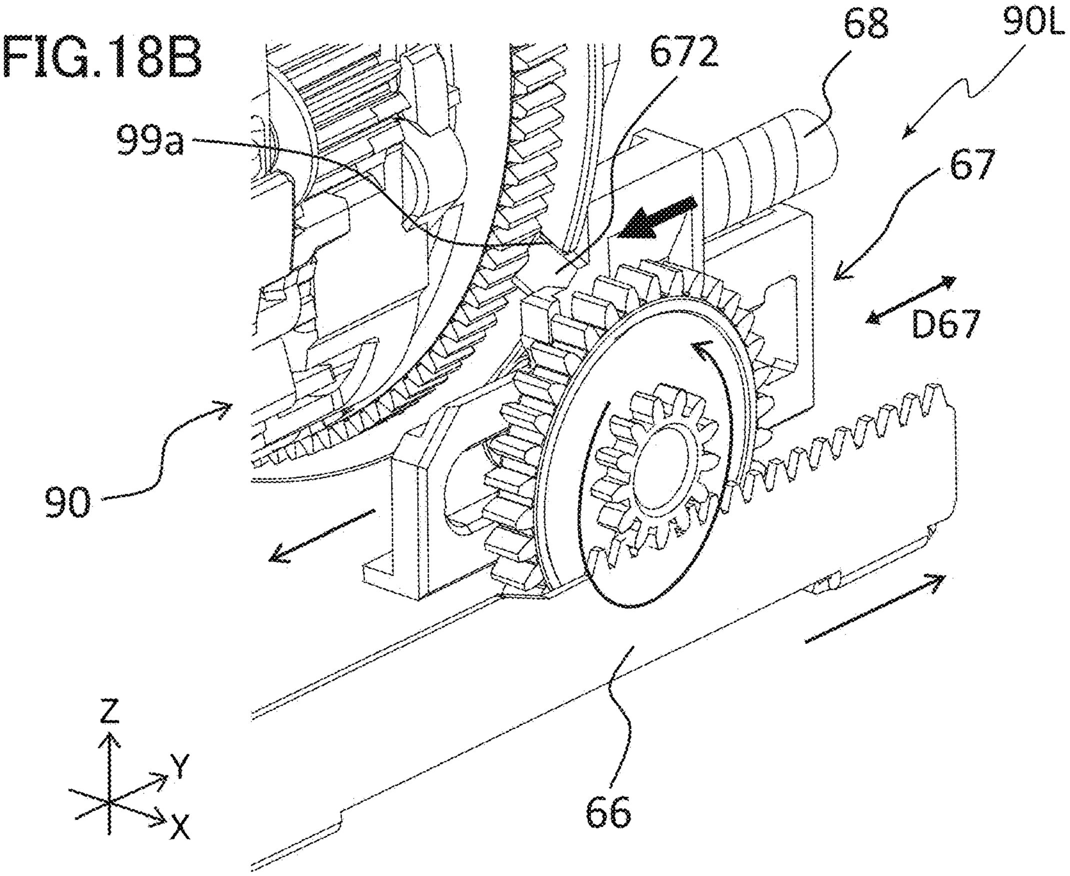

The locking mechanism 90L of the rotary body 90 will be described with reference to FIGS. 15A to 18B. FIGS. 15A and 15B are each a perspective view of the stepped gear 65R. FIG. 16 is a diagram illustrating the locking member 67. FIGS. 17A and 17B are each an explanatory diagram illustrating a configuration of the locking mechanism 90L. FIGS. 18A and 18B are each a perspective view illustrating a configuration of the locking mechanism 90L.

As illustrated in FIGS. 15A to 18B, the locking mechanism 90L includes a pressing portion 653 provided on the stepped gear 65R, a locking member 67, an urging member 68, and an engaged portion 99*a* provided on the rotary body 90.

As illustrated in FIG. 15B, the pressing portion 653 is formed on the large-diameter gear 651R of the stepped gear 65R. As will be described later, the pressing portion 653 has a function of moving the locking member 67 in an interlocked manner with the pull-out/pull-in operation of the tray 80. The stepped gear 65R is part of the driving device 98 described above. Therefore, the locking member 67 can move in an interlocked manner with the operation of the driving device 98 in the movement of the toner cartridge 70. In other words, the locking member 67 is moved by the driving force of the motor M2.

The pressing portion 653 is a protrusion portion provided at a predetermined position in the rotational direction of the stepped gear 65R and extending radially outward from a boss portion 65*a*R of the stepped gear 65R. To be noted, the stepped gear 65R is rotatably supported by a lower holding member 34R (FIG. 20B) that will be described later as a result of the boss portion 65*a*R being fitted with a support shaft 342R of the lower holding member 34R.

The pressing portion 653 may be integrally formed with the large-diameter gear 651R and the small-diameter gear 652R of the stepped gear 65R by a method such as injection molding. As a result of this, the stepped gear 65R that is one gear can have a plurality of functions. The plurality of functions include a function of moving the driving device 98 and the locking mechanism 90L in an interlocked manner, and a function of transmitting the movement of the linking rack 66 to the driving rack 15R in an accelerated state. In the present embodiment, the pressing portion 653 is formed on a side surface of the large-diameter gear 651R on one side (−X side) in the rotational axis direction of the stepped gear 65R, and the small-diameter gear 652R is formed on a side surface on the other side (+X side) of the large-diameter gear 651R. Some of teeth of the small-diameter gear 652R overlap with the pressing portion 653 as viewed in the rotational axis direction of the stepped gear 65R.

As illustrated in FIG. 16, the locking member 67 includes a pressed portion 671 that is pressed by the pressing portion 653 of the stepped gear 65R, and an engaging portion 672 capable of engaging with the engaged portion 99*a* of the rotary body 90. The locking member 67 is movably supported by the frame 16 of the apparatus body 1A. The locking member 67 of the present embodiment is capable of reciprocating in a movement direction D67 that is a direction following the Y direction that is a movement direction of the linking rack 66. The engaging portion 672 is a protrusion shape protruding toward one side (+Y side) in the movement direction D67.

The locking member 67 is movable to an engaged position (locking position) where the engaging portion 672 engages with one of the engaged portions 99*a* of the rotary body 90, and a disengaged position (lock releasing position) where the engaging portion 672 is disengaged from the engaged portions 99*a* of the rotary body 90. In addition, the locking member 67 is slidably supported by the lower holding member 34R (FIG. 20B) that will be described later.

The locking member 67 is configured to move in an interlocked manner with the driving racks 15 (driving member) as will be described later. The locking member of the present embodiment is connected to the linking rack 66 (rack member) serving as a transmission portion that transmits force such that the left-side and right-side driving racks 15L and 15R (first driving member and second driving member) move in an interlocked manner, and moves in an interlocked manner with the driving racks 15L and 15R via the linking rack 66. To be noted, the locking member 67 may move in an interlocked manner with the transmission portion (left-and-right linking configuration) that will be described in a second embodiment and further embodiments.

In addition, the locking member 67 has an elongated hole 673 formed in a thin shape elongated in the movement direction D67. The elongated hole 673 engages with the support shaft 342R of the lower holding member 34R (FIG. 20B), and thus the locking member 67 is guided to move in the movement direction D67 with respect to the lower holding member 34R. That is, the support shaft 342R that holds the stepped gear 65R also functions as a guide portion that guides the locking member 67.

As illustrated in FIG. 18A, the urging member 68 urges the locking member 67 to either one of two sides in the movement direction D67. The urging member 68 of the present embodiment urges the locking member 67 in a direction (−Y direction) from the lock releasing position toward the locking position. The urging member 68 is a compression spring disposed between a spring receiving surface of the locking member 67 and a spring receiving surface provided on the frame 16 of the apparatus body 1A.

As illustrated in FIG. 18A, the rotary body 90 is provided with engaged portions 99*a* of a number (four in the present embodiment) corresponding to the number of the trays 80. The engaged portions 99*a* of the present embodiment are provided in a flange portion 99*f* provided at an end portion of the rotary body 90 in the rotational axis direction (Y direction) of the rotary body 90. The flange portion 99*f* projects more to the outer peripheral side than a disk gear 92R (see also FIG. 5) in the radial direction (rotational radius direction of the rotary body 90) with respect to the rotational axis 90C. The engaged portions 99*a* are each a recess shape where part of the outer edge of the flange portion 99*f* is recessed inward in the radial direction. The engaged portions 99*a* are provided at positions corresponding to the replacement postures that the rotary body 90 can take in the rotational direction of the rotary body 90. In the present embodiment, four engaged portions 99*a* (99*ay*, 99*am*, 99*ac*, and 99*ak*) respectively corresponding to yellow/magenta/cyan/black replacement postures are arranged at a 90-degree interval in the rotational direction (see FIGS. 20A and 20B). In a state in which the rotary body 90 is in one of the replacement postures, one of the engaged portions 99*a* overlaps with the engaging portion 672 of the locking member 67 as viewed in the rotational axis direction of the rotary body 90.

When the engaging portion 672 of the locking member 67 engages with the engaged portion 99*a* of the rotary body 90, the rotation of the rotary body 90 is restricted. The state of the locking mechanism 90L in which the engaging portion 672 of the locking member 67 is engaged with one of the engaged portions 99*a* of the rotary body 90 will be referred to as a locking state. The state of the locking mechanism 90L in which the engaging portion 672 of the locking member 67 is disengaged from all the engaged portions 99*a* of the rotary body 90 will be referred to as a lock releasing state. The locking state is a state in which the locking mechanism 90L restricts the rotation of the rotary body 90 about the rotational axis 90C, and the lock releasing state is a state in which the locking mechanism 90L allows rotation of the rotary body 90 about the rotational axis 90C. In the locking state, the locking mechanism 90L restricts the rotation of the rotary body 90 about the rotational axis 90C in a first direction and a second direction opposite to the first direction.

An operation of switching the locking mechanism 90L from the lock releasing state to the locking state will be referred to as a locking operation, and an operation of switching the locking mechanism 90L from the locking state to the lock releasing state will be referred to as a lock releasing operation. The locking operation and the lock releasing operation are performed in an interlocked manner with the pull-out/pull-in operation of the tray 80.

FIGS. 17A and 18A illustrate the locking mechanism 90L in the locking state. FIGS. 17B and 18B illustrate the locking mechanism 90L in the lock releasing state. In the description below, the operation of the locking mechanism 90L will be described in detail.

As described above, when the tray 80 is at the accommodation position, the rotary body 90 is rotatable. That is, the engaging portion 672 of the locking member 67 is disengaged from the engaged portions 99*a* of the rotary body 90, and the locking mechanism 90L is in the lock releasing state (FIGS. 17A and 18A). In the course of movement of the tray 80 from the accommodation position to the detachment position, the engaging portion 672 of the locking member 67 engages with one of the engaged portions 99*a* of the rotary body 90. That is, in the course of the tray pull-out operation, the locking mechanism 90L is switched from the lock releasing state to the locking state (FIGS. 17B and 18B).

As illustrated in FIG. 17A, when the rotary body 90 is in one of the yellow/magenta/cyan/black replacement postures and the tray 80 is at the accommodation position, the locking member 67 is held at the detachment position by the pressing portion 653 of the stepped gear 65R. That is, the pressing portion 653 of the stepped gear 65R comes into contact with the pressed portion 671 of the locking member 67, and suppresses movement of the locking member 67 in the urging direction (−Y direction) of the urging member 68. At this time, as illustrated in FIG. 18A, the engaging portion 672 of the locking member 67 is at a position away from the engaged portion 99*a* of the rotary body 90 in the +Y direction.

As described above, when the rotary body 90 is in one of the yellow/magenta/cyan/black replacement postures and the toner cartridge 70 corresponding to the posture of the rotary body 90 is at the attached position, the locking mechanism 90L is maintained in the lock releasing state.

Next, a case where the tray 80 is moved from the accommodation position to the detachment position (case where the tray pull-out operation is performed) will be described. In the case of moving the tray 80 from the accommodation position toward the detachment position, the linking rack 66 moves leftward (rightward with respect to the apparatus body 1A, in the +Y direction) in the drawing as illustrated in FIG. 17B. The stepped gear 65R receives the driving force from the linking rack 66 and rotates in the clockwise direction in the drawing. Then, the pressing portion 653 of the stepped gear 65R rotationally moves in a direction (leftward with respect to the apparatus body 1A, in the −Y direction) away from the pressed portion 671 of the locking member 67. In accordance with the rotational movement of the pressing portion 653, the locking member 67 moves rightward (in the −Y direction) in the drawing by the urging force of the urging member 68, and as illustrated in FIG. 18B, the engaging portion 672 of the locking member 67 engages with one of the engaged portions 99*a* of the rotary body 90. That is, the locking member 67 is moved from the disengaged position (lock releasing position) to the engaged position (locking position) in the case where the pressing portion 653 is retracted from the locking member 67.

As described above, in the case where the rotary body 90 is in one of the yellow/magenta/cyan/black replacement postures and the toner cartridge 70 corresponding to the posture of the rotary body 90 is moved from the attached position to the retracted position, the locking mechanism 90L is switched from the lock releasing state to the locking state.

To be noted, after the engaging portion 672 and the engaged portion 99*a* are engaged, the pressing portion 653 of the stepped gear 65R is separated from the pressed portion 671 of the locking member 67. The rotational angle of the stepped gear 65R from the start to end of the tray pull-out operation is set to less than 360° such that the pressing portion 653 separated from the pressed portion 671 in the middle of the tray pull-out operation does not collide with the pressed portion 671 until the tray pull-out operation ends.

As illustrated in FIG. 18A, when the rotary body 90 is in one of the yellow/magenta/cyan/black replacement postures and the tray 80 is at the detachment position, the locking member 67 is held at the engaged position by the urging force of the urging member 68. That is, when the rotary body 90 is in one of the yellow/magenta/cyan/black replacement postures and the corresponding toner cartridge 70 is at the retracted position, the locking mechanism 90L is maintained in the locking state.

The operation of each element of the locking mechanism 90L in the case of moving the tray 80 from the detachment position to the accommodation position (case of performing the tray pull-in operation) is reversed from the case of moving the tray 80 from the accommodation position toward the detachment position. That is, the linking rack 66 moves rightward (leftward with respect to the apparatus body 1A, in the −Y direction) in FIG. 17B. The stepped gear 65R receives the driving force from the linking rack 66 and rotates in the counterclockwise direction in the drawing. Then, the pressing portion 653 of the stepped gear 65R abuts the pressed portion 671 of the locking member 67, and pushes in the locking member 67 in a direction (+Y direction) opposite to the urging direction of the urging member 68. As a result of this, the locking member 67 moves leftward (in the +Y direction) in FIG. 17A against the urging force of the urging member 68, and the engaging portion 672 of the locking member 67 disengages from the engaged portion 99*a* of the rotary body 90 as illustrated in FIG. 18A. That is, in the case where the pressing portion 653 presses the locking member 67, the locking member 67 is moved from the engaged position (locking position) to the disengaged position (lock releasing position).

As described above, in the case where the rotary body 90 is in one of the yellow/magenta/cyan/black replacement postures and the toner cartridge 70 corresponding to the posture of the rotary body 90 is moved from the retracted position to the attached position, the locking mechanism 90L is switched from the locking state to the lock releasing state.

Here, as will be described later with reference to FIGS. 22A to 22D, in the case of performing the tray pull-out operation, the driving racks 15 (driving members) are configured to start moving toward the pinion gears 94 from positions (lower positions) away from the pinion gears 94. The locking mechanism 90L of the present embodiment is configured such that the driving racks 15 and the pinion gears 94 engage with each other after the locking mechanism 90L switches from the lock releasing state to the locking state in the course of the tray pull-out operation. That is, the locking mechanism 90L switches from the lock releasing state to the locking state after the driving racks 15 (driving members) have started moving from positions away from the pinion gears 94 (driven portions) toward the pinion gears 94 and before the driving racks 15 come into contact with the pinion gears 94.

As a result of this, the driving racks 15 and the pinion gears 94 engage with each other in a state in which the rotation of the rotary body 90 is restricted (that is, in a state in which the displacement of the pinion gears 94 is suppressed). As a result of this, more reliable engagement between the driving racks 15 and the pinion gears 94 can be realized.

In addition, the locking mechanism 90L of the present embodiment is configured such that the locking mechanism 90L switches from the locking state to the lock releasing state after the engagement between the driving racks 15 and the pinion gears 94 is cancelled in the course of movement of the tray 80 from the detachment position to the accommodation position. As a result of this, a possibility that the rotary body 90 is displaced in the rotational direction by the force that the pinion gears 94 receive from the driving racks 15 can be lowered.

As described above, the rotary body 90 is locked in the replacement posture by the locking mechanism 90L of the rotary body 90 in a state in which the tray 80 is at the detachment position. Therefore, occurrence of an engagement failure between the pinion gears 94 and the driving racks 15 can be suppressed in the pull-out/pull-in operation of the tray 80.

Modification Example of Locking Mechanism

To be noted, although the locking mechanism 90L is disposed only on one side of the rotary body 90 in the rotational axis direction (Y direction) of the rotary body 90 in the present embodiment, a locking mechanism 90L similar to the locking mechanism 90L may be disposed on each side of the rotary body 90.

In addition, the shape of the engaging portion 672 of the locking member 67 and the shape of the engaged portion 99*a* of the rotary body 90 is not limited to those described in the present embodiment as long as the rotation of the rotary body 90 can be restricted by the engagement between the engaging portion 672 and the engaged portion 99*a*. For example, a configuration in which the rotation of the rotary body 90 is restricted by a protrusion shape (engaged portion) provided on the rotary body 90 abutting an abutting surface (engaging portion) having a flat surface shape provided on the locking member 67 may be employed.

In addition, the locking member 67 may be linked to a member other than the linking rack 66. The locking member 67 is preferably linked to one of the elements of the driving device 98 provided in the apparatus body 1A among the driving system for moving the toner cartridge 70. For example, a rack portion may be added to the locking member 67 such that the locking member 67 is linked to a driving rack 15 via a pinion gear, and thus the locking member 67 may be configured to move in an interlocked manner with the driving rack 15.

In addition, in the present embodiment, a configuration in which the driving device 98 (transmission device) for moving the toner cartridge 70 between the attached position and the retracted position and the locking mechanism 90L are mechanically moved in an interlocked manner has been described as an example. The configuration is not limited to this, and a locking mechanism that is not mechanically interlocked with the driving device 98 (transmission device) and switches between the locking state and the lock releasing state on the basis of an instruction from the controller 30 (FIG. 2) may be used. For example, a solenoid unit including a plunger movable between the engaged position where the engaging portion engages with one of the engaged portions 99*a* of the rotary body 90 and a disengaged position where the engaging portion disengages from the engaged portions 99*a* may be used as the locking mechanism. In this case, a state of the solenoid unit in which the plunger is at the engaged position is a locking state, and a state of the solenoid unit in which the plunger is at the disengaged position is a lock releasing state.

Regulation of Inter-Gear Distance Between Pinion Gear and Driving Rack

Next, a configuration of suppressing variations in the inter-gear distance (hereinafter may be simply referred to as an inter-gear distance) between the pinion gear 94 and the driving rack 15 will be described. In the case where there are variations in the inter-gear distance, there is a possibility that the engagement between the driving rack 15 and the pinion gear 94 becomes less firm, and tooth-skipping can occur in some cases. Therefore, it is preferable that the variations in the inter-gear distance are suppressed.

The inter-gear distance between the pinion gear 94 and the driving rack 15 is a distance between the pitch circle of the pinion gear 94 and the pitch line of the rack gear portion of the driving rack 15 engaging with the pinion gear 94 as viewed in the rotational axis direction of the pinion gear 94. The pitch circle mentioned herein is a circle (base pitch circle) serving as a base of the shape of the gear. In addition, the pitch line mentioned herein is a straight line on a plane (base plane) serving as a base of the shape of the rack gear.

In the case where the pinion gear 94 and the driving rack 15 are at ideal relative positions, the pitch circle of the pinion gear 94 and the pitch line of the driving rack 15 are in contact with each other at one point (pitch point), and the inter-gear distance is “0”. In the case where the relative position of the pinion gear 94 or the driving rack 15 is displaced, mainly the value of the inter-gear distance increases. As a case where the displacement of the relative position occurs, possible cases include a case where the rotary body 90 rotates about the rotational axis 90C, a case where the rotary body 90 swings about the swing shaft 91 (FIG. 4A), and a case where the driving rack 15 moves in a direction different from the slide direction (Z direction) due to a backlash (play). The drive can be transmitted between the pinion gear 94 and the driving rack 15 without a problem in the case where the inter-gear distance is relatively small, but there is a possibility that the stability of drive transmission is lost in the case where the inter-gear distance increases beyond an allowable range.

The configuration for regulating the inter-gear distance will be described with reference to FIGS. 19A to 23.

Figure 19A:
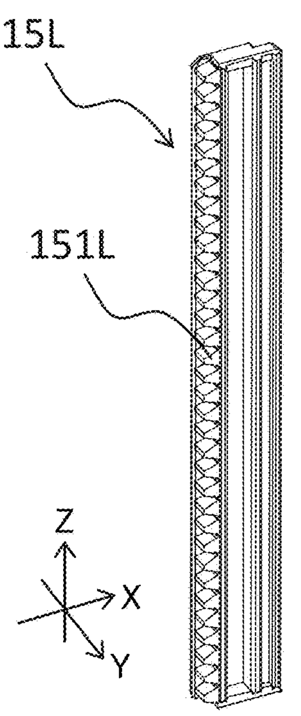
FIGS. 19A to 19D are each a perspective view of a driving rack according to the first embodiment.
Figure 19B:
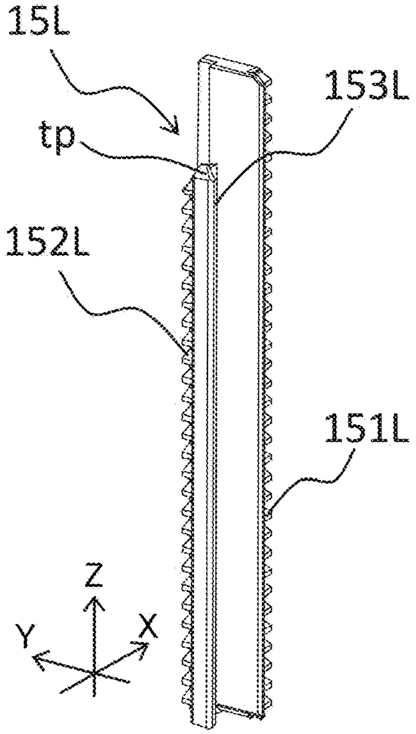
Figure 19C:
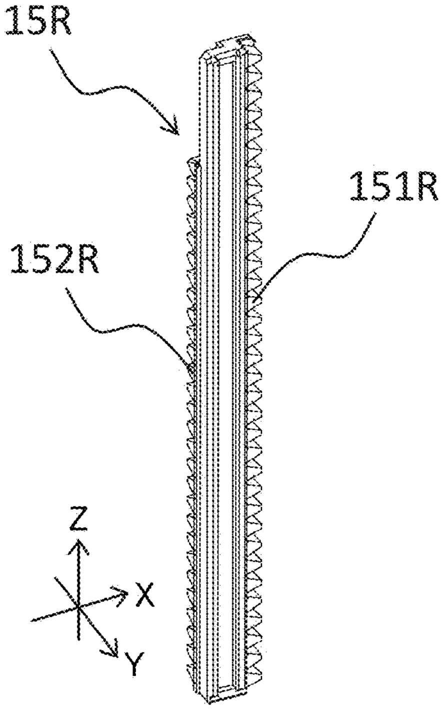
Figure 19D:
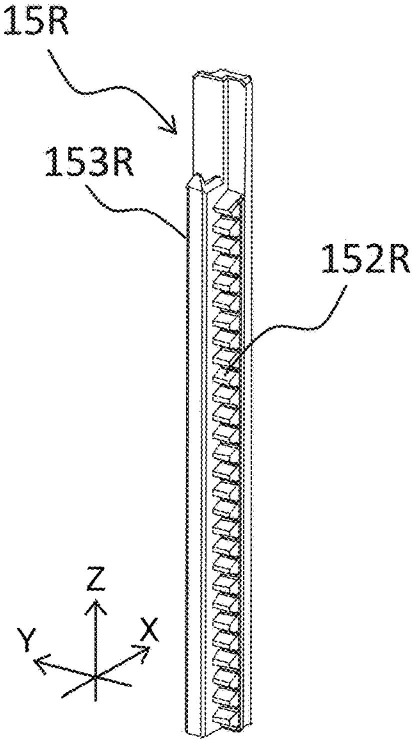

FIGS. 19A and 19B are each a perspective view of the driving rack 15L. FIGS. 19C and 19D are each a perspective view of the driving rack 15R.

As illustrated in FIGS. 19A and 19B, an input rack portion 151L, an output rack portion 152L, and an engaging portion 153L are formed in the driving rack 15L. The input rack portion 151L is a rack shape which engages with the driving rack input gear 64L and to which the driving force from the motor M2 is transmitted (input). The output rack portion 152L is a rack shape which engages with a pinion gear 94 (any one of the pinion gears 94*y*L to 94*k*L) and which transmits (outputs) the driving force from the motor M2 to the pinion gear 94. The input rack portion 151L and the output rack portion 152L are formed as a plurality of teeth arranged in the Z direction that is a slide direction of the driving rack 15L. In addition, as viewed in the Z direction, the protrusion direction of the teeth of the input rack portion 151L and the protrusion direction of the teeth of the output rack portion 152L are orthogonal to each other. The engaging portion 153L will be described later.

As illustrated in FIGS. 19C and 19D, similarly to the driving rack 15L, an input rack portion 151R, an output rack portion 152R, and an engaging portion 153R are formed in the driving rack 15R. The input rack portion 151R is a rack shape which engages with the driving rack input gear 64R and to which the driving force from the motor M2 is transmitted (input). The output rack portion 152R is a rack shape which engages with a pinion gear 94 (any one of the pinion gears 94*y*R to 94*k*R) and which transmits (outputs) the driving force from the motor M2 to the pinion gear 94. The input rack portion 151R and the output rack portion 152R are formed as a plurality of teeth arranged in the Z direction that is a slide direction of the driving rack 15R. In addition, as viewed in the Z direction, the protrusion direction of the teeth of the input rack portion 151R and the protrusion direction of the teeth of the output rack portion 152R are orthogonal to each other. The engaging portion 153R will be described later.

The output rack portions 152L and 152R are each an example of a force transmission portion configured to engage with a pinion gear 94 serving as a driven portion to transmit the driving force. The engaging portions 153L and 153R have a function to suppress a situation in which the driving racks 15L and 15R (driving members) and the rotary body 90 (rotary) relatively move (with respect to each other) in such a manner that the output rack portions 152L and 152R (force transmission portions) move away from the pinion gears 94 (driven portions).

The driven portions of the present embodiment include the pinion gears 94 (94*y*L to 94*k*L) serving as first force applied portions provided at one end portion of the rotary body 90 in the rotational axis direction of the rotary body 90, and the pinion gears 94 (94*y*R to 94*k*R) serving as second force applied portions provided at the other end portion of the rotary body 90. The driving members of the present embodiment include the driving rack 15L serving as a first force applying member that engages with the first force applied portion, and the driving rack 15R serving as a second force applying member that engages with the second force applied portion. The output rack portions 152L and 152R (force transmission portions) and the engaging portions 153L and 153R are respectively provided for the driving racks 15L and 15R.

Figure 20A:
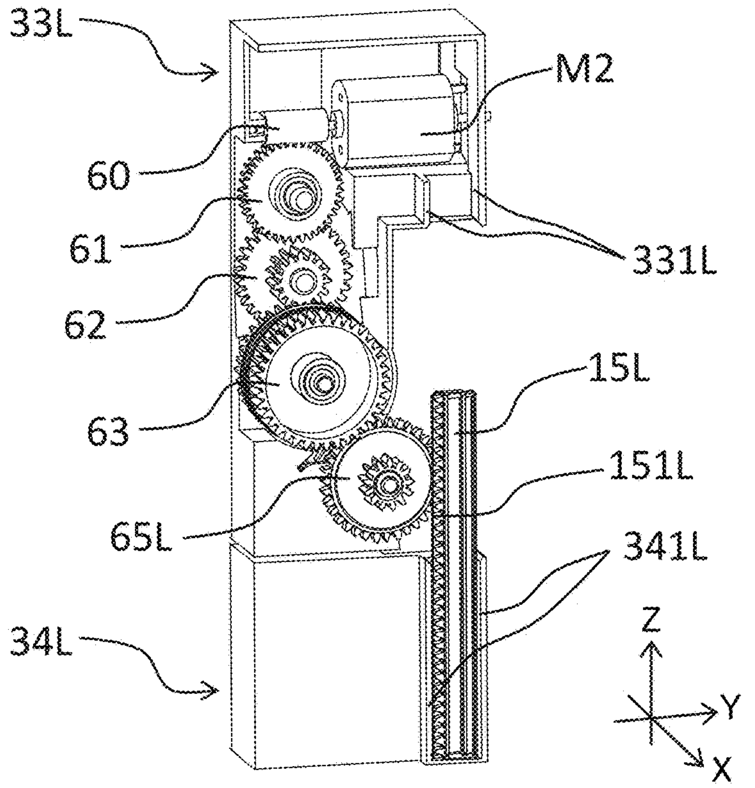
FIGS. 20A and 20B are each a perspective view of elements related to holding of the driving rack according to the first embodiment.
Figure 20B:
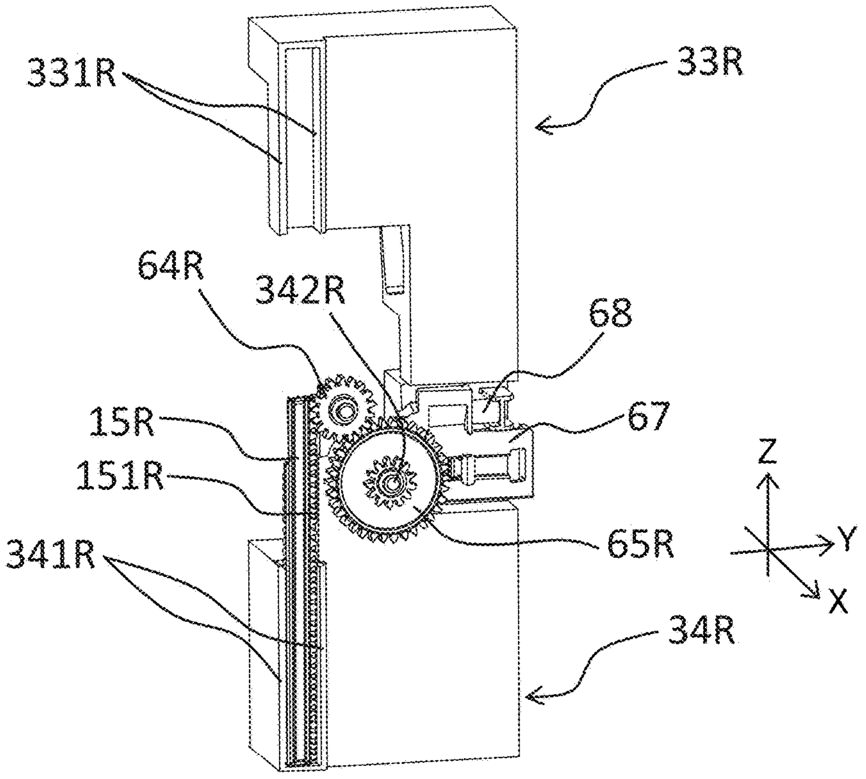

FIGS. 20A and 20B are respectively diagrams illustrating holding configurations of the driving racks 15L and 15R. FIG. 20A illustrates the holding configuration of the driving rack 15L. FIG. 20B illustrates the holding configuration of the driving rack 15R.

As illustrated in FIGS. 20A and 20B, the driving rack 15L is slidably held by a lower holding member 34L and an upper holding member 33L provided in the apparatus body 1A. The driving rack 15R is slidably held by the lower holding member 34R and an upper holding member 33R provided in the apparatus body 1A. The lower holding members 34L and 34R and the upper holding members 33L and 33R are members fixed to the frame 16 of the apparatus body 1A.

More specifically, as illustrated in FIG. 20A, the driving rack 15L is supported by a lower guide portion 341L of the lower holding member 34L so as to be slidable in the up-down direction (Z direction) of the apparatus body 1A. In the case where the driving rack 15L has moved upward (in the +Z direction) with respect to the apparatus body 1A from the position of FIG. 20A, the driving rack 15L is slidably supported by an upper guide portion 331L of the upper holding member 33L.

The lower guide portion 341L and the upper guide portion 331L of the present embodiment are each a groove shape formed in a slide direction of the driving rack 15L. The width of the groove shape in a direction (Y direction herein) intersecting with the slide direction of the driving rack 15L corresponds to the width of the driving rack 15L. Therefore, displacement of the driving rack 15R in a direction intersecting with the slide direction can be suppressed. To be noted, the upper holding member 33L supports the motor M2, and rotatably supports the stepped gears 61 and 62, the idle gear 63, and the stepped gear 65L.

In addition, as illustrated in FIG. 20B, the driving rack 15R is supported by a lower guide portion 341R of the lower holding member 34R so as to be slidable in the up-down direction (Z direction) of the apparatus body 1A. In the case where the driving rack 15R has moved upward (in the +Z direction) with respect to the apparatus body 1A from the position of FIG. 20B, the driving rack 15R is slidably supported by an upper guide portion 331R of the upper holding member 33R.

The lower guide portion 341R and the upper guide portion 331R of the present embodiment are each a groove shape formed in a slide direction of the driving rack 15R. The width of the groove shape in a direction (Y direction herein) intersecting with the slide direction of the driving rack 15R corresponds to the width of the driving rack 15R. Therefore, displacement of the driving rack 15R in a direction intersecting with the slide direction can be suppressed. In addition, the lower holding member 34R rotatably supports the stepped gear 65R and the driving rack input gear 64R, and supports the locking member 67 so as to be slidable in the left-right direction (Y direction) of the apparatus body 1A.

Although the upper holding member 33L supports the motor M2 and a plurality of gears together with the driving rack 15L in the present embodiment, the motor M2 and the like may be supported by a different member. In addition, although the lower holding member 34R supports the stepped gear 65R, the driving rack input gear 64R, and the locking member 67, these may be supported by a different member.

Figure 21A:
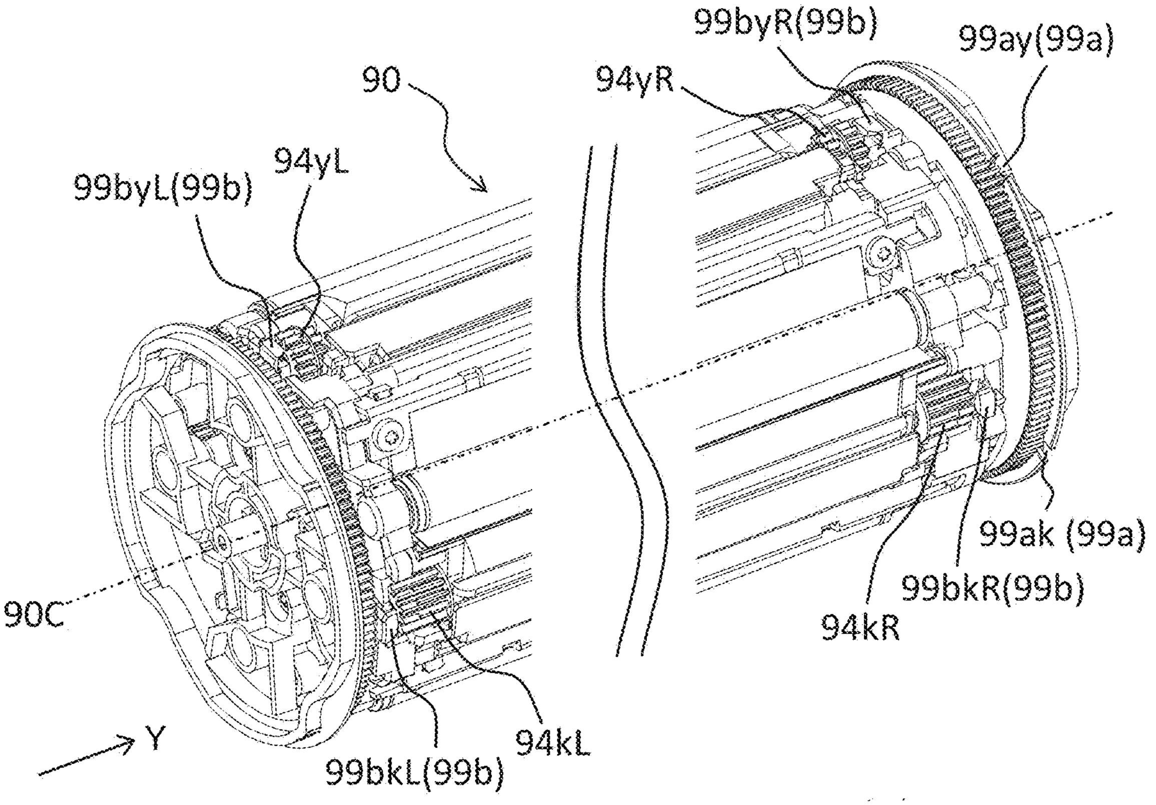
FIGS. 21A and 21B are each a perspective view of the rotary body according to the first embodiment.
Figure 21B:
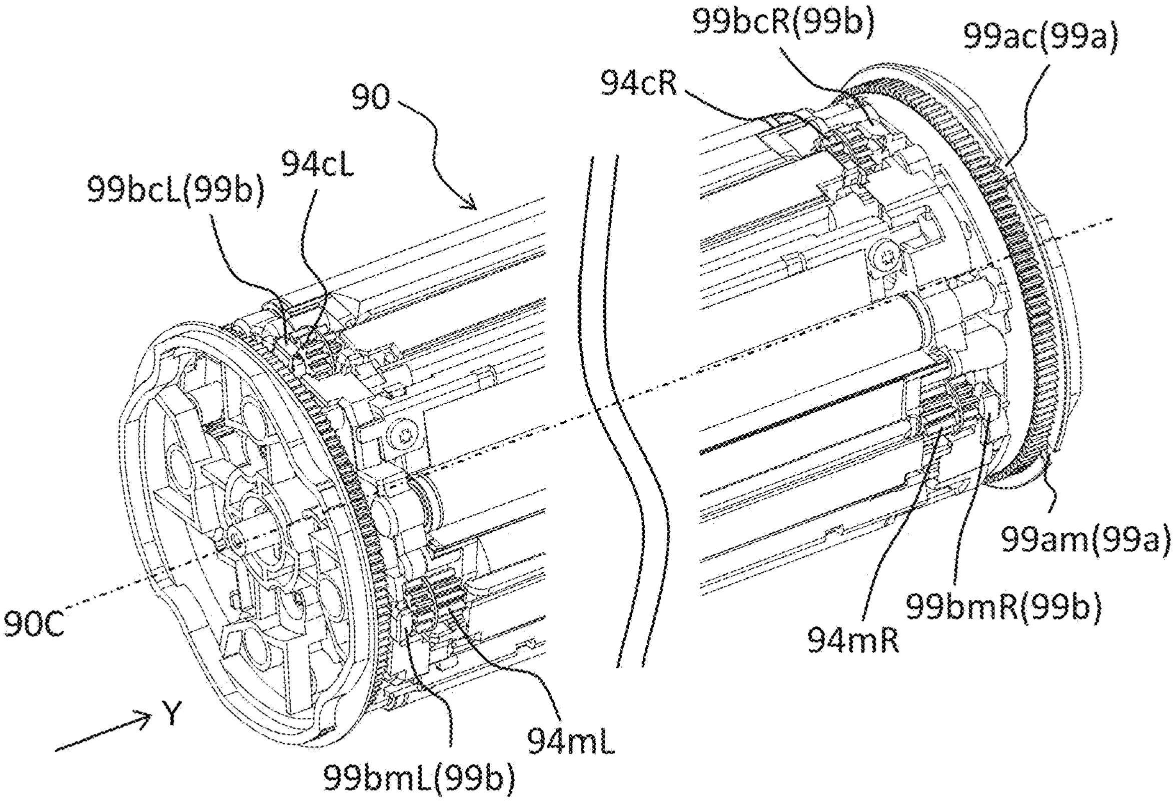

FIGS. 21A and 21B are each a perspective view of the rotary body 90. FIG. 21B illustrates a state in which the rotary body 90 of FIG. 21A has been rotated by 180° about the rotational axis 90C. To be noted, in FIGS. 21A and 21B, illustration of the center portion of the rotary body 90 in the Y direction is omitted.

As illustrated in FIGS. 21A and 21B, one engaged portion 99*b* is formed in the vicinity of each pinion gear 94 of the rotary body 90. That is, the rotary body 90 includes an engaged portion 99*by*L corresponding to the pinion gear 94*y*L, an engaged portion 99*bm*L corresponding to the pinion gear 94*m*L, an engaged portion 99*bc*L corresponding to the pinion gear 94*c*L, and an engaged portion 99*bk*L corresponding to the pinion gear 94*k*L. In addition, the rotary body 90 includes an engaged portion 99*by*R corresponding to the pinion gear 94*y*R, an engaged portion 99*bm*R corresponding to the pinion gear 94*m*R, an engaged portion 99*bc*R corresponding to the pinion gear 94*c*R, and an engaged portion 99*bk*R corresponding to the pinion gear 94*k*R. The four engaged portions 99*by*L to 99*bk*L on the left side are arranged at an interval of 90° about the rotational axis 90C, and the four engaged portions 99*by*R to 99*bk*R on the right side are also arranged at an interval of 90° about the rotational axis 90C.

The left-side engaged portions 99*by*L to 99*bk*L are each an example of a first engaged portion to be engaged with the engaging portion 153L of the driving rack 15L serving as a first force applying member. The right-side engaged portions 99*by*R to 99*bk*R are each an example of a second engaged portion to be engaged with the engaging portion 153R of the driving rack 15R serving as a second force applying member.

Figure 22A:
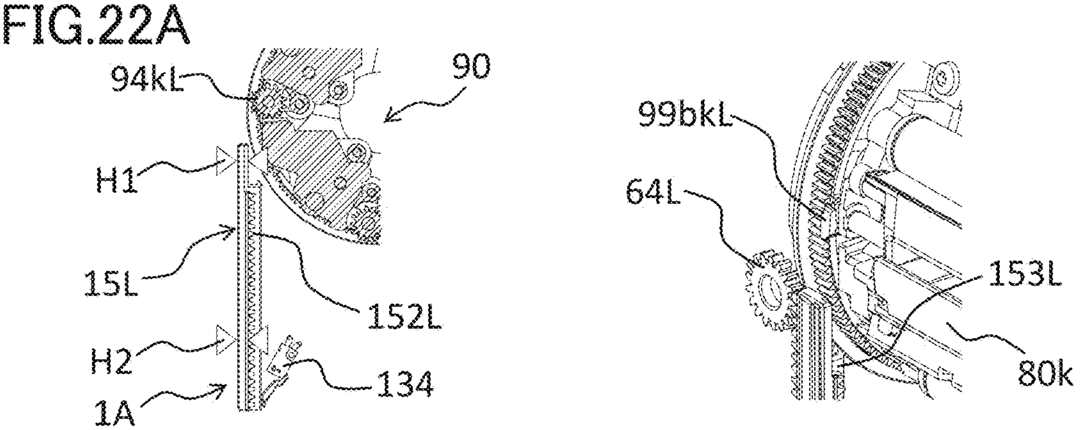
FIGS. 22A to 22D are each an explanatory diagram of elements related to regulation of an inter-gear distance according to the first embodiment.
Figure 22B:
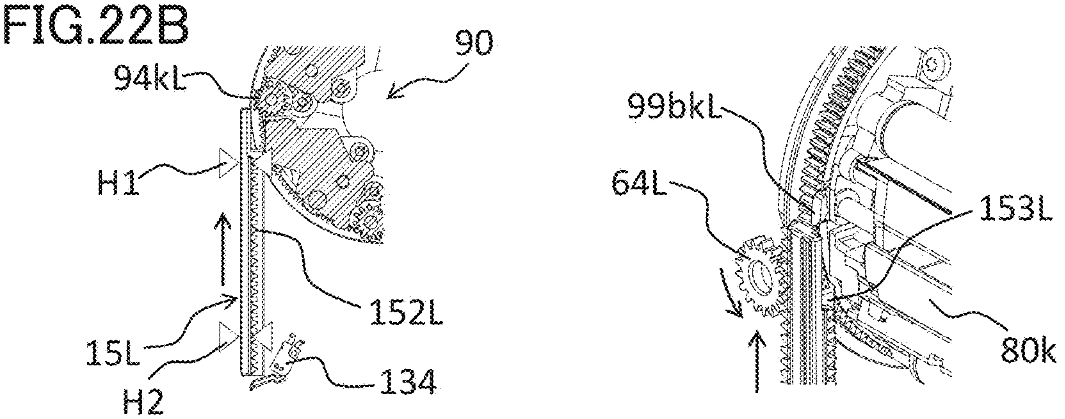
Figure 22C:
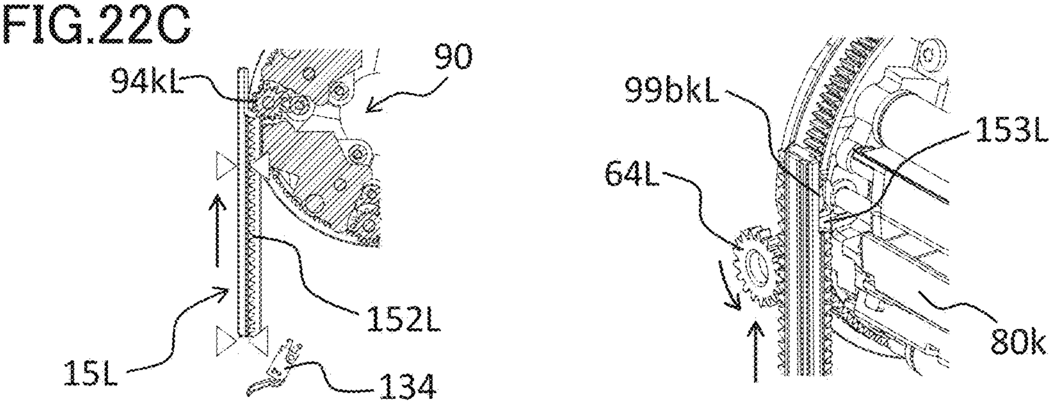

FIGS. 22A to 22D are each a diagram illustrating elements related to regulation of the inter-gear distance. The left side of each of FIGS. 22A to 22D illustrates a cross-section orthogonal to the rotational axis C of the rotary body 90. The right side of each of FIGS. 22A to 22D is a perspective view of the left side portion of the rotary body 90. To be noted, on the right side (perspective view) of each of FIGS. 22A to 22C, illustration of the pinion gear 94*k*L is omitted.

The operation of the driving racks 15 and the pinion gears 94*k* in the tray pull-out operation of the tray 80*k* will be described below. Here, the operation of the driving racks 15 and the pinion gears 94 in the tray pull-out operation of the trays 80*y* to 80*c* is substantially the same as the operation of the driving racks 15 and the pinion gears 94*k*, and therefore the description thereof will be omitted. In addition, description will be given by using the driving rack 15L and the pinion gear 94*k*L disposed on the left side of the apparatus body 1A. The operation of the driving rack 15R and the pinion gear 94*k*R disposed on the right side of the apparatus body 1A is substantially the same as that of the driving rack 15L and the pinion gear 94*k*L, and therefore the description thereof will be omitted.

An end portion position on the lower side (−Z side) of the apparatus body 1A in a range where the driving rack 15L is slidable will be referred to as a lower position of the driving rack 15L. An end portion position on the upper side (+Z side) of the apparatus body 1A in a range where the driving rack 15L is slidable will be referred to as an upper position of the driving rack 15L. A position of the driving rack 15L where the output rack portion 152L of the driving rack 15L comes into first contact with a tooth of the pinion gear 94*k* in the course of movement of the driving rack 15L from the lower position to the upper position will be referred to as a biting start position. A position of the driving rack 15L where the engaging portion 153L of the driving rack 15L starts engaging with the engaged portion 99*bk*L of the rotary body 90 in the course of movement of the driving rack 15L from the lower position to the upper position will be referred to as an engagement start position.

FIG. 22A illustrates a state of the driving rack 15L in the case where the tray 80*k* is at the accommodation position. In this case, the driving rack 15L is positioned at the lower position. In addition, the output rack portion 152L is not engaged with the pinion gear 94*k*L. That is, the lower position of the driving rack 15L is a position (non-engagement position) where a non-engagement state in which the output rack portion 152L (force transmission portion) of the driving rack 15L is separated from the pinion gear 94*k*L (driven portion) is taken. In addition, the engaging portion 153L of the driving rack 15L is not engaged with the engaged portion 99*bk*L of the rotary body 90.

When the driving rack 15L is at the lower position, the driving rack 15L is positioned in the front-rear direction (X direction) of the apparatus body 1A by a support portion H1 (first support portion) and a support portion H2 (second support portion). That is, the support portions H1 and H2 restrict movement of the driving rack 15L (driving member) in a direction away from the rotary body 90 (rotary). The support portions H1 and H2 are provided on the frame 16 (body frame) of the apparatus body 1A, and support the driving rack 15L (driving member). The support portions H1 and H2 are arranged at positions away from each other in the movement direction of the driving rack 15L. The movement of the driving rack 15L in the front-rear direction (X direction) of the apparatus body 1A is restricted at at least two positions away from each other in the up-down direction, and thus the inclination of the driving rack 15L is suppressed.

Figure 23:
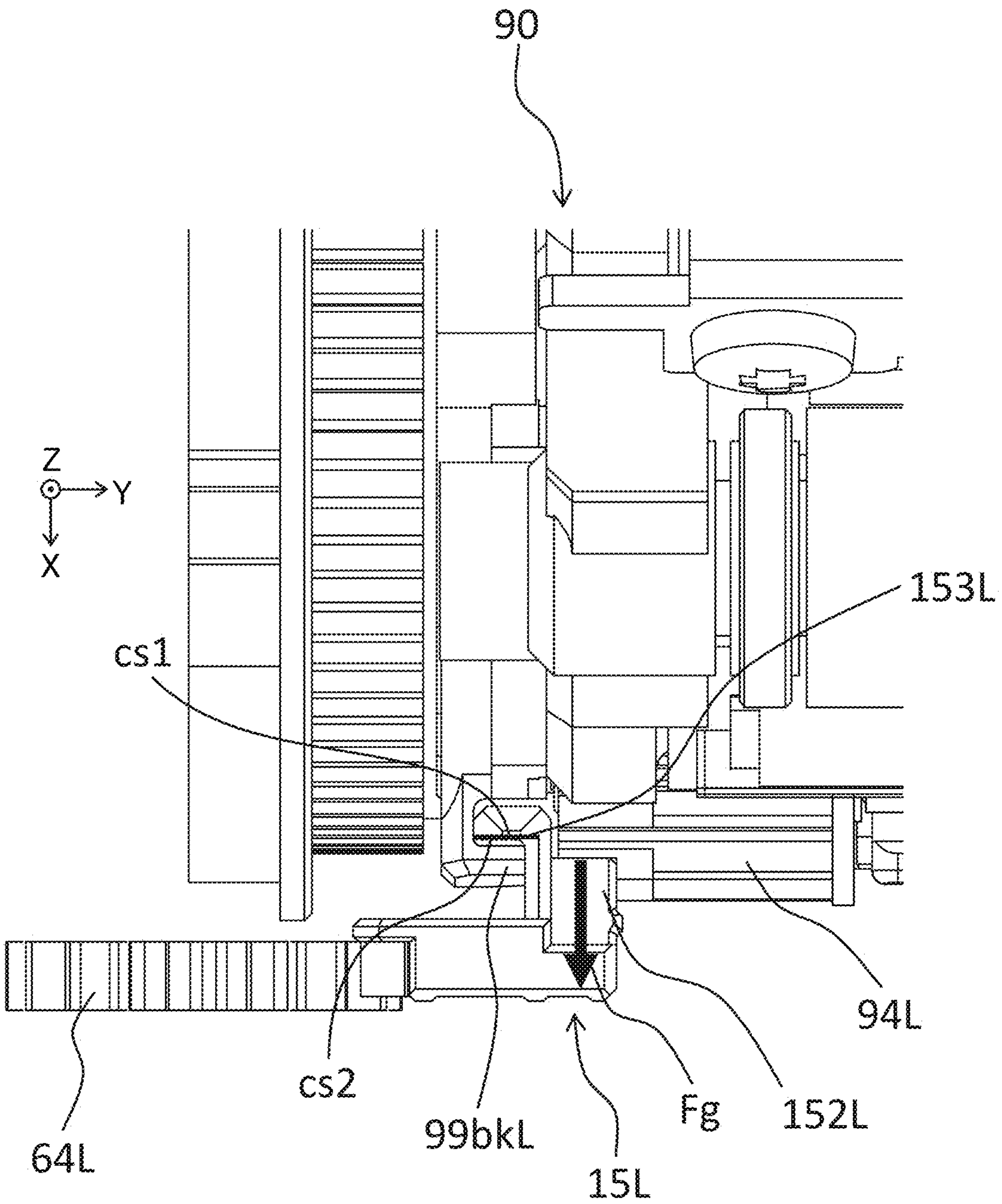
FIG. 23 is an explanatory diagram of elements related to regulation of the inter-gear distance according to the first embodiment.

Although the support portions H1 and H2 are formed on the lower guide portion 341L (FIG. 20A) of the lower holding member 34L in the present embodiment, the support portions H1 and H2 may be formed on a different member. The support portions H1 and H2 each have a shape (hook shape) that engages with the engaging portion 153L of the driving rack 15L similarly to the engaged portion 99*bk*L (FIG. 23).

Next, when the tray pull-out operation is started, the driving rack 15L moves upward (in the +Z direction) with respect to the apparatus body 1A. Then, in the state illustrated in FIG. 22B, the rotation of the rotary body 90 is restricted by the locking mechanism 90L described above. At this time, the output rack portion 152L of the driving rack 15L is not engaged with the pinion gear 94*k*L yet. In addition, the driving rack 15L is positioned in the front-rear direction (X direction) of the apparatus body 1A at the support portions H1 and H2.

When the tray pull-out operation progresses, the driving rack 15L reaches the engagement start position where the engaging portion 153L of the driving rack 15L engages with the engaged portion 99*bk*L of the rotary body 90 as illustrated in FIG. 22C. Then, the engagement between the output rack portion 152L of the driving rack 15L and the pinion gear 94*k*L starts.

That is, the engaging portion 153L of the driving rack 15L engages with the engaged portion 99*bk*L of the rotary body 90 by the time when the output rack portion 152L engages with the pinion gear 94*k*L. In other words, the driving rack 15L (driving member) moves in a direction in which the output rack portion 152L approaches the pinion gear 94*k*L from the lower position (non-engagement position) where the output rack portion 152L (force transmission portion) is separated from the pinion gear 94*k*L (driven portion). Then, after the movement of the driving rack 15L from the lower position is started, the engaging portion 153L engages with the rotary body 90 (rotary) before the output rack portion 152L engages with the pinion gear 94*k*L.

FIG. 23 is a diagram illustrating elements related to regulation of the inter-gear distance between the pinion gear 94*k*L and the driving rack 15L as viewed from the upper side (−Z side) of the apparatus body 1A. As illustrated in FIG. 23, when the output rack portion 152L engages with the pinion gear 94*k*L, the tooth surface of the output rack portion 152L receives a force Fg including a component in an arrow direction (+X direction, direction in which the gear tooth surfaces are separated from each other) in the drawing from the tooth surface of the pinion gear 94*k*L. That is, the driving rack 15L receives a force including a component in a direction (+X direction) away from the rotational axis of the pinion gear 94*k*L as viewed in the slide direction of the driving rack 15L.

Here, as illustrated in FIG. 23, the engaging portion 153L of the driving rack 15L has an abutting surface cs1 (first surface) facing in a direction (+X direction) away from the rotational axis of the pinion gear 94*k*L. In addition, the engaged portion 99*bk*L of the rotary body 90 has an abutted surface cs2 (second surface) configured to face in the −X direction when the rotary body 90 is in the black replacement posture. Therefore, when the engaging portion 153L and the engaged portion 99*bk*L are engaged with each other, relative movement of the driving rack 15L with respect to the rotary body 90 in the +X direction is restricted. In addition, when the engaging portion 153L and the engaged portion 99*bk*L are engaged with each other, relative movement of the rotary body 90 with respect to the driving rack 15L in the −X direction is restricted.

In other words, in an orthogonal direction (X direction) orthogonal to both the movement direction (Z direction) of the driving rack 15L and the rotational axis direction (Y direction) of the pinion gear 94*k*L, the driving rack 15L is disposed on the first side (+X side) with respect to the pinion gear 94*k*L. The abutting surface cs1 (first surface) of the engaging portion 153L faces toward the first side (+X side) in the orthogonal direction. The abutted surface cs2 (second surface) of the engaged portion 99*bk*L faces toward the second side (−X side) on the opposite side to the first side in the orthogonal direction. Therefore, as a result of the abutting surface cs1 abutting the abutted surface cs2, relative movement of the driving rack 15L and the pinion gear 94*k*L in which the driving rack 15L is moved away from the rotational axis of the pinion gear 94*k*L in the orthogonal direction is restricted.

In the present embodiment, the engaging portion 153L extends in the movement direction (Z direction) of the driving rack 15L. In addition, the engaging portion 153L is a hook shape that projects on the pinion gear 94*k*L side (−X side, second side) and whose tip portion on the −X side is bent as viewed in the movement direction (Z direction) of the driving rack 15L. To be noted, the engaging portion 153L may be formed in a shape different from the hook shape as long as the shape enables restricting the relative movement of the driving rack 15L and the rotary body 90.

As described above, as a result of the engaging portion 153L of the driving rack 15L engaging with the engaged portion 99*bk*L of the rotary body 90, the relative movement of the driving rack 15L and the rotary body 90 in which the tooth surfaces of the output rack portion 152L and the pinion gear 94*k*L move away from each other is restricted. Therefore, variations in the inter-gear distance between the pinion gear 94*k*L and the driving rack 15L can be suppressed.

Incidentally, the tooth surface of the pinion gear 94*k*L receives force from the tooth surface of the output rack portion 152L of the driving rack 15L. As a result of this force, a moment in the clockwise direction in the drawing acts on the rotary body 90 on the left side of FIG. 22C. However, since the rotation of the rotary body 90 is restricted by the locking mechanism 90L described above, the rotary body 90 can maintain the black replacement posture. In addition, movement of the pinion gear 94*k*L away from the driving rack 15L caused by the rotation of the rotary body 90 can be suppressed.

Figure 22D:
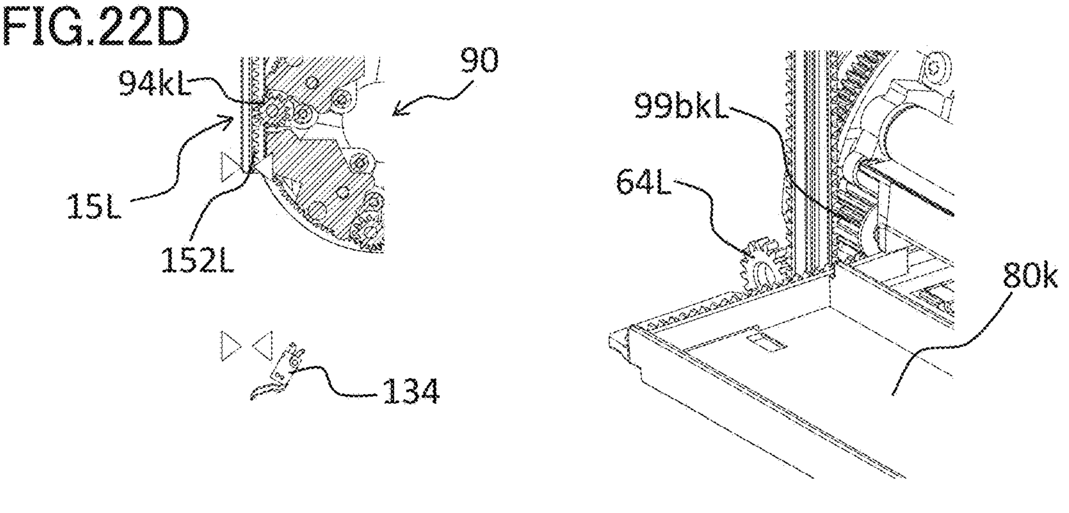

FIG. 22D illustrates a state of the driving rack 15L in a state in which the tray 80*k* is at the detachment position (state after completion of the tray pull-out operation). At this time, the driving rack 15L is at the upper position. In addition, the engagement between the engaging portion 153L of the driving rack 15L and the engaged portion 99*bk*L of the rotary body 90 is maintained. That is, the engagement between the engaging portion 153L of the driving rack 15L and the engaged portion 99*bk*L of the rotary body 90 is maintained in a period between a time point when the driving rack 15L has passed the engagement start position (FIG. 22C) and a time point when the tray 80*k* reaches the detachment position (FIG. 22D).

Therefore, in the present embodiment, the engagement between the engaging portion 153L of the driving rack 15L and the engaged portion 99*bk*L of the rotary body 90 is maintained in the entirety of the period in which the output rack portion 152L of the driving rack 15L is engaged with the pinion gear 94*k*L in the tray pull-out operation. The variations in the inter-gear distance between the pinion gear 94*k*L and the driving rack 15L can be further suppressed.

Here, in the case where the engaged portion 99*bk*L of the rotary body 90 in addition to the support portions H1 and H2 described above engages with the engaging portion 153L of the driving rack 15L, the driving rack 15L is positioned in the front-rear direction (X direction) of the apparatus body 1A at three portions apart from each other in the up-down direction. However, in the case where the support portions H1 and H2 and the engaged portion 99*bk*L are not arranged on the same straight line due to the influence of the tolerance of parts or the like, there is a possibility that the driving rack 15L interferes with the support portion H1 and H2 and the engaged portion 99*bk*L. When the interference occurs, the load on the motor M2 for driving the driving rack 15L increases, and there is a possibility that the stability of the operation of the driving rack 15L deteriorates.

Therefore, in the present embodiment, a configuration in which the lower end of the driving rack 15L passes the support portion H2 provided on the lower side before the driving rack 15L reaches the engagement start position with the engaged portion 99*bk*L is employed (FIG. 22C). That is, it is preferable that the driving rack 15L is disengaged from the first support portion (H1) or the second support portion (H2) after the driving rack 15L has started moving from the lower position (non-engagement position) and before the engaging portion 153L engages with the rotary body 90. As a result of this, the interference is less likely to occur, and the driving rack 15L can be more stably operated. The timing at which the lower end of the driving rack 15L passes the support portion H2 provided on the lower side may be immediately before the driving rack 15L reaches the engagement start position with the engaged portion 99*bk*L.

In addition, it is preferable that at least one of the upper end of the engaging portion 153L of the driving rack 15L and an end portion on the inlet side (lower end in the posture of FIG. 21A) of the engaged portion 99*bk*L is provided with an introducing portion (entrance guide) such as a taper shape. In the present embodiment, the upper end of the engaging portion 153L is provided with an introducing portion tp having a taper shape (FIG. 19B). The introducing portion tp adjusts the position of the engaging portion 153L in accordance with the engaged portion 99*bk*L as viewed in the up-down direction such that the engaging portion 153L can engage with the engaged portion 99*bk*L without the upper end of the engaging portion 153L colliding with the engaged portion 99*bk*L. To be noted, it is preferable that the introducing portion tp enters the engaged portion 99*bk*L (distal end of the introducing portion tp is positioned above the lower end of the engaged portion 99*bk*L) before the lower end of the driving rack 15L passes the support portion H2 provided on the lower side.

As a result of the engagement between the engaging portion 153L of the driving rack 15L and the engaged portion 99*bk*L of the rotary body 90, swing of the rotary body 90 about the swing shaft 91 (rotary support portion, FIG. 4A) swingably supporting the rotary body 90 is restricted. As a result of this, fluctuation of the inter-gear distance between the output rack portion 152L and the pinion gear 94*k*L caused by the swing of the rotary body 90 can be suppressed.

An advantage of suppressing the variations in the inter-gear distance in the operation (tray pull-out operation) of moving the tray 80*k* from the accommodation position to the detachment position has been described above. However, a similar advantage can be also obtained in the operation (tray pull-in operation) of moving the tray 80*k* from the detachment position to the accommodation position. That is, according to the present embodiment, variations in the inter-gear distance between the driving rack 15L and the pinion gear 94*k*L in the pull-out/pull-in operation of the tray 80*k* can be suppressed, and more stable operation can be realized.

Automatic Pull-in Function in Response to Detection of Tray Push-in

When the tray 80*k* is at the detachment position, the user can instruct the image forming apparatus 1 about execution of the tray pull-in operation by operating an operation portion (for example, a button of an operation panel) provided on the apparatus body 1A. However, if a configuration in which the tray 80*k* is automatically pulled into the accommodation position when the user pushes in the tray 80*k* positioned at the detachment position is employed, more intuitive operation can be performed, and thus the operability can be improved.

A function of automatically starting the tray-pull-in operation (automatic pull-in function) by detecting the user pushing in the tray 80*k* will be described with reference to FIGS. 24A to 25E. "Automatically" used herein means that the controller 30 determines execution of the tray pull-in operation in a state in which the user has not explicitly instructed execution of the tray pull-in operation via the operation portion or the like. In addition, although a push-in detection configuration and the automatic pull-in function for the tray 80*k* will be described below, the image forming apparatus 1 also has substantially the same push-in detection configuration and automatic pull-in function for the trays 80*y* to 80*c*.

To enable the controller 30 to detect the push-in of the tray 80*k* by the user, an element that detects the movement of the tray 80*k* itself or detects the movement of a member that moves in an interlocked manner with the tray 80*k* may be provided. In the present embodiment, as will be described in detail later, a sensor (tray pull-out sensor 135) that detects the rotation of the idle gear 63 serving as a member that moves in an interlocked manner with the tray 80*k* is provided. The tray pull-out sensor 135 is an example of a detection portion configured to change the signal thereof in the case where the tray 80*k* (support member) supporting the toner cartridge 70*k* (cartridge) has moved from the detachment position (second position) to the accommodation position (first position). The signal output from the tray pull-out sensor 135 differs between a state in which the tray 80*k* is at the detachment position and a state in which the tray 80*k* is at the accommodation position. The signal output from the tray pull-out sensor 135 differs between a state in which the toner cartridge 70*k* (cartridge) is at the attached position and a state in which the toner cartridge 70*k* (cartridge) is at the retracted position.

Incidentally, as described above, the driving system 100 of the tray 80*k* includes the motor M2 serving as a drive source, and the drive transmission mechanism 101 that transmits the driving force of the motor M2 to the tray 80*k* (FIGS. 13A and 13B). The drive transmission mechanism 101 includes the worm gear 60 and the stepped gears 61, 62, 65L, and 65R as a reduction mechanism capable of transmitting rotation of the output shaft of the motor M2 to a drive transmission element on the downstream side while reducing a rotational speed (angular velocity). By using the reduction mechanism, the tray pull-in operation can be performed by using the motor M2 which has a low output. That is, by using the reduction mechanism, a small motor can be used as the drive source, and miniaturization and cost reduction of the apparatus body 1A can be realized.

Here, in the case where the user tries to push in the tray 80*k* positioned at the detachment position, the push-in force of the user is transmitted upstream (toward the motor M2 side) to each drive transmission element of the drive transmission mechanism 101. If the motor M2 is configured to rotate in an interlocked manner with the push-in of the tray 80*k*, the push-in force required for moving the tray 80*k* increases due to the load for rotating the motor M2 in a stationary state. Particularly, in the case of a configuration in which the force of the motor M2 is transmitted to the tray 80*k* via the reduction mechanism, the force for pushing in the tray 80*k* and rotating the motor M2 further increases. In addition, in the case where the reduction mechanism includes a worm gear as in the present embodiment, the worm gear self-locks and the motor M2 cannot be rotated in a reverse direction even if the user tries to push-in the tray 80*k*. In this case, the user cannot push in the tray 80*k* in most cases.

Therefore, in the present embodiment, a configuration in which the idle gear 63 is disposed in the drive transmission path from the worm gear 60 to the tray 80*k* and the idle gear 63 rotates in an interlocked manner with the push-in of the tray 80*k* is employed. As a result of the idling of the idle gear 63, the drive transmission element (stepped gear 62) downstream of the idle gear 63 does not move in an interlocked manner with the push-in of the tray 80*k*, and therefore the user can push in the tray 80*k* with a small push-in force. Further, in the present embodiment, the push-in of the tray 80*k* is detected by using a sensor (tray pull-out sensor 135) capable of detecting the rotation of the idle gear 63 serving as a transmission unit, and the tray pull-in operation is automatically executed.

Figure 24A:
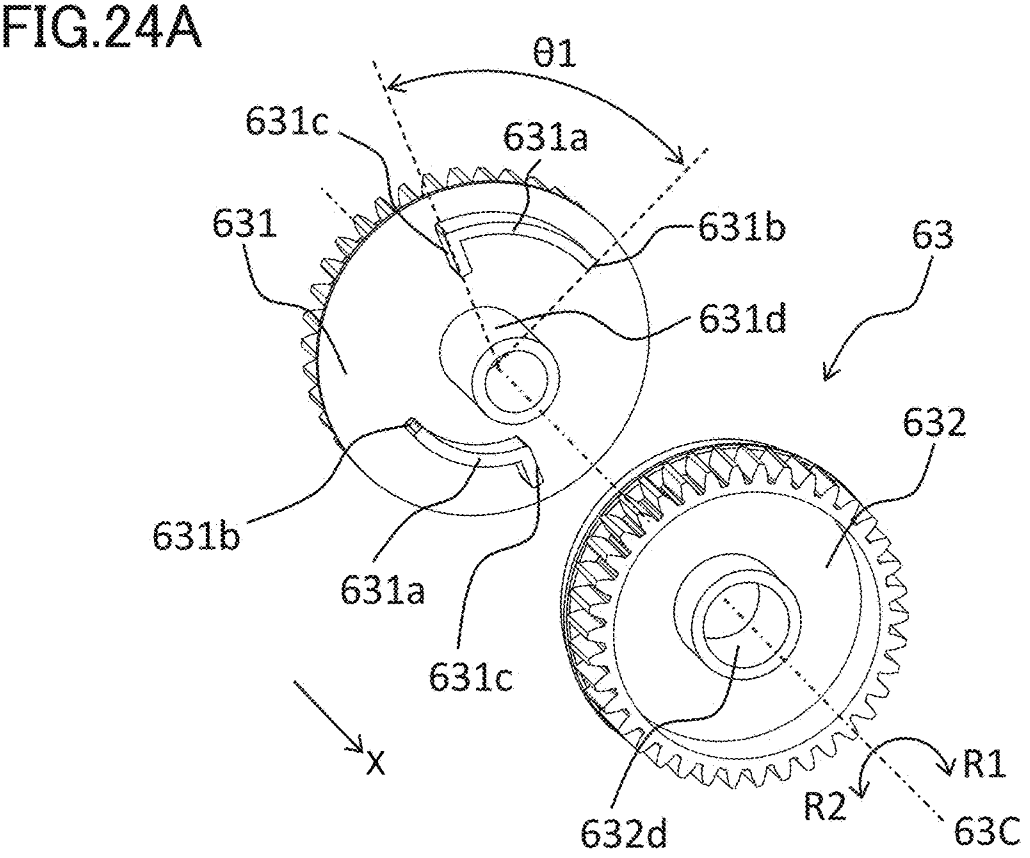
FIGS. 24A and 24B are each an explanatory diagram of a configuration of an idle gear according to the first embodiment.
Figure 24B:
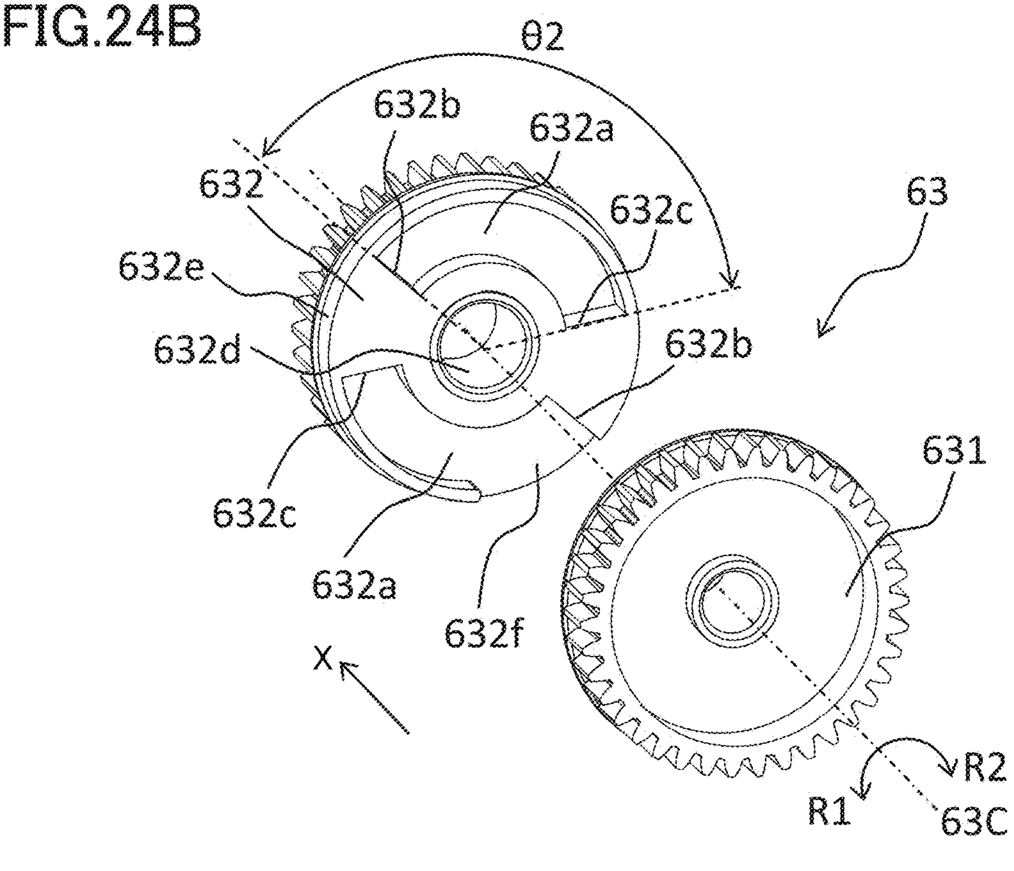

A push-in detection mechanism that detects push-in of the tray 80*k* will be described below. FIGS. 24A and 24B are each an exploded view of the idle gear 63 according to the present embodiment. FIG. 24A is a perspective view of the idle gear 63 as viewed from one side in a direction along the rotational axis 63C of the idle gear 63. FIG. 24B is a perspective view of the idle gear 63 as viewed from the other side in a direction along the rotational axis 63C.

As illustrated in FIGS. 24A and 24B, the idle gear 63 is a gear unit including two gears that are an input gear 631 and an output gear 632. The input gear 631 and the output gear 632 are arranged in the direction of the rotational axis 63C. In addition, the input gear 631 and the output gear 632 are each rotatable around the rotational axis 63C.

The input gear 631 includes a gear portion (teeth portion) that engages with the stepped gear 62 (FIG. 13A), and the driving force of the motor M2 is input to the input gear 631. That is, the input gear 631 is linked to the motor M2 via the stepped gear 62 and the like such that drive can be transmitted. The output gear 632 includes a gear portion (teeth portion) including the driving rack input gear 64L and the stepped gear 65L (FIG. 13A), and outputs a driving force toward the tray 80*k*. That is, the output gear 632 is configured to be linked to the tray 80*k* via the driving rack input gear 64L, the stepped gear 65L, and the like such that drive can be transmitted.

The idle gear 63 is an example of a transmission unit configured to transmit the driving force of the motor M2 to the tray 80*k*. In the present embodiment, the idle gear 63 functions as a transmission unit capable of taking a blocking state in which transmission of force from the tray 80*k* to the motor M2 is blocked. The input gear 631 is an example of an input portion of the transmission unit. The output gear 632 is an example of an output portion of the transmission unit.

In the description below, the rotational direction of the input gear 631 in the case where the motor M2 rotates in the normal rotation direction will be referred to as a normal rotation direction R1 of the idle gear 63. The rotational direction of the input gear 631 in the case where the motor M2 rotates in the reverse rotation direction will be referred to as a reverse rotation direction R2 of the idle gear 63.

As illustrated in FIG. 24A, protrusion portions 631*a* are formed on the input gear 631. The protrusion portion 631*a* protrudes toward the output gear 632 in a direction along the rotational axis 63C. A normal rotation abutting portion 631*b* is provided at one end portion (end portion in the normal rotation direction R1) of the protrusion portion 631*a*. A reverse rotation abutting portion 631*c* is provided at the other end portion (end portion in the reverse rotation direction R2) of the protrusion portion 631*a*. In the present embodiment, two protrusion portions 631*a* are respectively disposed at positions away from each other by 180° around the rotational axis 63C.

As illustrated in FIG. 24B, groove portions 632*a* are provided on the output gear 632. The groove portion 632*a* is a recess portion recessed from the input gear 631 toward the output gear 632 in a direction along the rotational axis 63C. A normal rotation abutted portion 632*b* is provided at one end portion (end portion in the normal rotation direction R1) of the groove portion 632*a*. A reverse rotation abutted portion 632*c* is provided at the other end portion (end portion in the reverse rotation direction R2) of the groove portion 632*a*. In the present embodiment, two groove portions 632*a* are respectively disposed at positions away from each other by 180° around the rotational axis 63C.

In addition, an outer peripheral surface 632*e* having an approximate cylindrical shape (arcuate shape) centered on the rotational axis 63C, and an outer peripheral recess portion 632*f* recessed with respect to the outer peripheral surface 632*e* toward the rotational axis 63C are formed on the output gear 632. The outer peripheral recess portion 632*f* is continuous with one of the groove portion 632*a*.

The protrusion portion 631*a* of the input gear 631 is formed in a range of an angle θ1 in the normal rotation direction R1. The groove portion 632*a* of the output gear 632 is formed in a range of an angle θ2 in the normal rotation direction R1. The range in which the protrusion portion 631*a* is formed is smaller than the range in which the groove portion 632*a* is formed. That is, θ1<θ2 holds. To be noted, although a configuration in which two protrusion portions 631*a* and two groove portions 632*a* are provided is shown in the present embodiment, the numbers of the protrusion portions 631*a* and the groove portions 632*a* may be each one, three, or more.

A cylindrical shaft portion 631*d* is formed at a center portion of the input gear 631 (FIG. 24A). A hole 632*d* is formed at a center portion of the output gear 632 (FIG. 24B). The shaft portion 631*d* of the input gear 631 engages with the hole 632*d* of the output gear 632, and thus the input gear 631 and the output gear 632 are coupled to each other to be rotatable about the same rotational axis 63C and relatively rotatable with respect to each other. In addition, the input gear 631 is rotatably supported as a result of the shaft portion 631*d* fitting with a support portion provided in the upper holding member 33L (FIG. 20A).

In a state in which the input gear 631 and the output gear 632 are coupled, the protrusion portion 631*a* is accommodated in a space inside the groove portion 632*a*. At this time, since θ1<θ2 holds, the protrusion portions 631*a* and the groove portions 632*a* allow relative rotation between the input gear 631 and the output gear 632 in an angle of θ3=θ2−θ1. That is, the input gear 631 and the output gear 632 can relatively rotate (idle) within the range of the angle θ3.

FIGS. 25A to 25E are each a diagram for describing the push-in detection mechanism of the tray 80*k*. Each diagram on the right side of FIGS. 25A to 25E indicates the position of the tray 80*k*. Each diagram on the left side of FIGS. 25A to 25E is a diagram illustrating the state of the idle gear 63 and the tray pull-out sensor 135 corresponding to the diagram on the right side.

As illustrated in FIGS. 25A to 25E, the tray pull-out sensor 135 is disposed so as to be capable of coming into contact with the outer peripheral surface 632*e* of the output gear 632. The tray pull-out sensor 135 is configured such that the detection signal thereof switches between a state in which the tray pull-out sensor 135 is in contact with the outer peripheral surface 632*e* of the output gear 632 and a state in which the tray pull-out sensor 135 is not in contact with the outer peripheral surface 632*e* (that is, the tray pull-out sensor 135 opposes the outer peripheral recess portion 632*f*). That is, the tray pull-out sensor 135 is capable of detecting whether or not the output gear 632 is in a predetermined rotation range (range in which the tray pull-out sensor 135 opposes the outer peripheral recess portion 632*f*).

The output gear 632 is an example of a rotary member capable of rotating about a rotation axis. The signal that the tray pull-out sensor 135 serving as a detection portion of the present embodiment outputs changes in accordance with the rotation of the output gear 632. In addition, in the present embodiment, the rotational angle of the output gear 632 (rotary member) while the tray 80*k* (support member) moves from the accommodation position (first position) to the detachment position (second position) is less than 360°. That is, since the position of the tray 80*k* when the signal of the tray pull-out sensor 135 changes is uniquely determined, precise control according to the position of the tray 80*k* can be realized.

An operation performed after the tray pull-out operation of the tray 80*k* and before the automatic tray pull-in operation caused by the push-in of the tray 80*k* by the user will be described with reference to FIGS. 25A to 25E and flowcharts of FIGS. 35 and 36.

Figure 35:
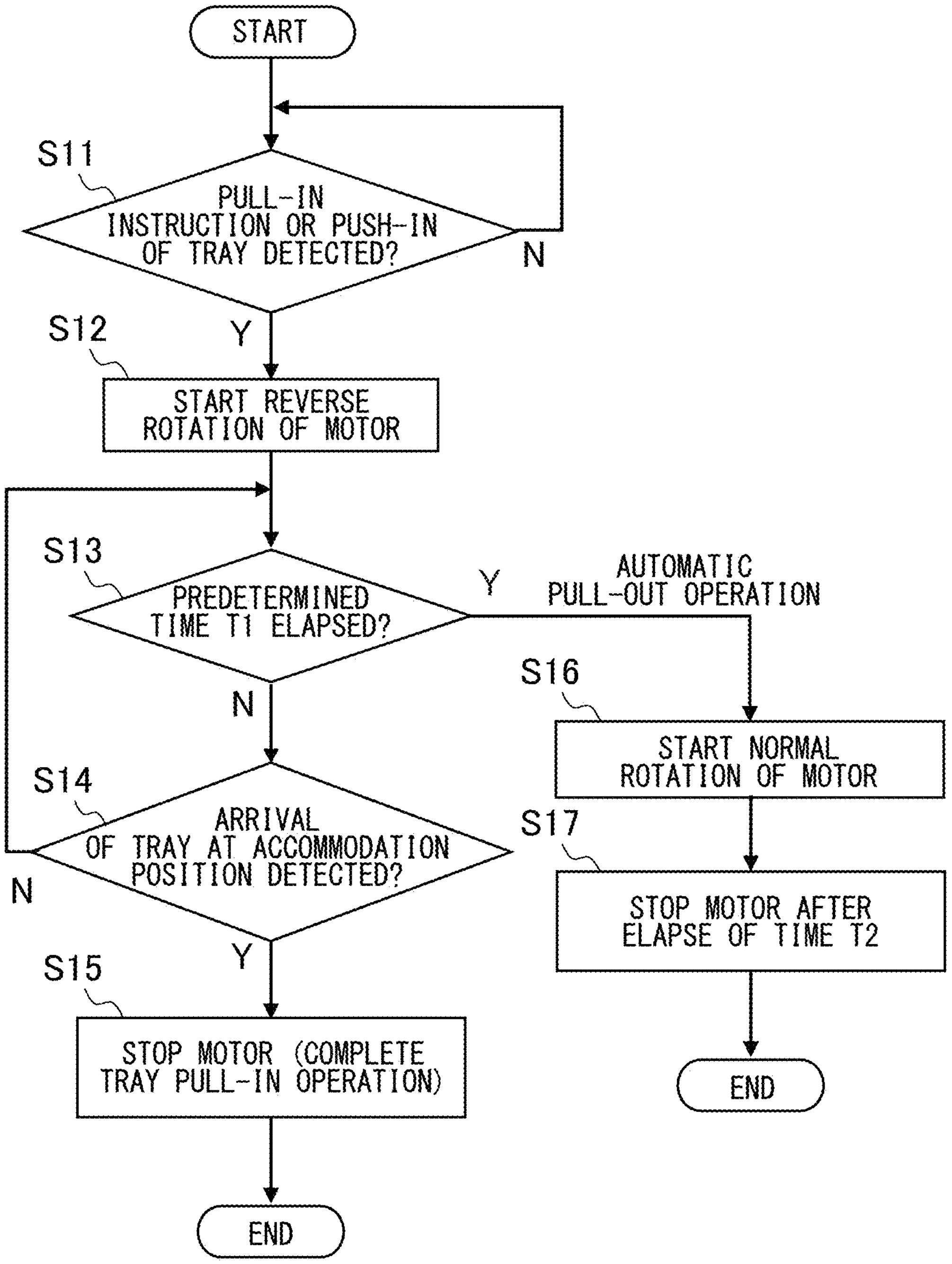
FIG. 35 is a flowchart of a tray pull-in operation according to the first embodiment.

FIG. 35 is a flowchart illustrating a procedure of the controller 30 (FIG. 2) executing the tray pull-in operation. To be noted, processing in the case where abnormality is detected during the tray pull-in operation (S13Y) will be described later. FIG. 36 is a flowchart illustrating a procedure of the controller 30 (FIG. 2) executing the tray pull-out operation. To be noted, processing in the case where abnormality is detected during the tray pull-in operation (S23Y) will be described later.

Figure 25A:
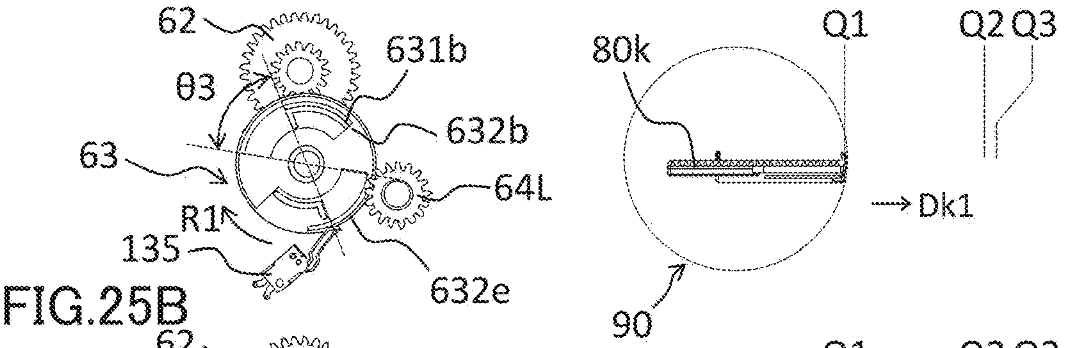
FIGS. 25A to 25E are each an explanatory diagram of elements related to push-in detection of the tray according to the first embodiment.

FIG. 25A illustrates a state of the idle gear 63 and the tray pull-out sensor 135 when the tray 80*k* is at the accommodation position Q1. At this time, the tray pull-out sensor 135 is in contact with the outer peripheral surface 632*e* of the output gear 632. To be noted, in FIGS. 25A to 25E, the position of the tray 80*k* is indicated on the basis of the leading end of the tray 80*k* in the pull-out direction Dk1.

Figure 36:
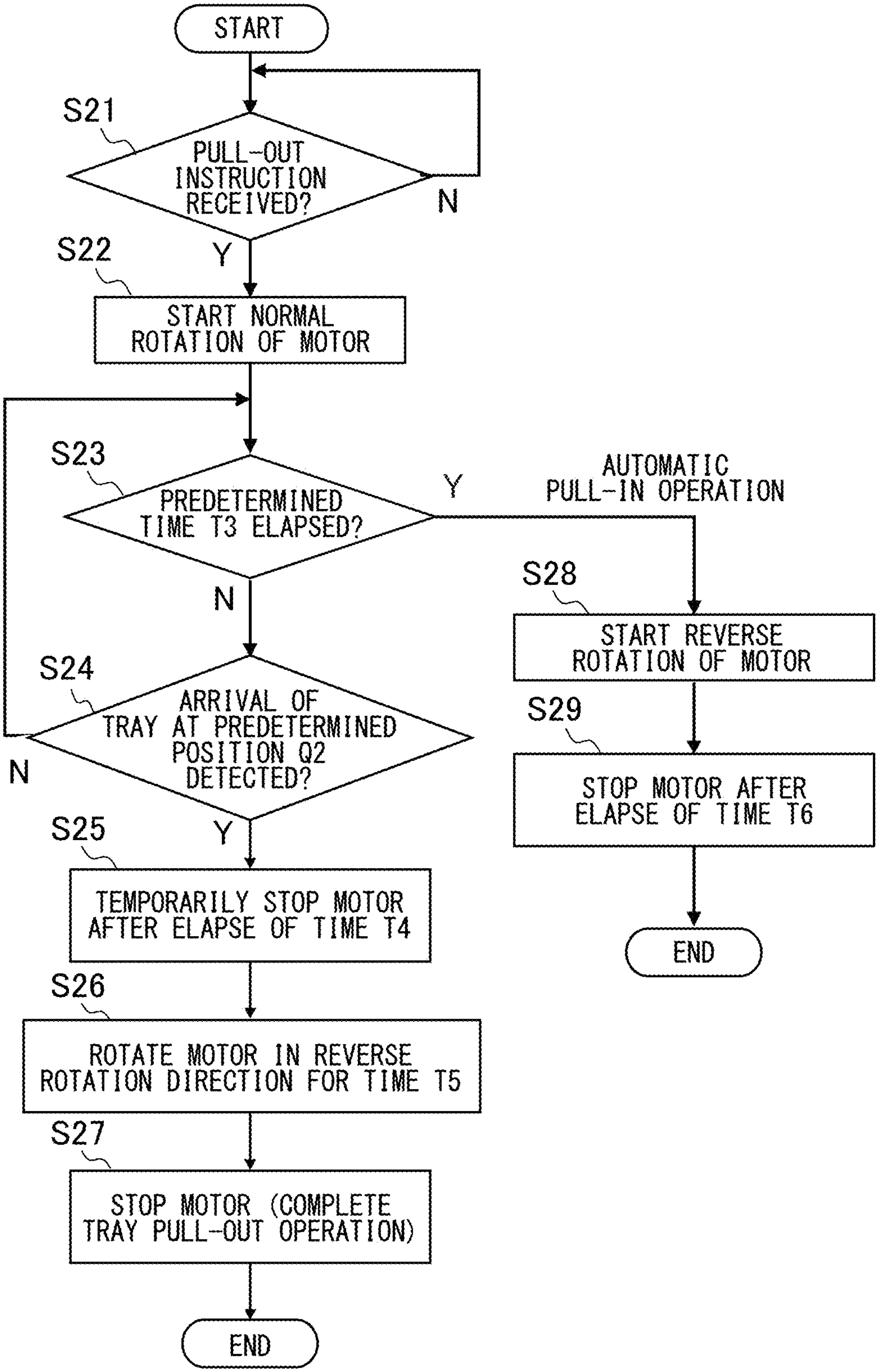
FIG. 36 is a flowchart of a tray pull-out operation according to the first embodiment.

When the user instructs the tray pull-out operation (S1 of FIG. 36) by operating a button of the operation panel or the like, the controller 30 rotates the motor M2 in the normal rotation direction (S22 of FIG. 36). Then, the driving force of the motor M2 is transmitted to the tray 80*k*, and thus the tray 80*k* moves in the pull-in direction Dk1. At this time, the input gear 631 of the idle gear 63 receives the driving force from the motor M2 and rotates in the normal rotation direction R1. In addition, the normal rotation abutting portion 631*b* (first engaging portion) of the input gear 631 abuts the normal rotation abutted portion 632*b* (first abutted portion) of the output gear 632, thus the driving force is transmitted from the input gear 631 to the output gear 632, and the output gear 632 also rotates in the normal rotation direction R1.

Figure 25B:
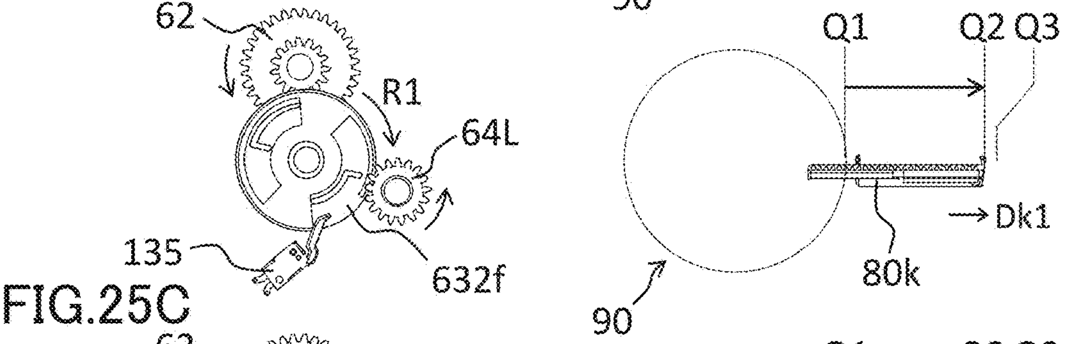

FIG. 25B illustrates the state of the idle gear 63 and the tray pull-out sensor 135 when the tray 80*k* has been pulled out to a predetermined position Q2 between the accommodation position and the detachment position. When the tray 80*k* reaches the predetermined position Q2, a state in which the tray pull-out sensor 135 opposes the outer peripheral surface 632*e* of the output gear 632 is switched to a state in which the tray pull-out sensor 135 opposes the outer peripheral recess portion 632*f* of the output gear 632. The controller 30 detects that the tray 80*k* has reached the predetermined position Q2 on the basis of the change in the detection signal of the tray pull-out sensor 135 (S24Y of FIG. 36).

Figure 25C:
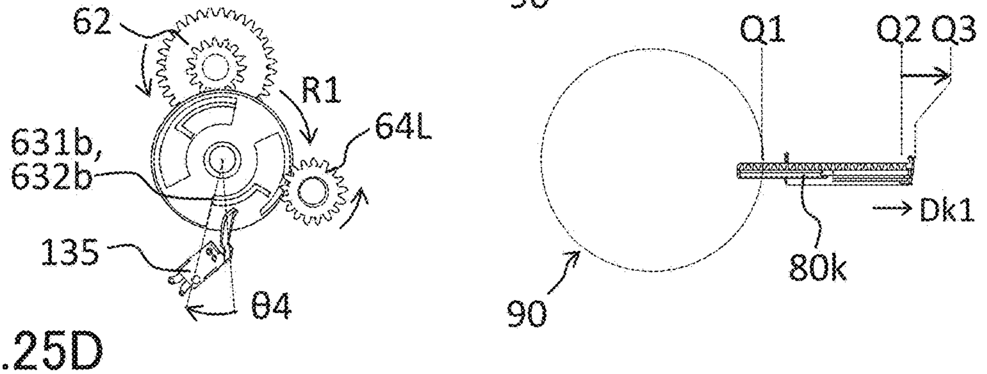

The controller 30 stops the motor M2 (S25 of FIG. 36) after continuing the normal rotation of the motor M2 for a predetermined time T4 after the tray 80*k* has reached the predetermined position Q2. As a result of this, the tray 80*k* moves to a detachment position Q3 as illustrated in FIG. 25C. At this time, the input gear 631 rotates by an angle θ4 in a clockwise direction in the drawing. That is, the angle θ4 is a rotation amount of the input gear 631 in the case where the tray 80*k* moves from the predetermined position Q2 to the detachment position Q3.

FIG. 25C illustrates a state of the idle gear 63 and the tray pull-out sensor 135 when the tray 80*k* has been pulled out to the detachment position Q3. In this state, the normal rotation abutting portion 631*b* of the input gear 631 abuts the normal rotation abutted portion 632*b* of the output gear 632. In addition, the tray pull-out sensor 135 opposes the outer peripheral recess portion 632*f* of the output gear 632.

In the state in which the tray 80*k* has been pulled out to the detachment position Q3, the controller 30 rotates the motor M2 in the reverse rotation direction for a predetermined time T5 (S26 of FIG. 36), and then stops the motor M2 (step S27).

Figure 25D:
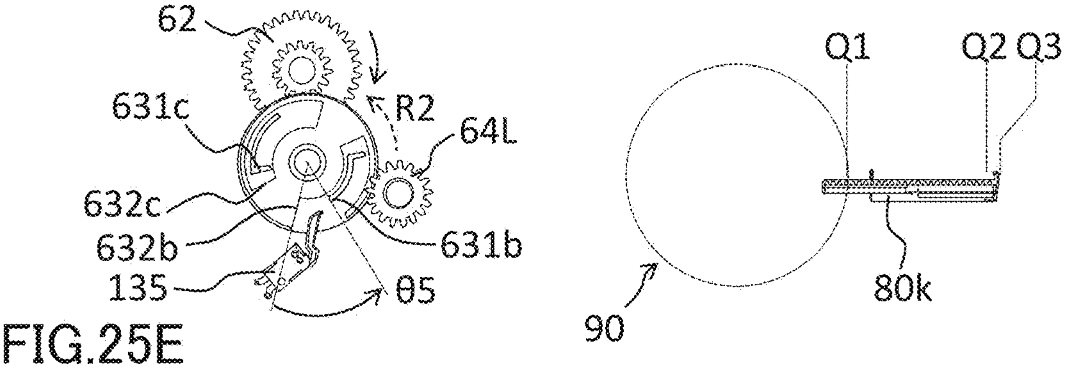

As illustrated in FIG. 25D, as a result of the reverse rotation of the motor M2, the input gear 631 receives the driving force from the motor M2, and rotates in the reverse rotation direction R2. Then, the normal rotation abutting portion 631*b* of the input gear 631 is separated from the normal rotation abutted portion 632*b* of the output gear 632. That is, after the tray 80*k* (support member) has moved from the accommodation position (first position) to the detachment position (second position), the motor M2 (drive source) rotates in the reverse rotation direction R2 (second direction opposite to the first direction), and thus the engagement between the normal rotation abutting portion 631*b* (first engaging portion) and the normal rotation abutted portion 632*b* (first engaged portion) is released.

The angle by which the input gear 631 rotates in the reverse rotation direction R2 while the motor M2 rotates in the reverse rotation direction for the time T5 will be denoted by θ5. The angle θ5 is smaller than the angle θ3 by which the input gear 631 and the output gear 632 can idle (θ5>θ3). Therefore, the reverse rotation abutting portion 631*c* of the input gear 631 does not abut the reverse rotation abutted portion 632*c* of the output gear 632 while the motor M2 rotates in the reverse rotation direction. That is, the driving force of the motor M2 is not transmitted to the output gear 632, and the tray 80*k* does not move in the pull-in direction Dk2 from the detachment position Q3. In this manner, the tray pull-out operation of the tray 80*k* from the accommodation position to the detachment position is completed.

FIG. 25D illustrates a state of the idle gear 63 and the tray pull-out sensor 135 when the tray pull-out operation of the tray 80*k* is completed. In this state, the normal rotation abutting portion 631*b* of the input gear 631 is separated from the normal rotation abutted portion 632*b* of the output gear 632. In addition, the reverse rotation abutting portion 631*c* of the input gear 631 is also separated from the reverse rotation abutted portion 632*c* of the output gear 632. In addition, the tray pull-out sensor 135 opposes the outer peripheral recess portion 632*f* of the output gear 632.

Figure 25E:
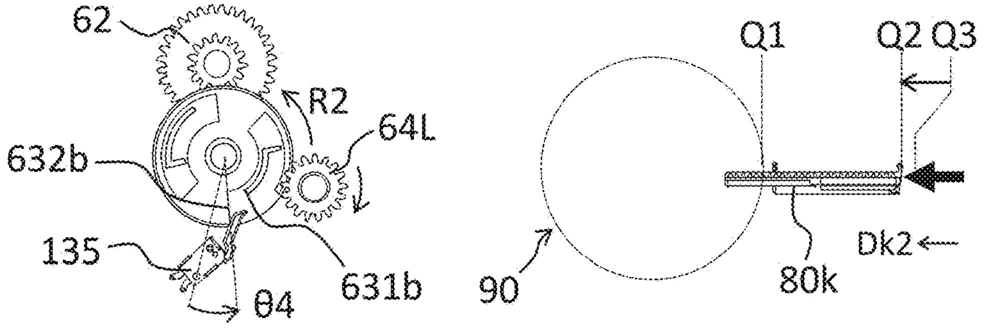

Here, as illustrated in FIG. 25E, a case where the user has pushed in the tray 80*k* in the pull-in direction Dk2 will be considered. In this case, the push-in force by which the user pushes in the tray 80*k* is transmitted to the output gear 632 in a reverse direction through the drive transmission path from the motor M2 to the tray 80*k*. As a result, the output gear 632 rotates in the reverse rotation direction R2.

Meanwhile, there is a gap of the angle θ5 described above between the normal rotation abutting portion 631*b* and the normal rotation abutted portion 632*b* due to the reverse rotation of the motor M2 in the tray pull-out operation. Therefore, even when the output gear 632 rotates in the reverse rotation direction R2, the input gear 631 does not rotate in the reverse rotation direction R2. That is, the input gear 631 and drive transmission elements upstream thereof (on the motor M2 side) do not operate in an interlocked manner with the push-in of the tray 80*k*. In other words, the idle gear 63 (transmission unit) is configured to take a blocking state in which transmission of force from the tray 80*k* to the motor M2 (drive source) is blocked, after the tray 80*k* (support member) has moved from the accommodation position (first position) to the detachment position (second position). Therefore, the user can push in the tray 80*k* with a low push-in force.

The angle by which the output gear 632 rotates while the tray 80*k* is pushed in from the detachment position Q3 to the predetermined position Q2 will be denoted by θ4. The angle θ4 is preferably smaller than the angle θ5 of the gap present between the normal rotation abutting portion 631*b* and the normal rotation abutted portion 632*b* when the tray pull-out operation is completed (θ4<θ5). The angle θ5 is an angle by which the output gear 632 can rotate (idle) in the reverse rotation direction R2 in a state in which the input gear 631 is stopped. In other words, the angle (θ5) by which the output gear 632 (output portion) is relatively rotatable with respect to the input gear 631 (input portion) in a state in which the engagement between the normal rotation abutting portion 631*b* (first engaging portion) and the normal rotation abutted portion 632*b* (first engaged portion) is released is larger than the angle (θ4) by which the output gear 632 rotates while the tray 80*k* (support member) is moved from the detachment position Q3 (second position) to the predetermined position Q2. Therefore, as long as the relationship of θ4<θ5 is satisfied, the user can push in the tray 80*k* with a low push-in force at least until the tray 80*k* reaches the predetermined position Q2.

When the tray 80*k* is pushed in to the predetermined position Q2 as illustrated in FIG. 25E, the state in which the tray pull-out sensor 135 opposes the outer peripheral recess portion 632*f* of the output gear 632 is switched to the state in which the tray pull-out sensor 135 opposes the outer peripheral surface 632*e* of the output gear 632. The controller 30 detects that the tray 80*k* has been pushed in to the predetermined position Q2, on the basis of the change in the detection signal of the tray pull-out sensor 135 (S11Y of FIG. 35).

When the push-in of the tray 80*k* is detected, the controller 30 rotates the motor M2 in the reverse rotation direction, and starts the tray pull-in operation (S12 of FIG. 35). As a result of the reverse rotation of the motor M2, the input gear 631 rotates in the reverse rotation direction R2, and the reverse rotation abutting portion 631*c* (second engaging portion) of the input gear 631 engages with the reverse rotation abutted portion 632*c* (second engaged portion) of the output gear 632. As a result of this, the output gear 632 rotates in the reverse rotation direction R2, and the tray 80*k* moves toward the accommodation position. Then, when it is detected that the tray 80*k* has reached the accommodation position Q1 (S14Y), the controller 30 stops the motor M2 (S15), and thus completes the tray pull-in operation.

Here, as illustrated in FIG. 22A, a tray pull-in sensor 134 capable of detecting that the tray 80*k* has reached the accommodation position is disposed in the apparatus body 1A. The tray pull-in sensor 134 of the present embodiment is held by the lower holding member 34L.

The tray pull-in sensor 134 is disposed to come into contact with the driving rack 15L in the case where the tray 80*k* is at the accommodation position Q1. In other words, the tray pull-in sensor 134 is configured to change the detection signal thereof in accordance with whether or not the driving rack 15L is at the lower position. On the basis of the change in the detection signal of the tray pull-in sensor 134, the controller 30 can detect that the driving rack 15L has reached the lower position, that is, that the tray 80*k* has reached the accommodation position Q1. The tray pull-in sensor 134 is an example of a detection portion configured to change the signal thereof in the case where the tray 80*k* (support member) supporting the toner cartridge 70*k* (cartridge) has moved from the detachment position (second position) toward the accommodation position (first position). The signal output from the tray pull-in sensor 134 differs between a state in which the tray 80*k* is at the accommodation position Q1 and a state in which the tray 80*k* is at the detachment position Q3. The signal output from the tray pull-in sensor 134 differs between a state in which the toner cartridge 70*k* (cartridge) is at the attached position and a state in which the toner cartridge 70*k* (cartridge) is at the retracted position.

As described above, the controller 30 is configured to automatically execute the tray pull-in operation in the case where it is detected that the tray 80*k* has been pushed in from the detachment position Q3 to the predetermined position Q2. In other words, the controller 30 causes the motor M2 to move the tray 80*k* toward the accommodation position in the case where the tray 80*k* (support member) at the detachment position (second position) and not being moved by the motor M2 (drive source) is moved toward the accommodation position (first position) and the signal of the tray pull-out sensor 135 changes. As a result of this, more intuitive operation can be performed, and the operability can be improved.

In addition, in the present embodiment, the idle gear 63 is disposed in the drive transmission mechanism 101 that transmits the driving force from the motor M2 to the tray 80*k*, and is configured to idle in the case where the user pushes in the tray 80*k* in the pull-in direction Dk2. As a result of this, the user can push in the tray 80*k* from the detachment position Q3 to the predetermined position Q2 by a low push-in force, and the operability can be further improved.

Modification Example of Push-in Detection Mechanism

In the present embodiment, a configuration in which the push-in of the tray 80*k* can be detected by detecting, by the tray pull-out sensor 135, the rotational angle of the output gear 632 that changes in an interlocked manner with the push-in of the tray 80*k* is employed. The configuration is not limited to this, and the push-in of the tray 80*k* may be detected by using a sensor that detects a different member that moves in an interlocked manner with the push-in of the tray 80*k*. For example, a sensor capable of detecting that the linking rack 66 is at a position corresponding to the detachment position of the tray 80*k* may be used. In this case, the controller 30 determines that the tray 80*k* has been pushed in in the case where the state in which the linking rack 66 is detected by the sensor is switched to a state in which the linking rack 66 is not detected by the sensor.

In addition, the sensor that detects the push-in of the tray 80*k* is not limited to a sensor that detects contact with a target member, and may be, for example, an optical sensor that detects the target member by using light.

In addition, although the tray pull-out sensor 135 is used as the detection portion that changes the signal thereof in the case where the tray 80*k* has moved from the detachment position toward the accommodation position in the present embodiment, a detection portion that detects reception of a force in such a direction that the tray 80*k* moves from the detachment position toward the accommodation position may be used. For example, a force sensor such as a load cell is used as the detection portion. In this case, the controller 30 may execute the tray pull-in operation by rotating the motor M2 in the reverse rotation direction on the basis of change in the signal of the force sensor caused by the user pushing in the tray 80*k* in a state in which the motor M2 is not driven after the tray 80*k* is pulled out to the detachment position.

In addition, in the present embodiment, an example in which the tray pull-in operation is started by activating the motor M2 that is in a stationary state in the case where movement of the tray 80*k* is detected by the detecting portion has been described. The configuration is not limited to this, and the tray pull-in operation may be started by connecting a clutch interposed between the motor M2 and the tray 80*k* in a state in which the motor M2 is rotating, in the case where the movement of the tray 80*k* is detected by the detection portion.

Automatic Pull-Out Function in Case of Tray Pull-In Abnormality

In the case where an abnormality has occurred in the tray pull-in operation, there is a possibility that the tray 80 stops at a position (abnormal position) that is neither the accommodation position nor the detachment position. The abnormality is, for example, a case where a foreign matter is present between the tray 80 and another member and the movement of the tray 80 in the pull-in direction Dk2 is interrupted.

At this time, it is preferable that a restoring work for restoring the apparatus to a state in which the tray pull-in operation can be executed is performed by addressing the cause of the abnormality (for example, removing the foreign matter). In addition, in a state in which the tray 80 is stopped at an abnormal position, it is difficult for the user to determine which operation to perform, which is not preferable in terms of operability for the user.

Therefore, in the present embodiment, the image forming apparatus 1 is provided with a function (automatic tray pull-out function) of automatically moving the tray 80 to the detachment position in the case where an abnormality has occurred during the movement (during the tray pull-in operation) of the tray 80 from the detachment position to the accommodation position.

Details of the processing that the controller 30 (FIG. 2) performs in the case where an abnormality is detected during the tray pull-in operation will be described in accordance with the flowchart of FIG. 35.

In a state in which the tray 80 is at the detachment position, the user can instruct the start of the tray pull-in operation by operating the operation portion (for example, a button of an operation panel) provided on the apparatus body 1A or by pushing in the tray 80 as described above. When the instruction (pull-in instruction) of the tray pull-in operation or the push-in of the tray 80 is detected (S11Y), the controller 30 rotates the motor M2 in the reverse rotation direction (S12). As a result of this, the tray pull-in operation is started, and the tray 80 starts moving from the detachment position to the accommodation position by the driving force of the motor M2.

As illustrated in FIGS. 22D to 22A, when the tray 80 moves from the detachment position to the accommodation position, the driving rack 15 (15L) moves downward (in the −Z direction) with respect to the apparatus body 1A. The tray pull-in sensor 134 detects the driving rack 15 when the driving rack 15 has moved to the lower position corresponding to the accommodation position of the tray 80 (state of FIG. 22A). On the basis of the detection of the driving rack 15 by the tray pull-in sensor 134, the controller 30 (FIG. 2) determines that the tray pull-in operation has been completed (S14Y), and stops the driving of the motor M2 to complete the tray pull-in operation (S15).

Here, it is assumed that an abnormality has occurred in the tray pull-in operation and the movement of the tray 80 is interrupted. In this case, the driving rack 15 cannot move to the lower position, and the tray pull-in sensor 134 does not detect the driving rack 15. That is, the controller 30 determines that the tray pull-in operation is not complete (S14N).

In the present embodiment, in the case where the tray pull-in sensor 134 does not detect the driving rack 15 even after the elapse of the predetermined time T1 since the start of the reverse rotation of the motor M2 (S12), the controller 30 determines that an abnormality has occurred in the tray pull-in operation (S13Y). The predetermined time T1 is, for example, a value obtained by adding a predetermined margin to a time required for the tray pull-in sensor 134 to detect the arrival of the driving rack 15 at the lower position since the start of the reverse rotation of the motor M2 in the case where the tray pull-in operation has progressed normally. The value of the predetermined time T1 is stored in the storage portion of the controller 30 in advance.

In the case where it is determined that an abnormality has occurred in the tray pull-in operation, the controller 30 temporarily stops the motor M2, and then rotates the motor M2 in the normal rotation direction (S16). As a result of this, the tray 80 starts moving from the abnormal position toward the detachment position by the driving force of the motor M2. The controller 30 determines that the tray 80 has reached the detachment position when, for example, the predetermined time T2 has elapsed since the start of normal rotation of the motor M2, stops the motor M2 (S17), and finishes the automatic pull-out operation. To be noted, a configuration in which the tray 80 is moved to the detachment position by using the tray pull-out sensor 135 in control similar to that of normal tray pull-out operation (S24 to S27 in FIG. 36) instead of S17 may be employed.

As described above, the controller 30 causes the motor M2 to start output of a driving force in the reverse rotation direction (second direction) in a state in which the tray 80 is at the detachment position Q3 corresponding to the retracted position of the toner cartridge 70, and thus starts the tray pull-in operation. The controller 30 causes the motor M2 to output a driving force in the normal rotation direction (first direction) in the case where the tray 80 has not reached the accommodation position Q1 corresponding to the attached position of the toner cartridge 70 even after the elapse of the predetermined time T1 since the start of driving of the motor M2. In other words, the controller causes the drive source to output a driving force in the first direction in the case where the cartridge has not reached the attached position even after the elapse of a predetermined time after the drive source is caused to start outputting a driving force in the second direction in a state in which the cartridge is at the retracted position.

That is, the controller 30 causes the driving device 98 to execute the first operation in the case where the toner cartridge 70 has not reached the attached position even after the elapse of the predetermined time after the driving device 98 is caused to start the second operation in a state in which the toner cartridge 70 (cartridge) is at the retracted position. The first operation is an operation in which the driving device 98 drives the moving device 85 such that the moving device 85 moves the toner cartridge 70 from the attached position toward the retracted position. The second operation is an operation in which the driving device 98 drives the moving device 85 such that the moving device 85 moves the toner cartridge 70 from the retracted position toward the attached position.

According to the control described above, in the case where an abnormality has occurred in the tray pull-in operation, the tray 80 temporarily stops at the abnormal position, and is then automatically pulled out to the detachment position. Therefore, the user can perform the restoration work such as removal of the foreign matter in a state in which the tray 80 has been pulled out to the detachment position. That is, according to the present embodiment, the operability of the restoration work can be improved as compared with a case where the tray 80 remains at the abnormal position.

In addition, according to the present embodiment, the tray 80 returns to the detachment position by the automatic tray pull-out function in the case where an abnormality has occurred in the tray pull-in operation. In other words, the controller causes the drive source to start outputting the driving force in the first direction in the case where the cartridge has not reached the attached position even after the elapse of the predetermined time, and then stops the drive source in the case where the cartridge has reached the retracted position. Therefore, the user can easily understand that the tray pull-in operation may be performed again after the restoration work, which makes it easier for the user to determine the next operation.

In addition, in the present embodiment, part of the toner cartridge 70 moves from the outside to the inside of the frame 16 (body frame) through the opening 16*a* of the apparatus body 1A in the case where the toner cartridge 70 is moved from the retracted position to the attached position. In such a configuration, the toner cartridge 70 can be automatically pulled out to the outside of the apparatus body 1A even in the case where the toner cartridge 70 cannot pass through the opening 16*a* for some reason.

Automatic Pull-In Function in Case of Tray Pull-Out Abnormality

In the case where an abnormality has occurred in the tray pull-out operation, there is a possibility that the tray 80 stops at a position (abnormal position) that is neither the accommodation position nor the detachment position.

For example, a case where an obstacle is present at a position overlapping with the movement trajectory of the tray 80 (for example, the vicinity of the opening 16*a* of the apparatus body 1A) in the tray pull-out operation and the movement of the tray 80 is restricted as a result of the moving tray 80 (or the door 14) coming into contact with the obstacle. In this case, the tray 80 stops at the abnormal position. Since the tray 80 is stopped at the abnormal position (that is, not pulled out to the detachment position), there is a possibility that the user cannot detach the toner cartridge 70 from the tray 80, or the work is difficult. In addition, in a state in which the tray 80 is stopped at the abnormal position, it is difficult for the user to determine which operation to be performed next, which is not desirable for the operability for the user.

Therefore, in the present embodiment, the image forming apparatus 1 is provided with a function (automatic tray pull-in function) of automatically moving the tray 80 to the accommodation position in the case where an abnormality has occurred during the movement of the tray 80 from the accommodation position to the detachment position (during the tray pull-out operation). The automatic tray pull-in function will be described below.

Details of the processing performed by the controller 30 (FIG. 2) in the case where an abnormality has been detected during the tray pull-out operation will be described with reference to FIG. 36.

In a state in which the tray 80 is at the accommodation position, the user can instruct the image forming apparatus 1 to start the tray pull-out operation by operating an operation portion (for example, a button of the operation panel) provided on the apparatus body 1A. When the instruction of the tray pull-out operation (pull-out instruction) is received (S21Y), the controller 30 starts rotating the motor M2 in the normal rotation direction (S22). As a result of this, the tray pull-out operation is started, and the tray 80 starts moving from the accommodation position to the detachment position by the driving force of the motor M2.

As described above, the tray pull-out sensor 135 detects that the tray 80 has moved to the predetermined position Q2 (S24Y, state of FIG. 25B). The motor M2 is temporarily stopped (S25) when a predetermined time T4 has further elapsed since the detection of the tray 80 by the tray pull-out sensor 135, then the motor M2 is further rotated for a predetermined time T5 in the reverse rotation direction (S26), and the motor M2 is stopped (S27). As a result of this, the tray 80 moves to the detachment position as described above. In addition, the idle gear 63 takes a state in which the output gear 632 can idle with respect to the input gear 631 in an interlocked manner with the tray 80 in the case where the tray 80 has been pushed in by the user.

Here, it is assumed that an abnormality has occurred in the tray pull-out operation, and the movement of the tray 80 has been interrupted. In this case, the tray pull-out sensor 135 does not detect arrival of the tray 80 at the predetermined position Q2 (S24N). That is, the controller 30 determines that the tray pull-out operation has not been complete.

In the present embodiment, the controller 30 determines that an abnormality has occurred in the tray pull-out operation (S23Y), in the case where the tray pull-out sensor 135 has not detected the arrival of the tray 80 at the predetermined position Q2 even after the elapse of the predetermined time T3 since the start (S22) of the tray pull-out operation. The predetermined time T3 is, for example, a value obtained by adding a predetermined margin to a time required for the tray pull-out sensor 135 to detect the arrival of the tray 80 at the predetermined position Q2 since the start of the normal rotation of the motor M2 in the case where the tray pull-in operation has progressed normally. The value of the predetermined time T3 is stored in the storage portion of the controller 30 in advance.

In the case where it is determined that an abnormality has occurred in the tray pull-out operation, the controller 30 temporarily stops the motor M2, and then rotates the motor M2 in the reverse rotation direction (S28). As a result of this, the tray 80 starts moving from the abnormal position toward the accommodation position by the driving force of the motor M2. For example, when a predetermined time T6 has elapsed since the start of reverse rotation of the motor M2, the controller 30 determines that the tray 80 has reached the accommodation position and stops the motor M2 (S29), and finishes the automatic pull-in operation. To be noted, a configuration in which the tray 80 is moved to the accommodation position by using the tray pull-in sensor 134 in control similar to that of normal tray pull-in operation (S14 and S15 in FIG. 35) instead of S29 may be employed.

That is, the controller 30 causes the driving device 98 to execute the second operation in the case where the toner cartridge 70 has not reached the retracted position even after the elapse of the predetermined time after the driving device 98 is caused to start the first operation in a state in which the toner cartridge 70 (cartridge) is at the attached position. The first operation is an operation in which the driving device 98 drives the moving device 85 such that the moving device 85 moves the toner cartridge 70 from the attached position toward the retracted position. The second operation is an operation in which the driving device 98 drives the moving device 85 such that the moving device 85 moves the toner cartridge 70 from the retracted position toward the attached position.

As described above, the controller 30 causes the motor M2 to start output of a driving force in the normal rotation direction (first direction) in a state in which the tray 80 is at the accommodation position Q1 corresponding to the attached position of the toner cartridge 70, and thus starts the tray pull-in operation. The controller 30 causes the motor M2 to output a driving force in the reverse rotation direction (second direction) in the case where the tray 80 has not reached the detachment position Q3 corresponding to the retracted position of the toner cartridge 70 even after the elapse of the predetermined time T3 since the start of driving of the motor M2. In other words, the controller causes the drive source to output a driving force in the second direction in the case where the cartridge has not reached the retracted position even after the elapse of a predetermined time after the drive source is caused to start outputting a driving force in the first direction in a state in which the cartridge is at the attached position.

According to the control described above, in the case where an abnormality has occurred in the tray pull-out operation, the tray 80 temporarily stops at the abnormal position, and is then automatically pulled in to the accommodation position. Therefore, the user can easily understand that the tray pull-out operation may be performed again after the restoration work or the like, which makes it easier for the user to determine the next operation.

In addition, according to the present embodiment, the tray 80 returns to the accommodation position Q1 by the automatic tray pull-in function in the case where an abnormality has occurred in the tray pull-out operation. In other words, the controller causes the drive source to start outputting the driving force in the second direction in the case where the cartridge has not reached the retracted position even after the elapse of the predetermined time, and then stops the drive source in the case where the cartridge has reached the attached position after. Therefore, the user can easily understand that the tray pull-out operation may be performed again after the restoration work, which makes it easier for the user to determine the next operation.

In addition, in the present embodiment, part of the toner cartridge 70 moves from the inside to the outside of the frame 16 (body frame) through the opening 16*a* of the apparatus body 1A in the case where the toner cartridge 70 is moved from the attached position to the retracted position. In such a configuration, the toner cartridge 70 can be automatically pulled back to the inside of the apparatus body 1A even in the case where the toner cartridge 70 cannot pass through the opening 16*a* for some reason.

To be noted, in the present embodiment, the controller 30 does not detect the occurrence of an abnormality in the case where the movement of the tray 80 is restricted by an obstacle or the like after the tray pull-out sensor 135 has detected the arrival of the tray 80 at the predetermined position Q2 and before the tray 80 reaches the detachment position Q3. In the present embodiment, the toner cartridge 70 can be attached to and detached from the tray 80 even in a state in which the tray 80 is at the predetermined position Q2. In addition, if a sensor that detects the arrival of the tray 80 at the detachment position Q3 is additionally provided, the cost increases. According to the present embodiment, occurrence of abnormality in the tray pull-out operation can be detected by a simple configuration using the tray pull-out sensor 135. To be noted, a sensor that detects the arrival at the detachment position Q3 of the tray 80 may be additionally provided, and the controller 30 may detect the occurrence of abnormality in the tray pull-out operation on the basis of the detection result of this sensor.

Second Embodiment

As a second embodiment, an embodiment in which the configuration for linking the left-side and right-side driving racks 15L and 15R is different from the first embodiment will be described. In the present embodiment, the left-side and right-side driving racks 15L and 15R are linked by using a gear train.

In the description below, it is assumed that elements denoted by the same reference signs as in the first embodiment have substantially the same configurations and functions as those described in the first embodiment, and part different from the first embodiment will be mainly described. A driving system for moving the tray 80*k* with respect to the rotary body 90 will be described below. The driving systems for moving the trays 80*y* to 80*c* are substantially the same as the driving system that will be described below, and therefore the description thereof will be omitted.

Figure 26:
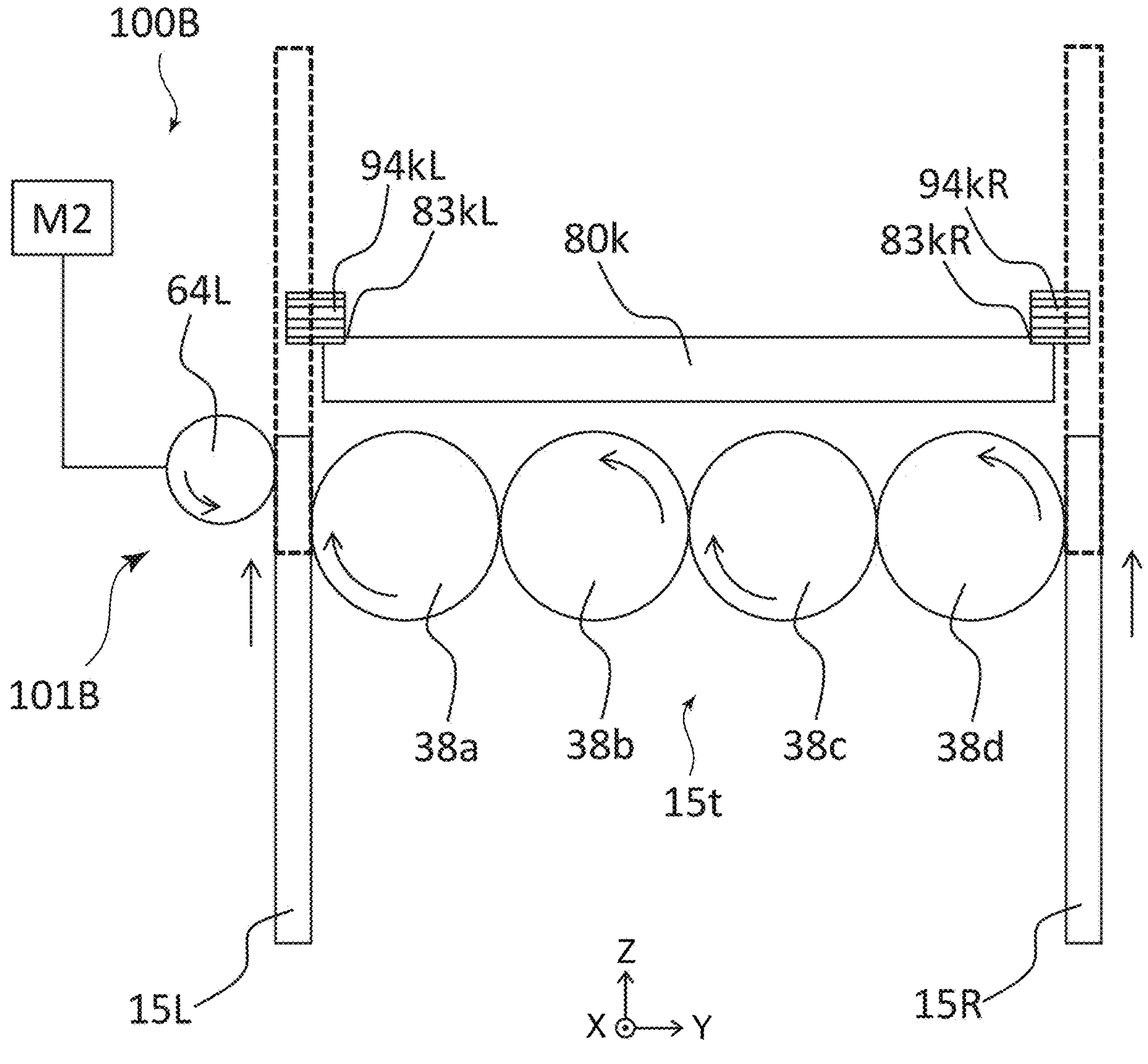
FIG. 26 is an explanatory diagram of elements related to a driving system of a tray according to a second embodiment.

FIG. 26 is a schematic view of a driving system 100B according to the present embodiment. FIG. 26 illustrates a state of the driving system 100B in the case where the tray 80*k* is at the accommodation position.

As illustrated in FIG. 26, the driving system 100B of the tray 80*k* according to the second embodiment includes the motor M2 serving as a drive source, and a drive transmission mechanism 101B that transmits the driving force of the motor M2 to the tray 80*k*. The drive transmission mechanism 101B of the present embodiment includes the driving rack input gear 64L, the driving racks 15L and 15R, idler gears 38*a*, 38*b*, 38*c*, and 38*d*, the pinion gears 94*k*L and 94*k*R, and the rack portions 83*k*L and 83*k*R.

The idler gears 38*a* to 38*d* are provided in the apparatus body 1A. Therefore, it can be said that the driving device 98 of the apparatus body 1A includes the idler gears 38*a* to 38*d* as part of the transmission portion 15*t* (FIG. 2).

The driving rack 15L includes three rack portions that respectively engage with the driving rack input gear 64L, the idler gear 38*a*, and the pinion gear 94*k*L. In addition, the driving rack 15R includes two rack portions that respectively engage with the idler gear 38*d* and the pinion gear 94*k*R.

The idler gear 38*a*, the idler gear 38*b*, the idler gear 38*c*, and the idler gear 38*d* are an example of a gear train including a plurality of gears (four herein). The idler gears 38*a* to 38*d* are arranged in this order in a state in which adjacent idler gears are engaged with each other. That is, the idler gears 38*a* to 38*d* constitute a gear train linking the left-side and right-side driving racks 15L and 15R. The idler gears 38*a* to 38*d* are arranged in the rotational axis direction (Y direction) of the rotary body 90. The left-side driving rack 15L and the right-side driving rack 15R are linked (connected) via the idler gears 38*a* to 38*d* so as to move in an interlocked manner with each other.

The operation of the driving system 100B in the case of moving the tray 80*k* from the accommodation position to the detachment position will be described. The driving rack input gear 64L rotates in the counterclockwise direction in the drawing by receiving the driving force from the motor M2 rotating in the normal rotation direction, and thus the driving rack 15L is slid upward (in the +Z direction) with respect to the apparatus body 1A. As a result of the slide movement of the driving rack 15L, the idler gear 38*a* is rotated in the clockwise direction in the drawing. The driving force of the idler gear 38*a* is transmitted through the idler gears 38*b*, 38*c*, and 38*d* in this order, and thus the driving rack 15R is slid upward (in the +Z direction) with respect to the apparatus body 1A. The driving racks 15L and 15R respectively rotate the pinion gears 94*k*L and 94*k*R in the course of upward (+Z direction) movement with respect to the apparatus body 1A. Then, the driving force is input from the pinion gears 94*k*L and 94*k*R to the rack portions 83*k*L and 83*k*R, and thus the tray 80*k* moves toward the detachment position.

To be noted, the operation of the driving system 100B in the case of moving the tray 80*k* from the detachment position to the accommodation position is the same as in the case of moving the tray 80*k* from the accommodation position to the detachment position except that the rotation direction or the slide direction of each element of the driving system 100B is reversed.

As described above, also in the present embodiment, the driving force of the motor M2 is transmitted to each of the left-side and right-side rack portions 83*k*L and 83*k*R of the tray 80*k* by the drive transmission mechanism 101B at the time of the pull-out/pull-in operation of the tray 80*k*. That is, the driving force in the pull-out direction Dk1 is transmitted to each of the two rack portions 83*k*L and 83*k*R in the tray pull-out operation, and the driving force in the pull-in direction Dk2 is transmitted to each of the two rack portions 83*k*L and 83*k*R in the tray pull-in operation. Therefore, as compared with a configuration in which the driving force is transmitted to only one rack portion of the tray 80*k* at the time of the pull-out/pull-in operation of the tray 80*k*, inclination of the tray 80*k* is less likely to occur, and the pull-out/pull-in operation can be performed more stably.

The idler gears 38*a* to 38*d* (gear train) of the present embodiment can transmit the force received from the left-side driving rack 15L to the right-side driving rack 15R, and transmit the force received from the right-side driving rack 15R to the left-side driving rack 15L. The drive transmission mechanism 101B of the present embodiment including the idler gears 38*a* to 38*d* transmits the force received from the left-side rack portion 83*k*L (first force receiving portion) of the tray 80*k* to the right-side rack portion 83*k*R (second force receiving portion), and transmits the force received from the right-side rack portion 83*k*R of the tray 80*k* to the left-side rack portion 83*k*L. Therefore, similarly to the first embodiment, the inclination of the tray 80*k* is less likely to occur, and a smooth operability of the push-in operation of the tray 80*k* by the user can be realized.

To be noted, although the gear train including the four idler gears 38*a* to 38*d* has been described as an example of an element linking the left-side and right-side driving racks 15L and 15R, the number of gears constituting the gear train does not have to be four. The number of gears of the gear train is preferably an even number for the interlocked movement of the driving racks 15L and 15R in the same direction.

Third Embodiment

As a third embodiment, an embodiment in which the configuration for linking the left-side and right-side driving racks 15L and 15R is different from the first and second embodiments will be described. In the present embodiment, the left-side and right-side driving racks 15L and 15R are linked by using a rotation shaft.

In the description below, it is assumed that elements denoted by the same reference signs as in the first embodiment have substantially the same configurations and functions as those described in the first embodiment, and part different from the first embodiment will be mainly described. A driving system for moving the tray 80*k* with respect to the rotary body 90 will be described below. The driving systems for moving the trays 80*y* to 80*c* are substantially the same as the driving system that will be described below, and therefore the description thereof will be omitted.

Figure 27:
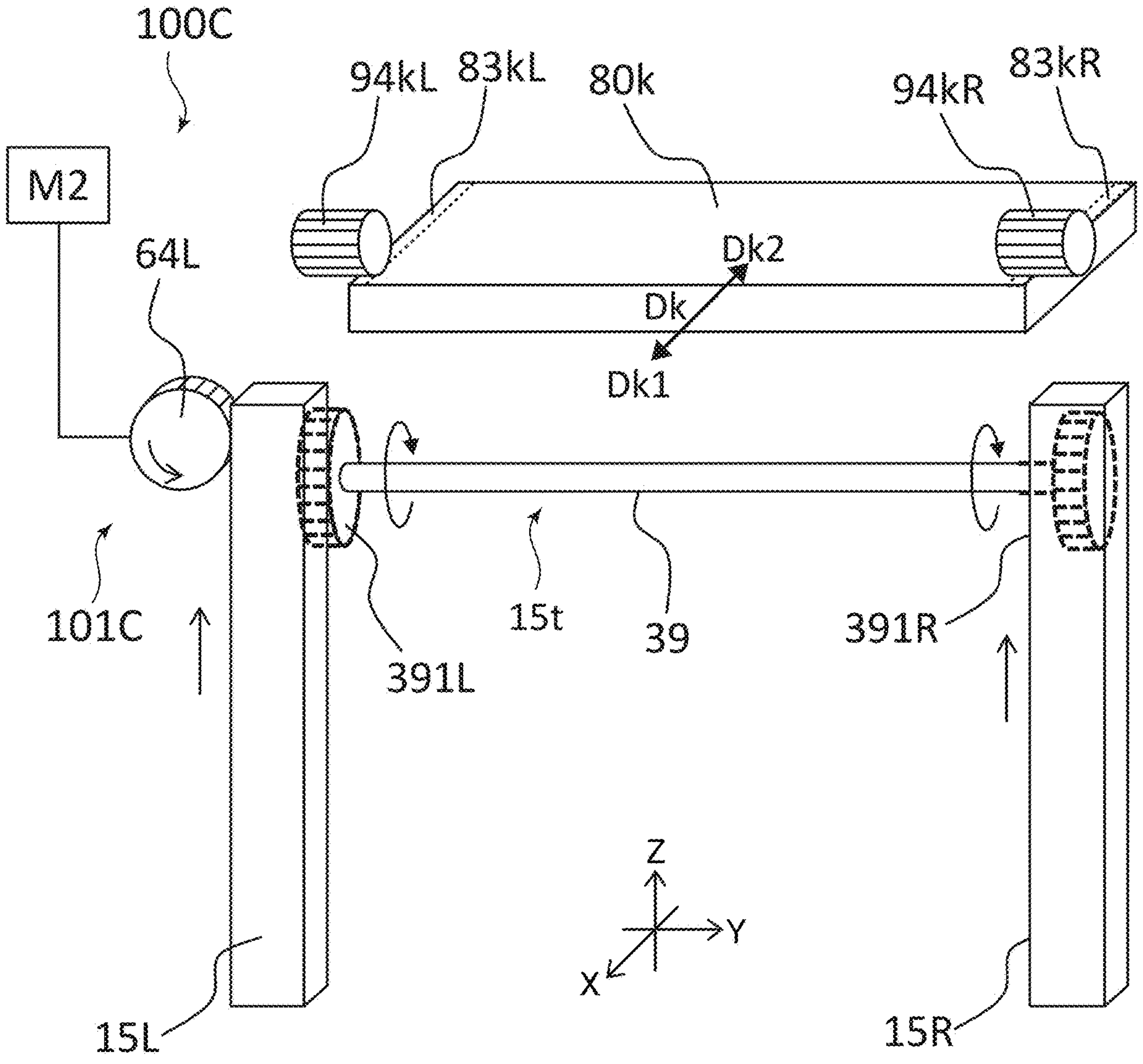
FIG. 27 is an explanatory diagram of elements related to a driving system of a tray according to a third embodiment.

FIG. 27 is a schematic view of a driving system 100C according to the present embodiment. FIG. 27 illustrates a state of the driving system 100C in the case where the tray 80*k* is at the accommodation position.

As illustrated in FIG. 27, the driving system 100C of the tray 80*k* according to the third embodiment includes the motor M2 serving as a drive source, and a drive transmission mechanism 101C that transmits the driving force of the motor M2 to the tray 80*k*. The drive transmission mechanism 101C of the present embodiment includes the driving rack input gear 64L, the driving racks 15L and 15R, a rotation shaft 39, rotation shaft gears 391L and 391R, the pinion gears 94*k*L and 94*k*R, and the rack portions 83*k*L and 83*k*R.

The rotation shaft 39 and the rotation shaft gears 391L and 391R are provided in the apparatus body 1A. Therefore, it can be said that the driving device 98 of the apparatus body 1A includes the rotation shaft 39 and the rotation shaft gears 391L and 391R as part of the transmission portion 15*t* (FIG. 2).

The driving rack 15L includes two rack portions that respectively engage with the driving rack input gear 64L and the rotation shaft gear 391L. The rack portion of the driving rack 15L that engages with the rotation shaft gear 391L can also engage with the pinion gear 94*k*L. In addition, the driving rack 15R includes a rack portion that engages with the rotation shaft gear 391R. This rack portion can also engage with the pinion gear 94*k*R.

The rotation shaft 39 extends in the rotational axis direction (Y direction) of the rotary body 90. The rotation shaft 39 is rotatable about the rotational axis extending in the Y direction. The rotation shaft gears 391L and 391R are provided at respective end portions of the rotation shaft 39, and integrally rotate with the rotation shaft 39.

The left-side driving rack 15L and the right-side driving rack 15R are linked (connected) via the rotation shaft 39 so as to move in an interlocked manner with each other. Specifically, the left-side driving rack 15L is linked to the right-side driving rack 15R via the rotation shaft gear 391L, the rotation shaft 39, and the rotation shaft gear 391R. The operation of the driving system 100C in the case of moving the tray 80*k* from the accommodation position to the detachment position will be described. The driving rack input gear 64L rotates in the counterclockwise direction in the drawing by receiving the driving force from the motor M2 rotating in the normal rotation direction, and thus the driving rack 15L is slid upward (in the +Z direction) with respect to the apparatus body 1A. As a result of the slide movement of the driving rack 15L, the rotation shaft gear 391L is rotated in an arrow direction in the drawing. The rotation shaft 39 and the rotation shaft gear 391R rotate together with the rotation shaft gear 391L, and thus the driving rack 15R is slid upward (in the +Z direction) with respect to the apparatus body 1A. The driving racks 15L and 15R respectively rotate the pinion gears 94kL and 94kR in the course of upward (+Z direction) movement with respect to the apparatus body 1A. Then, the driving force is input from the pinion gears 94kL and 94kR to the rack portions 83kL and 83kR, and thus the tray 80k moves toward the detachment position.

To be noted, the operation of the driving system 100C in the case of moving the tray 80k from the detachment position to the accommodation position is the same as in the case of moving the tray 80k from the accommodation position to the detachment position except that the rotation direction or the slide direction of each element of the driving system 100C is reversed.

As described above, also in the present embodiment, the driving force of the motor M2 is transmitted to each of the left-side and right-side rack portions 83kL and 83kR of the tray 80k by the drive transmission mechanism 101C at the time of the pull-out/pull-in operation of the tray 80k. That is, the driving force in the pull-out direction Dk1 is transmitted to each of the two rack portions 83kL and 83kR in the tray pull-out operation, and the driving force in the pull-in direction Dk2 is transmitted to each of the two rack portions 83kL and 83kR in the tray pull-in operation. Therefore, as compared with a configuration in which the driving force is transmitted to only one rack portion of the tray 80k at the time of the pull-out/pull-in operation of the tray 80k, inclination of the tray 80k is less likely to occur, and the pull-out/pull-in operation can be performed more stably.

The rotation shaft 39 of the present embodiment can transmit the force received from the left-side driving rack 15L to the right-side driving rack 15R, and transmit the force received from the right-side driving rack 15R to the left-side driving rack 15L. The drive transmission mechanism 101C of the present embodiment including the rotation shaft 39 transmits the force received from the left-side rack portion 83kL (first force receiving portion) of the tray 80k to the right-side rack portion 83kR (second force receiving portion), and transmits the force received from the right-side rack portion 83kR of the tray 80k to the left-side rack portion 83kL. Therefore, similarly to the first embodiment, the inclination of the tray 80k is less likely to occur, and a smooth operability of the push-in operation of the tray 80k by the user can be realized.

Fourth Embodiment

As a fourth embodiment, an embodiment in which the configuration for linking the left-side and right-side driving racks 15L and 15R is different from the first to third embodiments will be described. In the present embodiment, the left-side and right-side driving racks 15L and 15R are linked by using a gear train provided in the rotary body 90.

In the description below, it is assumed that elements denoted by the same reference signs as in the first embodiment have substantially the same configurations and functions as those described in the first embodiment, and part different from the first embodiment will be mainly described. A driving system for moving the tray 80k with respect to the rotary body 90 will be described below. The driving systems for moving the trays 80y to 80c are substantially the same as the driving system that will be described below, and therefore the description thereof will be omitted.

Figure 28A:
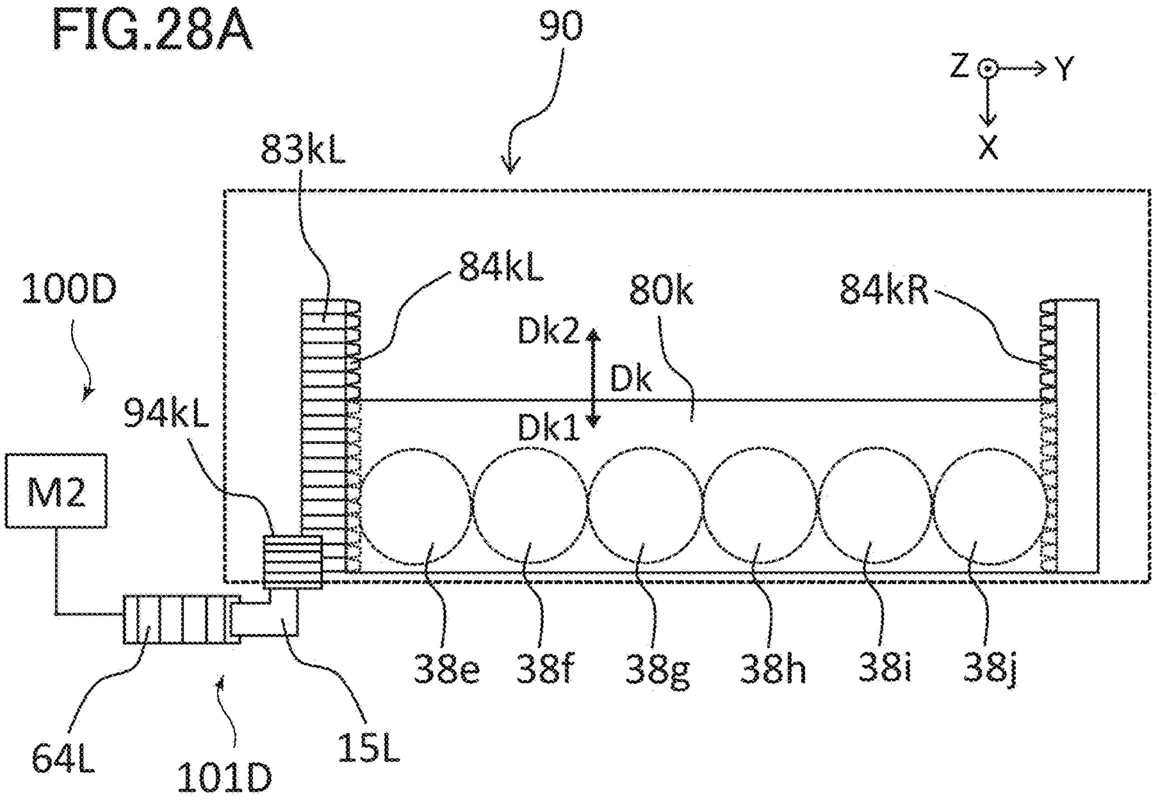
FIGS. 28A and 28B are each an explanatory diagram of elements related to a driving system of a tray according to a fourth embodiment.
Figure 28B:
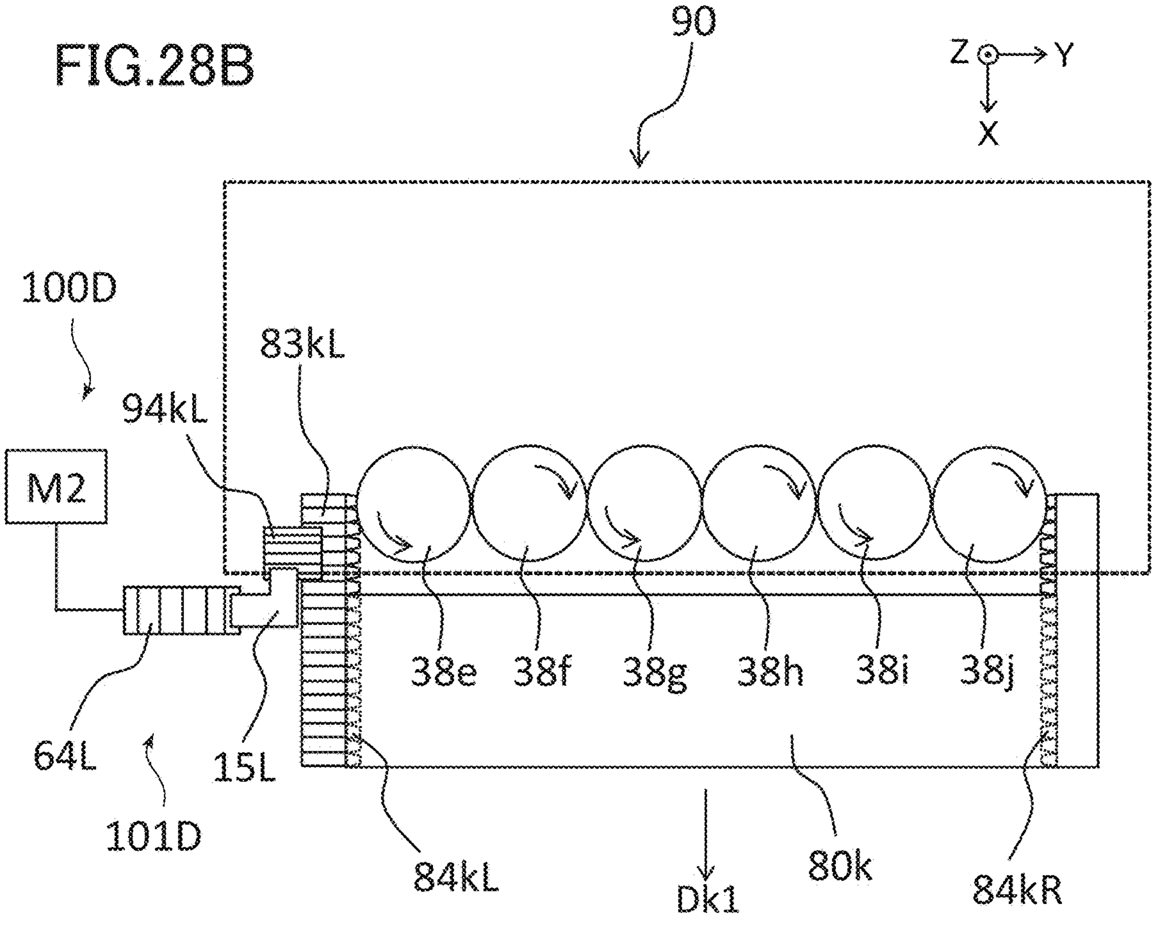

FIGS. 28A and 28B are each a schematic view of a driving system 100D according to the present embodiment as viewed from above (+Z direction). FIG. 28A illustrates a state of the driving system 100D in the case where the tray 80k is at the accommodation position. FIG. 28B illustrates a state of the driving system 100D in the case where the tray 80k is at the detachment position.

As illustrated in FIGS. 28A and 28B, the driving system 100D of the tray 80k according to the fourth embodiment includes the motor M2 serving as a drive source, and a drive transmission mechanism 101D that transmits the driving force of the motor M2 to the tray 80k. The drive transmission mechanism 101D of the present embodiment includes the driving rack input gear 64L, the driving rack 15L, the pinion gear 94kL, and idler gears 38e, 38f, 38g, and 38h, 38i, and 38j. In addition, the tray 80k is provided with the rack portion 83kL (first rack portion), and second rack portions 84kR and 84kL.

The rack portion 83kL is an example of a first force receiving portion through which the tray 80k serving as a moving member receives a driving force from the drive transmission mechanism 101D. The right-side second rack portion 84kR is an example of a second force receiving portion through which the tray 80k serving as a moving member receives a driving force from the drive transmission mechanism 101D.

The idler gears 38e, 38f, 38g, 38h, 38i, and 38j are a gear train including a plurality of gears (six herein). The idler gears 38e to 38j are provided in the rotary body 90. More specifically, the idler gears 38e to 38j are each rotatably supported by the frame (rotary frame 90f) of the rotary body 90 that movably supports the tray 80k. Therefore, it can be said that the moving device 85k of the rotary body 90 includes the idler gears 38e to 38j serving as a mechanism for linking the left-side and right-side second rack portions 84kL and 84kR of the tray 80k.

The idler gears 38e, 38f, 38g, 38h, 38i, and 38j are arranged in the Y direction, toward the right side (+Y side) of the apparatus body 1A in this order. Adjacent gears in the idler gears 38e to 38j are engaged with each other.

The second rack portions 84kL and 84kR are provided in the tray 80k together with the rack portion 83kL. The projecting direction of the teeth of the rack portion 83kL and the projecting direction (+Y direction) of the second rack portion 84kL are orthogonal to each other as viewed from the front side (−X side) of the apparatus body 1A. The left-side second rack portion 84kL is engaged with the idler gear 38e. The right-side second rack portion 84kR is engaged with the idler gear 38j.

The operation of the driving system 100D in the case of moving the tray 80k from the accommodation position (FIG. 28A) to the detachment position (FIG. 28B) will be described. The driving rack input gear 64L rotates by receiving the driving force from the motor M2 rotating in the normal rotation direction, and thus the driving rack 15L is slid upward (in the +Z direction) with respect to the apparatus body 1A. The driving rack 15L rotates the pinion gear 94kL in the course of upward (+Z direction) movement with respect to the apparatus body 1A. Then, the driving force is input from the pinion gear 94kL to the rack portion 83kL, and thus the rack portion 83kL starts moving in the detachment direction Dk1.

Here, in accordance with the movement of the rack portion 83kL in the pull-out direction Dk1, the second rack portion 84kL rotates the idler gear 38 in the counterclockwise direction in the drawing. The rotation of the idler gear 38e is transmitted through the idler gears 38f, 38g, 38h, 38i, and 38j in this order, the driving force is input from the idler gear 38j to the second rack portion 84kR, and the second rack portion 84kR starts moving in the pull-out direction Dk1. That is, the tray 80k receives the driving force in the pull-out direction Dk1 at the rack portion 83kL provided on the one end side in the Y direction, and the second rack portion 84*k*R provided on the other side in the Y direction, and thus moves toward the detachment position To be noted, the operation of the driving system 100D in the case of moving the tray 80*k* from the detachment position to the accommodation position is the same as in the case of moving the tray 80*k* from the accommodation position to the detachment position except that the rotation direction or the slide direction of each element of the driving system 100D is reversed.

As described above, also in the present embodiment, the driving force of the motor M2 is transmitted to each of the left-side rack portion 83*k*L and the right-side second rack portion 84*k*R of the tray 80*k* by the drive transmission mechanism 101D at the time of the pull-out/pull-in operation of the tray 80*k*. That is, the driving force in the pull-out direction Dk1 is transmitted to each of the two rack portions 83*k*L and 84*k*R in the tray pull-out operation, and the driving force in the pull-in direction Dk2 is transmitted to each of the two rack portions 83*k*L and 84*k*R in the tray pull-in operation. Therefore, as compared with a configuration in which the driving force is transmitted to only one rack portion of the tray 80*k* at the time of the pull-out/pull-in operation of the tray 80*k*, inclination of the tray 80*k* is less likely to occur, and the pull-out/pull-in operation can be performed more stably.

The idler gears 38*e* to 38*j* of the present embodiment can transmit the force received from the left-side second rack portion 84*k*L to the right-side second rack portion 84*k*R, and transmit the force received from the right-side second rack portion 84*k*R to the left-side second rack portion 84*k*L. The drive transmission mechanism 101D of the present embodiment transmits the force received from the left-side rack portion 83*k*L (first force receiving portion) of the tray 80*k* to the right-side second rack portion 84*k*R (second force receiving portion), and transmits the force received from the right-side second rack portion 84*k*R of the tray 80*k* to the left-side rack portion 83*k*L. Therefore, similarly to the first embodiment, the inclination of the tray 80*k* is less likely to occur, and a smooth operability of the push-in operation of the tray 80*k* by the user can be realized.

To be noted, although the gear train including the six idler gears 38*e* to 38*j* has been described as an example of an element linking the left-side and right-side second rack portions 84*k*L and 84*k*R, the number of gears constituting the gear train does not have to be six. The number of gears of the gear train is preferably an even number for the interlocked movement of the second rack portions 84*k*L and 84*k*R in the same direction. In addition, the element linking the left-side and right-side second rack portions 84*k*L and 84*k*R is not limited to a gear train. For example, the right-side rack portion 83*k*R and the pinion gear 94*k*R may be additionally provided similarly to the first embodiment, and the left-side and right-side pinion gears 94*k*L and 94*k*R may be fixed to a rotation shaft extending in the Y direction such that the left-side and right-side pinion gears 94*k*L and 94*k*R rotate integrally.

Fifth Embodiment

As a fifth embodiment, an embodiment in which the mechanism for detecting the push-in of the tray is different from the first embodiment will be described. In the description below, it is assumed that elements denoted by the same reference signs as in the first embodiment have substantially the same configurations and functions as those described in the first embodiment, and part different from the first embodiment will be mainly described.

Figure 31:
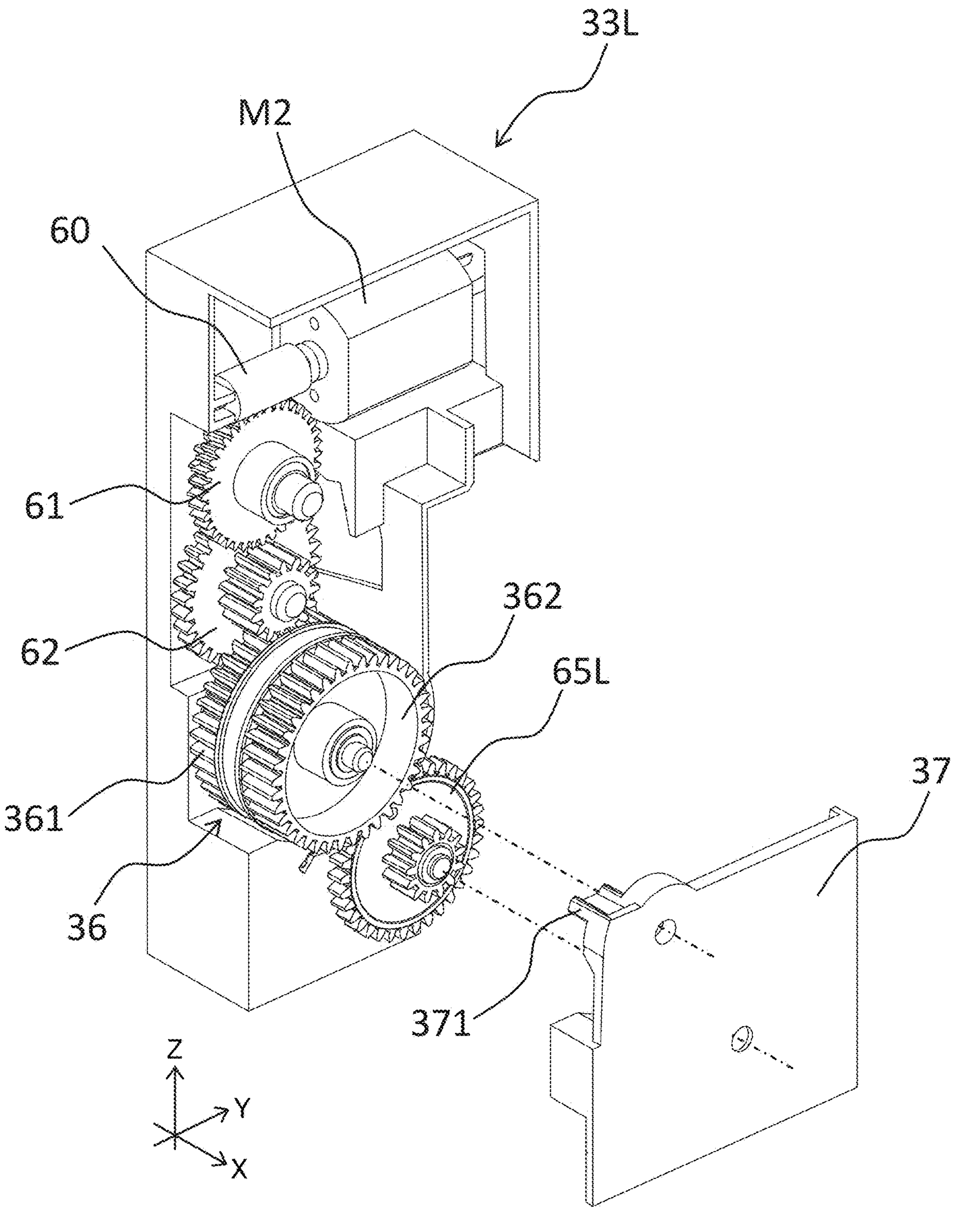
FIG. 31 is a perspective view of elements related to holding of the drive cancelling gear according to the fifth embodiment.

In the first embodiment, as a result of using the idle gear 63, the user can push in the tray 80*k* from the detachment position Q3 to the predetermined position Q2 by a low push-in force. In the present embodiment, a configuration in which a gear unit (drive cancelling gear 36) that cancels the drive transmission after the tray 80*k* is pulled out to the detachment position Q3 is used will be described. The drive cancelling gear 36 can be provided instead of the idle gear 63 of the first embodiment (FIG. 31).

Figure 29A:
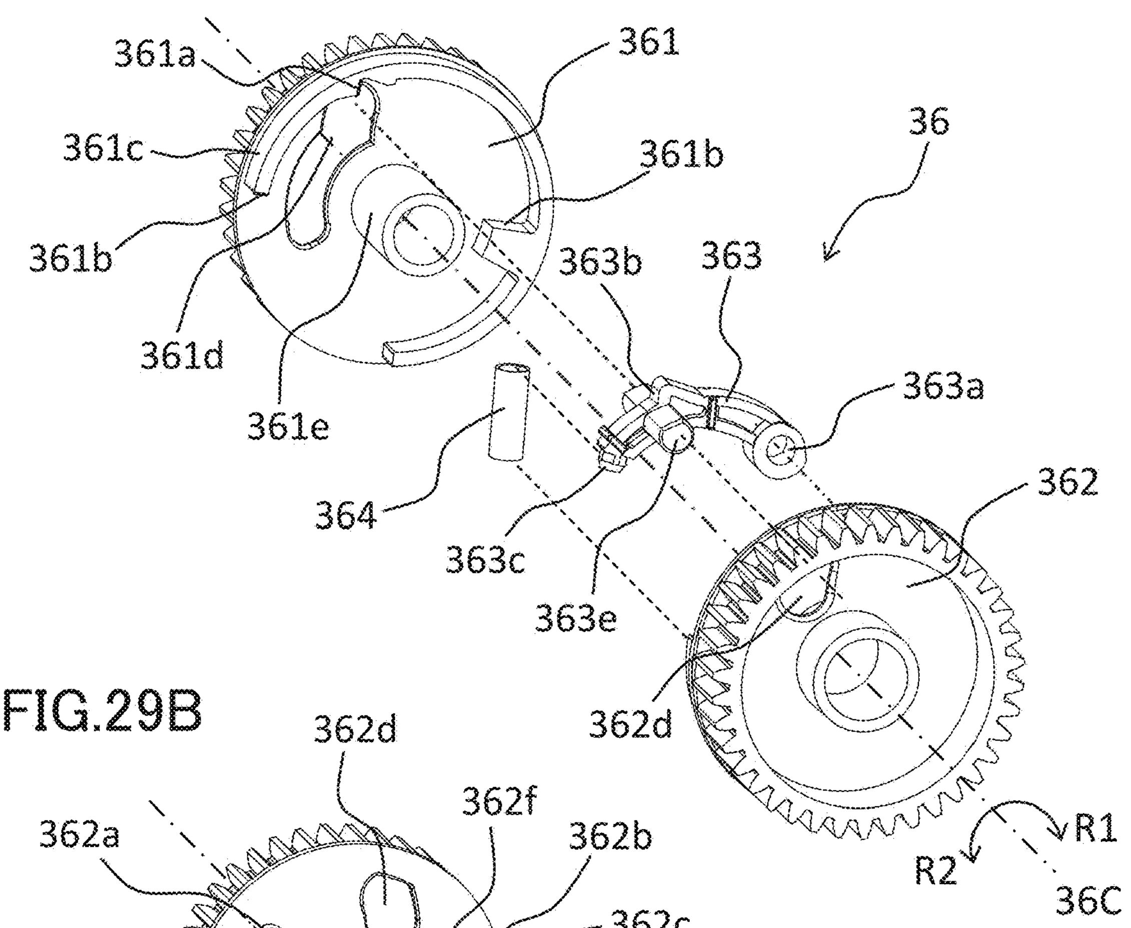
FIGS. 29A and 29B are each an explanatory diagram of a configuration of a drive cancelling gear according to a fifth embodiment.
Figure 29B:
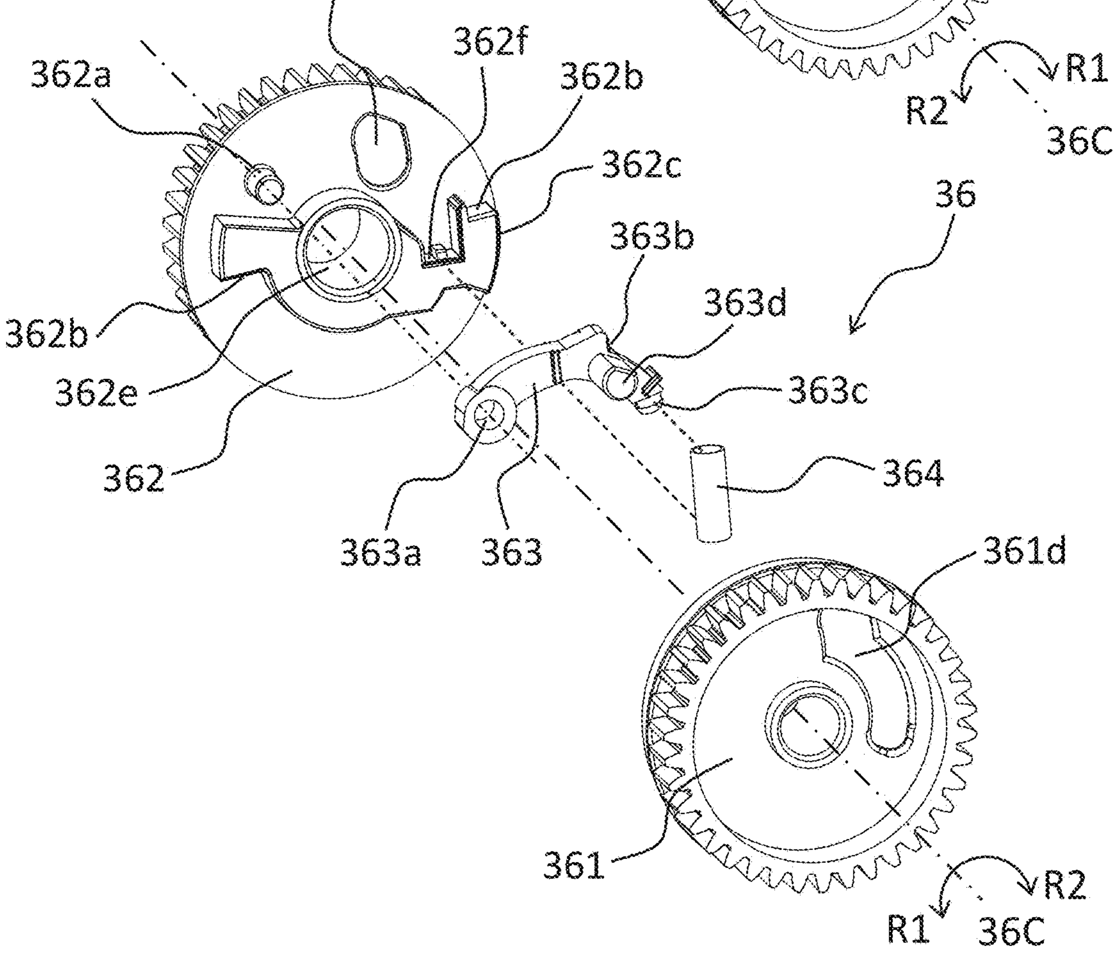

FIGS. 29A and 29B are each an exploded view of the drive cancelling gear 36 according to the fifth embodiment. FIG. 29A is a perspective view of the drive cancelling gear 36 as viewed from one side in a direction along a rotational axis 36C of the drive cancelling gear 36. FIG. 29B is a perspective view of the drive cancelling gear 36 as viewed from the other side in the direction along the rotational axis 36C.

As illustrated in FIGS. 29A and 29B, the drive cancelling gear 36 is a gear unit including an input gear 361, an output gear 362, an arm 363, and an urging member 364. The input gear 361 and the output gear 362 are arranged in the direction of the rotational axis 36C. In addition, the input gear 361 and the output gear 362 are each rotatable about the rotational axis 36C.

The input gear 361 includes a gear portion (teeth portion) that engages with the stepped gear 62 (FIG. 13A), and the driving force of the motor M2 is input to the input gear 361. The output gear 362 includes a gear portion (teeth portion) that engages with the driving rack input gear 64L and the stepped gear 65L (FIG. 13A), and outputs the driving force toward the tray 80*k*.

The drive cancelling gear 36 is an example of a transmission unit configured to transmit the driving force of the motor M2 (drive source) to the tray 80*k* (support member). The input gear 361 is an example of an input portion of a transmission unit. The output gear 362 and the arm 363 are examples of an output portion of the transmission unit.

In the description below, the rotational direction of the input gear 361 in the case where the motor M2 rotates in the normal rotation direction will be referred to as a normal rotation direction R1 of the drive cancelling gear 36. The rotational direction of the input gear 361 in the case where the motor M2 rotates in the reverse rotation direction will be referred to as a reverse rotation direction R2 of the drive cancelling gear 36.

As illustrated in FIG. 29A, the input gear 361 is provided with a normal rotation abutting surface 361*a*, a reverse rotation abutting surface 361*b*, an outer peripheral surface 361*c*, and an opening 361*d*. In addition, a shaft portion 361 having a cylindrical shape is formed at the center portion of the input gear 361. As illustrated in FIG. 29B, the output gear 362 is provided with an arm pivot shaft 362*a*, a reverse rotation abutted surface 362*b*, an outer peripheral portion 362*c*, an opening 362*d*, and a spring base 362*f*. In addition, a hole 362*e* is formed at the center portion of the output gear 362.

The arm 363 is provided with a pivot center hole 363*a*, a normal rotation abutted surface 363*b*, a spring boss 363*c*, an input-side boss 363*d*, and an output-side boss 363*e*. The arm 363 is supported to be pivotable with respect to the output gear 362 as a result of the pivot center hole 363*a* engaging with the arm pivot shaft 362*a* of the output gear 362. In addition, the arm 363 receives an urging force from the urging member 364 as a result of the spring boss 363*c* engaging with one end portion of the urging member 364.

The other end portion of the urging member 364 is supported by the spring base 362*f* of the output gear 362. That is, the arm 363 receives an urging force in the counter clockwise direction in FIG. 29B from the urging member 364 with the pivot center hole 363*a* as the pivot center thereof.

In addition, the shaft portion 361 of the input gear 361 engages with the hole 362*e* of the output gear 362, and thus the input gear 361 and the output gear 362 are coupled to be rotatable about the same rotational axis 36C and relatively rotatable with each other. In the state in which the shaft portion 361*e* of the input gear 361 is engaged with the hole 362*e* of the output gear 362, the input-side boss 363*d* of the arm 363 penetrates the opening 361*d* of the input gear 361, and the output-side boss 363*e* penetrates the opening 362*d* of the output gear 362. In addition, the input gear 361 is rotatably supported as a result of the shaft portion 361 being fitted with the support shaft provided in the upper holding member 33L (FIG. 31).

Figure 30A:
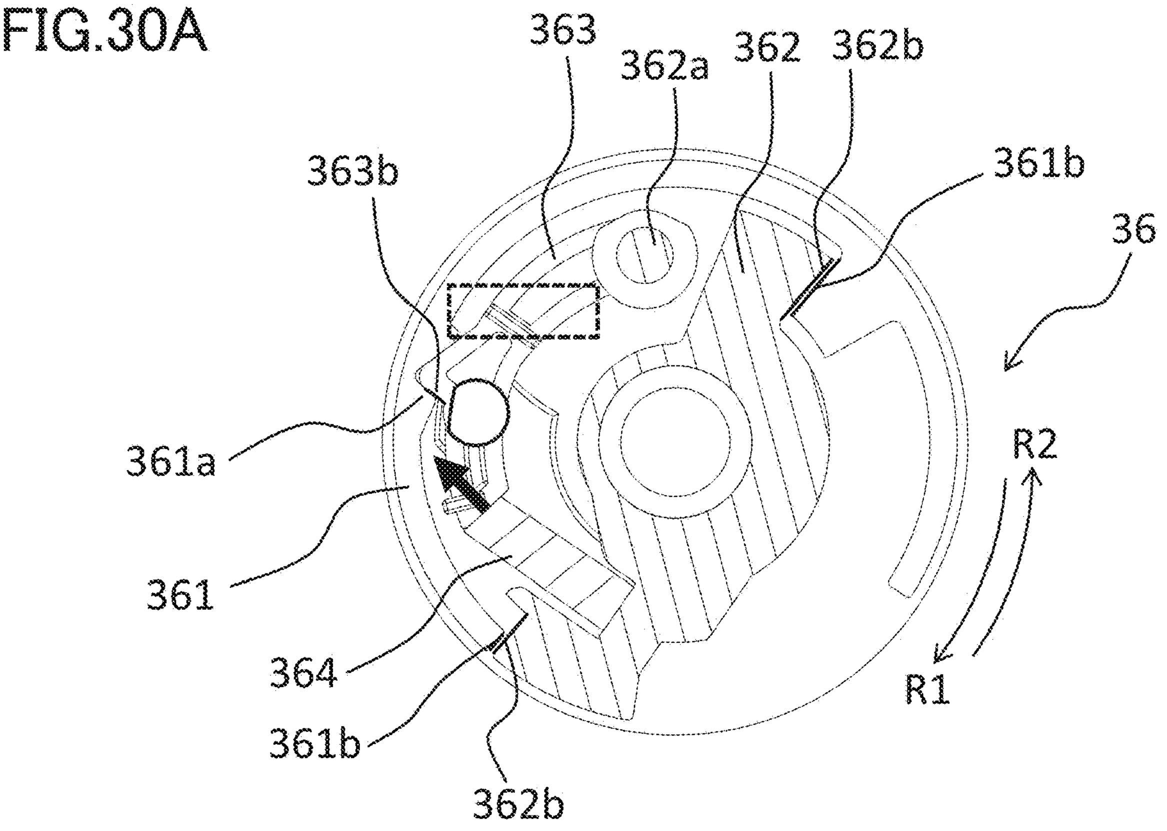
FIGS. 30A and 30B are each an explanatory diagram of a configuration of the drive cancelling gear according to the fifth embodiment.
Figure 30B:
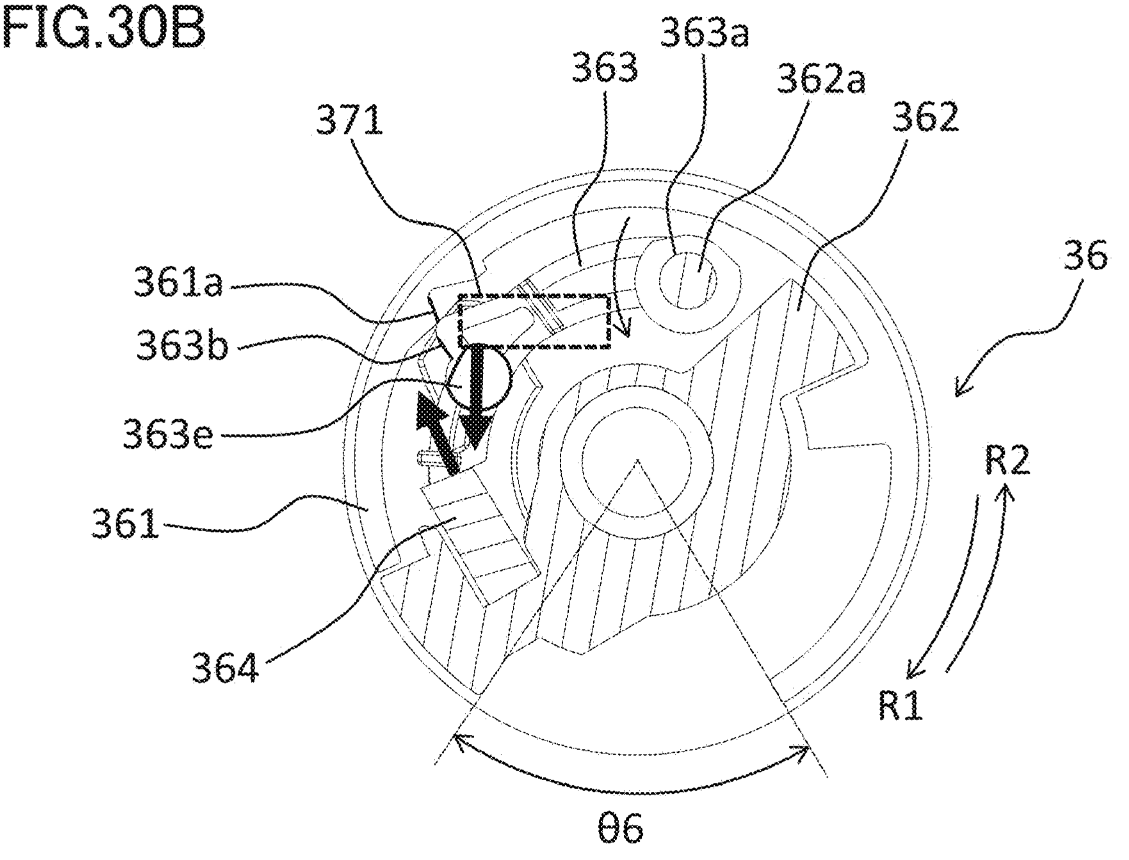

The arm 363 is capable of pivoting between an engaged posture and a disengaged posture about the arm pivot shaft 362*a* of the output gear 362. The engaged posture is a posture in which the normal rotation abutted surface 363*b* (first engaged portion) of the arm 363 is engaged with the normal rotation abutting surface 361*a* (first engaging portion) of input gear 361 (FIG. 30A). The disengaged posture is a posture in which the normal rotation abutted surface 363*b* of the arm 363 is disengaged (separated) from the normal rotation abutting surface 361*a* of input gear 361 (FIG. 30B). The urging member 364 urges the arm 363 from the disengaged posture toward the engaged posture. That is, in the present embodiment, the normal rotation abutted surface 363*b* (first engaged portion) is movable with respect to the output gear 362 (gear portion).

The opening 361*d* of the input gear 361 that the input-side boss 363*d* of the arm 363 engages with and the opening 362*d* of the output gear 362 that the output-side boss 363*e* of the arm 363 engages with are formed in a predetermined direction to allow the posture change of the arm 363. In addition, the opening 361*d* of the input gear 361 is formed along an arc centered on the rotational axis 36C. Since the opening 361*d* is formed along the arc, the input-side boss 363*d* of the arm 363 supported by the output gear 362 slides on the inside of the opening 361*d*, and thus the relative rotation between the input gear 361 and the output gear 362 is allowed.

Here, the drive cancelling gear 36 is configured such that the state of the drive transmission between the input gear 361 and the output gear 362 switches between a transmitting state and a blocking state as a result of the movement of the arm 363. The switching of the state of drive transmission of the drive cancelling gear 36 will be described with reference to FIGS. 30A and 30B.

FIG. 30A illustrates the transmitting state of the drive cancelling gear 36. In the transmitting state of the drive cancelling gear 36, the arm 363 is positioned in the engaged posture by receiving the urging force of the urging member 364. In the case where the input gear 361 is rotationally driven in the normal rotation direction R1 in the transmitting state of the drive cancelling gear 36, the normal rotation abutting surface 361*a* of the input gear 361 presses the normal rotation abutted surface 363*b* of the arm 363 in the normal rotation direction R1. The pressing force received by the arm 363 is transmitted to the output gear 362 via the arm pivot shaft 362*a*. Therefore, the output gear 362 rotates in the normal rotation direction R1 integrally with the input gear 361.

In addition, in the transmitting state of the drive cancelling gear 36, the reverse rotation abutting surface 361*b* (second engaging portion) of the input gear 361 is engaged with the reverse rotation abutted surface 362*b* (second engaged portion) of the output gear 362. Therefore, in the case where the input gear 361 is rotationally driven in the reverse rotation direction R2, the reverse rotation abutting surface 361*b* presses the reverse rotation abutted surface 362*b* in the reverse rotation direction R2. Therefore, the output gear 362 rotates in the reverse rotation direction R2 integrally with the input gear 361.

That is, when the drive cancelling gear 36 is in the transmitting state, the driving force is transmitted to the output gear 362 both in the case where a driving force in the normal rotation direction R1 is input to the input gear 361 and the case where a driving force in the reverse rotation direction R2 is input to the input gear 361.

FIG. 30B illustrates the blocking state of the drive cancelling gear 36. When the drive cancelling gear 36 rotates in the normal rotation direction R1 to a predetermined rotational angle from the state of FIG. 30A, the arm 363 abuts an abutting portion (rib 371 described below) provided separately from the drive cancelling gear 36, and is thus moved to the disengaged position. That is, the output-side boss 363*e* of the arm 363 abuts the rib 371 and receives a downward force in the drawing from the rib 371, and thus the arm 363 pivots in the counterclockwise direction in the drawing against the urging force of the urging member 364. As a result of this, the arm 363 moves from the engaged position to the disengaged position. That is, the drive cancelling gear 36 is configured to automatically switch from the transmitting state to the blocking state when rotating to the predetermined rotational angle in the normal rotation direction R1.

When the drive cancelling gear 36 is in the blocking state, the normal rotation abutting surface 361*a* of the input gear 361 is not in contact with the normal rotation abutted surface 363*b* of the arm 363. In addition, therefore, the rotation of the normal rotation direction R1 of the input gear 361 is not transmitted to the output gear 362. The input gear 361 can idle to a predetermined angle θ6 with respect to the output gear 362.

As illustrated in FIG. 31, the rib 371 serving as an abutting portion of the present embodiment is provided on a gear cover 37. The gear cover 37 is a cover member that covers at least part of the drive cancelling gear 36 as viewed in the X direction, and is fixed to the upper holding member 33L. The rib 371 (abutting portion) may be provided on a member different from the gear cover 37. For example, a configuration in which the rib 371 (abutting portion) is provided on the upper holding member 33L may be employed. In addition, a configuration in which the rib 371 (abutting portion) abuts the input-side boss 363*d* instead of the output-side boss 363*e* of the arm 363 may be employed.

As described above, the drive cancelling gear 36 is switched between the transmitting state and the blocking state as a result of the arm 363 changing the posture thereof between the engaged posture and the disengaged posture.

In the description below, the push-in detection mechanism of the tray 80*k* using the drive cancelling gear 36 will be described in accordance with the flow of operation after the tray pull-out operation is performed on the tray 80*k* and until the tray pull-in operation is automatically performed in response to the user pushing in the tray 80*k*. To be noted, the operation for the trays 80*y* to 80*k* are substantially the same as the operation for the tray 80*k*, and therefore the description thereof will be omitted.

FIGS. 32A to 32E are each a diagram for describing the push-in mechanism of the tray 80*k*. Each diagram on the right side of FIGS. 32A to 32E indicates the position of the tray 80*k*. Each diagram on the left side of FIGS. 32A to 32E is a diagram illustrating the state of the drive cancelling gear 36 and the tray pull-out sensor 135 corresponding to the diagram on the right side.

As illustrated in FIGS. 32A to 32E, the tray pull-out sensor 135 is disposed so as to be capable of coming into contact with an outer peripheral surface 361*c* of the input gear 361 and an outer peripheral portion 362*c* of the output gear 362. The tray pull-out sensor 135 is configured such that the detection signal thereof switches between a state in which the tray pull-out sensor 135 is in contact with the outer peripheral surface 361*c* of the input gear 361 or the outer peripheral portion 362*c* of the output gear 362 and a state in which the tray pull-out sensor 135 is in contact with neither of the outer peripheral surface 361*c* and the outer peripheral portion 362*c*.

Figure 32A:
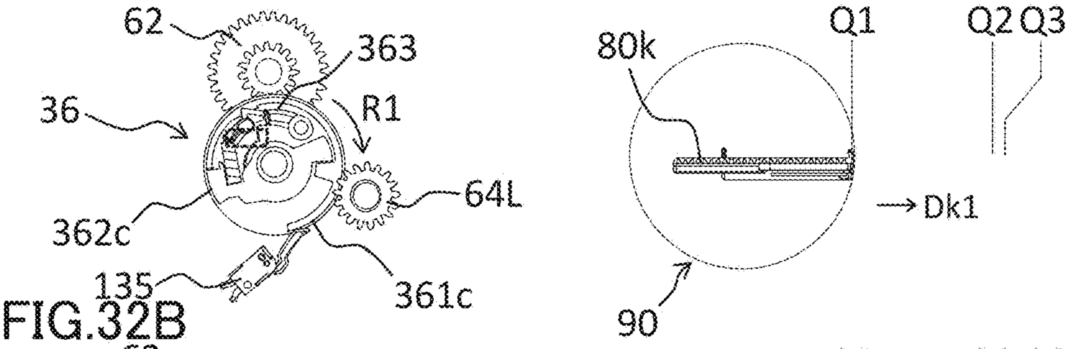
FIGS. 32A to 32E are each an explanatory diagram of elements related to push-in detection of the tray according to the fifth embodiment.

FIG. 32A illustrates a state of the drive cancelling gear 36 and the tray pull-out sensor 135 when the tray 80*k* is at the accommodation position Q1. The tray pull-out sensor 135 is in contact with the outer peripheral surface 361*c* of the input gear 361 when the tray 80*k* is at the accommodation position Q1. In addition, the drive cancelling gear 36 is in the transmitting state.

When the user instructs the tray pull-out operation by operating a button of the operation panel or the like, the controller 30 rotates the motor M2 in the normal rotation direction. Then, the driving force of the motor M2 is transmitted to the tray 80*k*, and thus the tray 80*k* moves in the pull-in direction Dk1. At this time, the input gear 361 of the drive cancelling gear 36 receives the driving force from the motor M2 and rotates in the normal rotation direction R1. In addition, the rotation of the input gear 361 is transmitted to the output gear 362 via the arm 363 positioned at the engaged position, and thus the output gear 362 also rotates in the normal rotation direction R1.

Figure 32B:
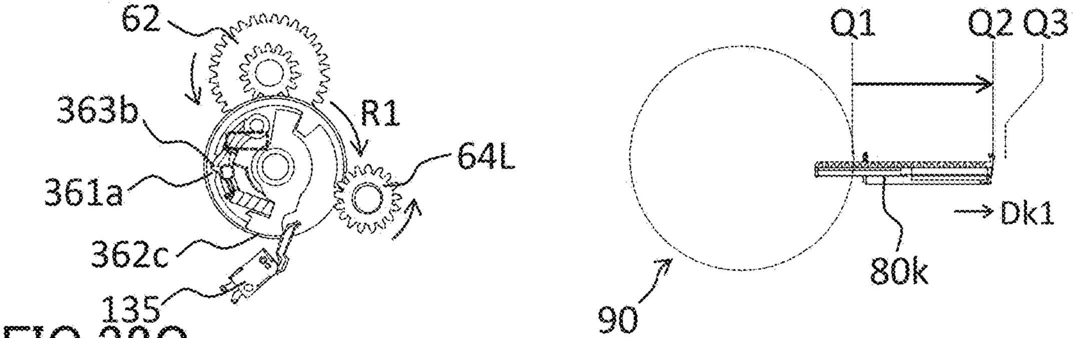

FIG. 32B illustrates the state of the drive cancelling gear 36 and the tray pull-out sensor 135 when the tray 80*k* has been pulled out to the predetermined position Q2 between the accommodation position and the detachment position. When the tray 80*k* reaches the predetermined position Q2, a state in which the tray pull-out sensor 135 opposes the outer peripheral portion 362*c* of the output gear 362 is switched to a state in which the tray pull-out sensor 135 opposes neither of the outer peripheral surface 361*c* of the input gear 361 and the outer peripheral portion 362*c* of the output gear 362. The controller 30 detects that the tray 80*k* has reached the predetermined position Q2, on the basis of the change in the detection signal of the tray pull-out sensor 135.

Figure 32C:
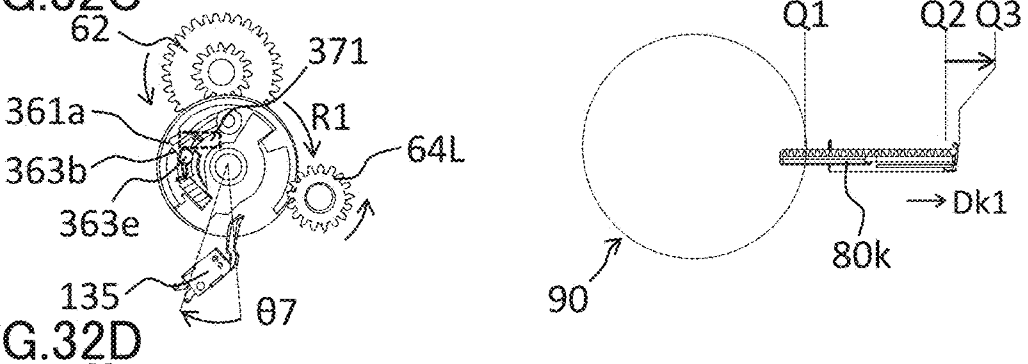

The controller 30 stops the motor M2 after continuing the normal rotation of the motor M2 for a predetermined time after the tray 80*k* has reached the predetermined position Q2. As a result of this, the tray 80*k* moves to the detachment position Q3 as illustrated in FIG. 32C. At this time, since the arm 363 is at the engaged position until immediately before the arrival of the tray 80*k* at the detachment position Q3, the input gear 361 rotates in the normal rotation direction R1 together with the output gear 362.

FIG. 32C illustrates a state of the drive cancelling gear 36 and the tray pull-out sensor 135 when the tray 80*k* has been pulled out to the detachment position Q3. The input gear 361 (and output gear 362) are rotated by an angle θ7 while the tray 80*k* moves from the predetermined position Q2 to the detachment position Q3. In addition, the output-side boss 363*e* of the arm 363 abuts the rib 371 provided on the gear cover 37 approximately at the same time as the arrival of the tray 80*k* at the detachment position Q3. The arm 363 receives force from the rib 371, and thus moves from the engaged position to the disengaged position. That is, the drive cancelling gear 36 takes the blocking state, and thus the drive transmission from the input gear 361 to the output gear 362 is cancelled. In other words, after the tray 80*k* (support member) has moved from the accommodation position (first position) to the detachment position (second position), the motor M2 (drive source) further rotates in the normal rotation direction (first direction), and thus the engagement between the normal rotation abutting surface 361*a* (first engaging portion) and the normal rotation abutted surface 363*b* (first engaged portion) is cancelled. Therefore, the rotation of the output gear 362 is stopped, and the tray 80*k* stops at the detachment position Q3.

After the tray 80*k* has been pulled out to the detachment position Q3, the controller 30 continues rotating the motor M2 in the normal rotation direction for a predetermined time, and then stops the motor M2. As a result of this, as illustrated in FIG. 25D, the input gear 361 rotates by an angle θ8 in the normal rotation direction in a state in which the output gear 362 and the tray 80*k* are still stopped.

Figure 32D:
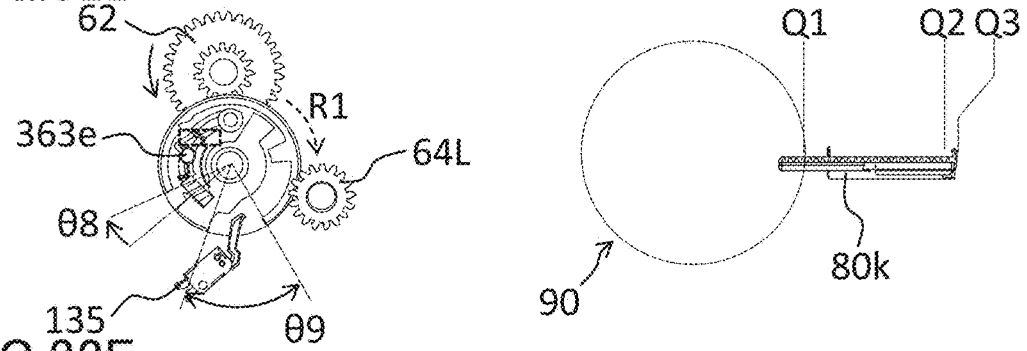

FIG. 32D illustrates a state of the drive cancelling gear 36 and the tray pull-out sensor 135 when the controller 30 has stopped the driving of the motor M2 and the tray pull-out operation is completed. At this time, the arm 363 is at the disengaged position. That is, the drive cancelling gear 36 is in the blocking state. In addition, the output gear 362 has an idling space of an angle θ9 (=θ6-θ8) with respect to the input gear 361. That is, when the tray pull-out operation is completed, the output gear 362 is in a state in which the output gear 362 is capable of idling by the angle θ9 in the reverse rotation direction R2 with respect to the input gear 361.

Figure 32E:
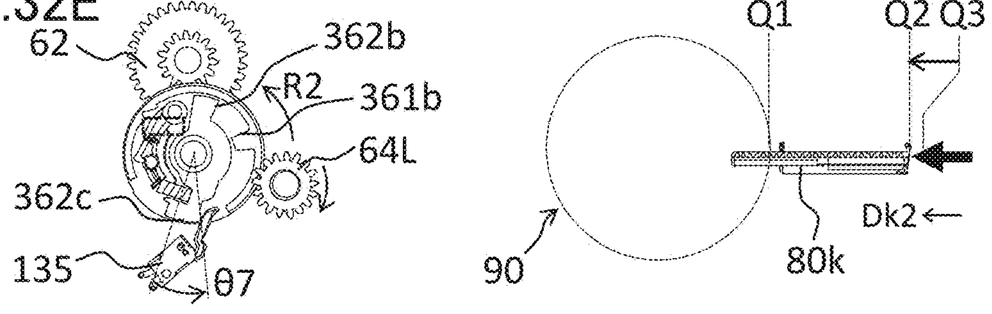

Here, as illustrated in FIG. 32E, a case where the user has pushed in the tray 80*k* in the pull-in direction Dk2 will be considered. In this case, the push-in force by which the user pushes in the tray 80*k* is transmitted to the output gear 362 in a reverse direction through the drive transmission path from the motor M2 to the tray 80*k*. As a result, the output gear 362 rotates in the reverse rotation direction R2.

As described above, in a state in which the tray pull-out operation has been completed, the output gear 362 can idle by the angle θ9 in the reverse rotation direction R2 with respect to the input gear 361. That is, the input gear 361 and the drive transmission elements upstream thereof (on the motor M2 side) do not move in an interlocked manner with the push-in of the tray 80*k*. In other words, the drive transmission path from the tray 80*k* to the motor M2 is blocked by the drive cancelling gear 36. Therefore, the user can push in the tray 80*k* by a low push-in force.

FIG. 32E illustrates a state of the drive cancelling gear 36 and the tray pull-out sensor 135 when the tray 80*k* has been pushed in to the predetermined position Q2 by the user. When the tray 80*k* is pushed in to the predetermined position Q2, the tray pull-out sensor 135 comes into contact with the outer peripheral portion 362*c* of the output gear 362. The controller 30 detects that the tray 80*k* has been pushed in to the predetermined position Q2, on the basis of the change in the detection signal of the tray pull-out sensor 135.

Here, the output gear 362 rotates by the angle θ7 in the reverse rotation direction while the tray 80*k* moves from the detachment position Q3 to the predetermined position Q2. This angle is equal to the rotational angle of the input gear 361 with respect to the output gear 362 while the tray 80*k* is moved from the predetermined position Q2 to the detachment position Q3 in the tray pull-out operation (FIG. 32B to FIG. 32C). The angle θ7 is preferably smaller than the angle θ9 (θ7<θ9). As a result of this, the user can push in the tray 80*k* by a low push-in force at least until the tray 80*k* reaches the predetermined position Q2.

When the push-in of the tray 80*k* is detected, the controller 30 rotates the motor M2 in the reverse rotation direction, and starts the tray pull-in operation. Then, the input gear 361 rotates in the reverse rotation direction R2 (FIG. 32E), and the reverse rotation abutting surface 361*b* of the input gear 361 abuts the reverse rotation abutted surface 362*b* of the output gear 362. As a result of this, the output gear 362 starts rotating in the reverse rotation direction R2 together with the input gear 361. As a result of the output gear 362 rotating in the reverse rotation direction R2, the output-side boss 363*e* of the arm 363 is separated from the rib 371, and the arm 363 moves from the disengaged position to the engaged position. Then, when it is detected that the tray 80*k* has reached the accommodation position Q1 on the basis of the detection result of the tray pull-in sensor 134 (FIG. 22A), the controller 30 stops the motor M2, and completes the tray pull-in operation.

As described above, the controller 30 is configured to automatically execute the tray pull-in operation in the case where it is detected that the tray 80*k* has been pushed in from the detachment position Q3 to the predetermined position Q2. As a result of this, more intuitive operation can be performed, and thus the operability can be improved.

In addition, in the present embodiment, the drive cancelling gear 36 is provided in the drive transmission mechanism 101 that transmits the driving force from the motor M2 to the tray 80*k*, and the drive cancelling gear 36 is configured to be in the blocking state when the user pushes in the tray 80*k* in the pull-in direction Dk2. As a result of this, the user can push in the tray 80*k* from the detachment position Q3 to the predetermined position Q2 by a low push-in force, and the operability can be further improved.

Sixth Embodiment

A sixth embodiment will be described with reference to FIG. 34. In the first to fifth embodiments, a configuration in which the rotary body 90 includes four developing units 50*y* to 50*k* and a color image can be formed by using toners of four colors has been described. In the present embodiment, a configuration in which a monochromatic image can be formed by using toner of one color will be described. In the description below, it is assumed that elements denoted by the same reference signs as in the first to fifth embodiments have substantially the same configurations and functions as those described in the first to fifth embodiments unless otherwise described, and parts different from the first to fifth embodiments will be mainly described.

Figure 34:
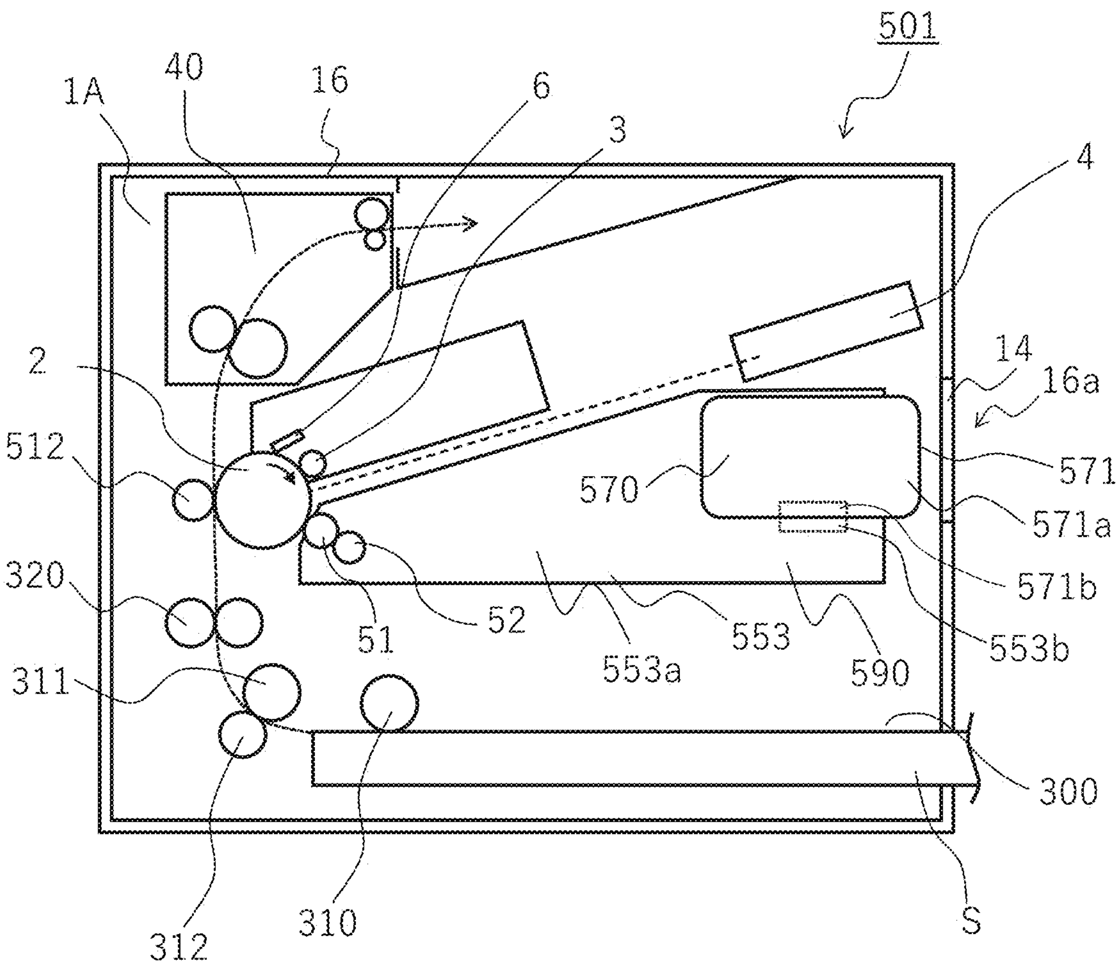
FIG. 34 is a schematic view of an image forming apparatus according to a sixth embodiment.

As illustrated in FIG. 34, an image forming apparatus 501 includes a toner cartridge 570 attachable to and detachable from the apparatus body 1A. In addition, the apparatus body 1A includes a developing device (developing unit) 590.

The developing device 590 is an example of a developing means or a developing portion that develops (visualizes) an electrostatic latent image formed on the photosensitive drum 2 into a toner image by using toner. The developing device 590 of the present embodiment develops the electrostatic latent image formed on the photosensitive drum 2 by using black toner.

The developing device 590 includes a developing roller 51, a supply roller 52, and a developing blade. The toner cartridge 570 is attached to the developing device 590. The toner cartridge 570 stores therein black toner to be supplied to the developing device 590.

The toner cartridge 570 includes a toner frame 571. The toner frame 571 includes a toner storage portion 571*a* that stores toner, and a discharge opening 571*b* communicating with the toner storage portion 571*a*.

The developing device 590 includes a developing frame (storage frame) 553 including a developing-side storage portion 553*a* that stores toner. In addition, the developing frame 553 has an inlet opening 553*b* communicating with the developing-side storage portion (toner supply chamber) 553*a*.

The toner cartridge 570 is attachable to and detachable from the developing device 590 through the opening 16*a* provided in the frame 16 of the apparatus body 1A. More specifically, the toner cartridge 570 is movable to an attached position and a retracted position where the toner cartridge 570 is retracted from the attached position, through the opening 16*a* with respect to the developing frame 553. In a state in which the toner cartridge 570 is at the attached position with respect to the developing frame 553, the discharge opening 571*b* faces the inlet opening 553*b*. That is, the toner storage portion 571*a* of the toner cartridge 570 and the developing-side storage portion 553*a* of the developing device 590 communicate with each other via the discharge opening 571*b* and the inlet opening 553*b*. When toner is supplied from the toner cartridge 570 to the developing device 590, at least part of the inlet opening 553*b* is positioned below at least part of the discharge opening 571*b*.

Then, toner stored in the toner storage portion 571*a* is discharged through the discharge opening 571*b*, and the toner discharged through the discharge opening 571*b* is stored in the developing-side storage portion 553*a* through the inlet opening 553*b*. The toner stored in the developing-side storage portion 553*a* is supplied to the developing roller 51 by the supply roller 52. To be noted, the developing-side storage portion 553*a* may include a toner conveyance member that conveys toner toward the supply roller 52.

The function of the toner cartridge 570 is substantially the same as the functions of the toner cartridge 70 of the first to fifth embodiments. In addition, the function of the developing device 590 is substantially the same as the function of one of the developing units 50*y*, 50*m*, 50*c*, and 50*k* of the first to fifth embodiments.

Meanwhile, the apparatus body 1A includes a transfer roller 512. The transfer roller 512 is an example of a transfer means or a transfer unit that transfers an image from the photosensitive drum 2 onto the sheet S. A conveyance roller pair 320 conveys the sheet S to a transfer portion that is a nip portion between the photosensitive drum 2 and the transfer roller 512. The image on the photosensitive drum 2 is transferred onto the surface of the sheet S that has been conveyed thereto.

The apparatus body 1A includes a moving device configured to move the toner cartridge 570 from the attached position to the retracted position with respect to the developing device 590, more specifically with respect to the developing frame 553 of the developing device 590. As this moving device, a moving device described in the first to fifth embodiments and modification examples thereof can be used. For example, a moving device including the driving system 100 including the motor M2 and the drive transmission mechanism 101 of the first embodiment that transmits the driving force of the motor M2 to the tray 80 (moving member, support member), and the tray 80 can be used.

In this case, among the moving devices of the first to fifth embodiments, part provided in the rotary body 90 may be provided in the developing device 590. In addition, the replacement posture and the developing posture of the developing device 590 may be the same or different. For example, the developing device 590 may be movable to a contact position where the developing roller 51 is in contact with the photosensitive drum 2 and a separation position where the developing roller 51 is separated from the photosensitive drum 2, and the developing device 590 may be at the separation position in a state in which the developing device 590 is in the replacement posture.

For example, the developing device 590 may have the tray 80 and a configuration for moving the tray 80. As the configuration for moving the tray 80, those described in the first to fifth embodiments and modification examples thereof can be used. In addition, the developing device 590 may include the rotary member 494*a* and the driven roller 494*b* that have been described in the modification example of the first embodiment.

Also in the present embodiment, when the toner cartridge 570 is at the retracted position, at least part of the toner cartridge 570 is preferably outside the apparatus of the image forming apparatus 501 (outside the apparatus body 1A). That is, when the toner cartridge 570 is at the retracted position, at least part of the toner cartridge 570 is positioned more outward than the exterior position with respect to the apparatus body 1A when the toner cartridge 570 is at the retracted position. In other words, at least part of the toner cartridge 570 is positioned in a space outside the apparatus body 1A in the case where the door 14 is at the closed position. Further, at least part of the toner cartridge 570 is positioned downstream of the exterior position in the retraction direction of the toner cartridge 570.

In addition, in the case where the side surface 16*b* having the opening 16*a* is the front surface of the apparatus body 1A, it can be said at least part of the toner cartridge 570 projects to the front side more than the exterior surface on the front side of the apparatus body 1A when the toner cartridge 570 is at the retracted position.

Also in the present embodiment, when the toner cartridge 570 is at the retracted position, half the length or more of the toner cartridge 570 in the retraction direction is preferably outside the apparatus.

As described above, although the toner cartridges 70 are detachably attached to the rotary body 90 in the first to fifth embodiments and modification examples thereof, the toner cartridge 570 is detachably attached to the developing device 590 in the present embodiment.

OTHER EMBODIMENTS

In addition, in the first to fifth embodiments described above, a configuration in which the rotary body 90 includes the four developing units 50*y* to 50*k* and a color image can be formed by using toners of four colors has been described. However, the number of developing units that the rotary body 90 includes may be three or less or five or more. In these cases, the number and arrangement of the trays and toner cartridges can be appropriately changed in accordance with the number of developing units. For example, in the first to fourth embodiments described above, a configuration in which the four toner cartridges 70*y* to 70*k* are attachable to and detachable from the rotary body 90 has been described as an example. However, a configuration in which the rotary body 90 includes only one developing unit 50*k* and only one toner cartridge 70*k* is attached to the rotary body 90 may be employed. In this case, the rotary body 90 can rotate in a clockwise direction in FIG. 1 about the rotational axis 90C to alternately take the black replacement posture and the black developing posture.

In addition, in the first to fifth embodiments described above, a configuration in which the rotary body 90 includes the four developing units 50*y* to 50*k* and a color image can be formed by using toners of four colors has been described. However, the rotary body 90 may include a plurality of developing units capable of executing image formation by using toner of the same color. For example, a configuration in which the rotary body 90 includes four black developing units 50*k* and four toner cartridges 70*k* are attached to the rotary body 90 may be employed.

The driving device 98 is capable of executing a first operation of driving the moving device 85 (85') such that the moving device 85 (85') moves the toner cartridge 70 from the attached position toward the retracted position. The driving device 98 is capable of executing a second operation of driving the moving device 85 (85') such that the moving device 85 (85') moves the toner cartridge 70 from the retracted position toward the attached position. In the first to fifth embodiments and modification examples thereof described above, the first operation is an operation in which the motor M2 of the driving device 98 outputs the driving force in the normal rotation direction, and the second operation is an operation in which the motor M2 of the driving device 98 outputs the driving force in the reverse rotation direction. In other words, the first operation is performed in the case where the motor M2 outputs the driving force in the normal rotation direction, and the second operation is performed in the case where the motor M2 outputs the driving force in the reverse rotation direction.

However, a state in which the driving device 98 performs the first operation and a state in which the driving device 98 performs the second operation may be switched as a result of the state of the transmission device of the driving device 98 changing while the motor M2 outputs the driving force in one direction. For example, the state in which the driving device 98 performs the first operation and the state in which the driving device 98 performs the second operation may be switched as a result of the transmission device changing the transmission path of the driving force. In this case, switching of the state of the transmission device is performed instead of the switching of the driving of the motor M2 between the normal rotation direction and the reverse rotation direction described above in the first to fifth embodiments and modification examples thereof. As a result, each operation performed by the driving of the motor M2 in the normal rotation direction and the reverse rotation direction described in the first to fifth embodiments and modification examples thereof is performed in a similar manner.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-214293, filed on Dec. 19, 2023, which is hereby incorporated by reference herein in its entirety.

What is claimed is:

1. An image forming apparatus comprising:

an apparatus body;

a support member to which a cartridge is detachably attached, the support member being movable to a first position in which the cartridge is positioned inside the apparatus body and a second position in which the cartridge is positioned outside the apparatus body;

a sensor configured to output a signal and configured such that the signal changes when the support member on which the cartridge is supported is moved from the second position toward the first position;

a drive source configured to move the support member;

a controller configured to cause the drive source to move the support member toward the first position when the support member at the second position is moved toward the first position without the drive source and the signal changes; and a transmission unit configured to transmit a driving force of the drive source to the support member, wherein after the support member is moved from the first position to the second position, the transmission unit is configured to transition to a blocking state in which transmission of a force from the support member to the drive source is prevented.

2. The image forming apparatus according to claim 1, wherein the controller is configured to activate the drive source when the signal changes while the support member is not being moved by the drive source.

3. The image forming apparatus according to claim 1, further comprising a reduction mechanism configured to transmit rotation of an output shaft of the drive source to the transmission unit, the reduction mechanism including a first gear provided on the output shaft and a second gear that is configured to receive the driving force via the first gear and to rotate at an angular velocity slower than an angular velocity of the first gear when the drive source moves the support member toward the first position.

4. The image forming apparatus according to claim 1, wherein the transmission unit includes:

an input portion which has a first engaging portion and to which the driving force of the drive source is input, and an output portion which has a first engaged portion and which is configured to output the driving force having been input to the input portion, wherein, when the drive source rotates in a first direction, the support member is moved from the first position toward the second position in a state in which the first engaging portion is engaged with the first engaged portion, and wherein after the support member has moved from the first position to the second position, engagement between the first engaging portion and the first engaged portion is released so that the transmission unit transitions to the blocking state.

5. The image forming apparatus according to claim 4, wherein after the support member has moved from the first position to the second position, the drive source rotates in a second direction opposite to the first direction so that the engagement between the first engaging portion and the first engaged portion is released.

6. The image forming apparatus according to claim 4, wherein after the support member has moved from the first position to the second position, the drive source rotates further in the first direction so that the engagement between the first engaging portion and the first engaged portion is released.

7. The image forming apparatus according to claim 6, wherein the output portion includes a gear portion configured to transmit the driving force to the support member, and wherein the first engaged portion is movable with respect to the gear portion.

8. The image forming apparatus according to claim 4, wherein the input portion has a second engaging portion, wherein the output portion has a second engaged portion, and wherein in a case where the drive source rotates in a second direction, the support member is moved from the second position toward the first position in a state in which the second engaging portion is engaged with the second engaged portion.

9. The image forming apparatus according to claim 4, wherein the sensor is configured such that the signal changes when the support member passes a predetermined position between the first position and the second position, and wherein an angle by which the output portion is relatively rotatable with respect to the input portion in a state in which the engagement between the first engaging portion and the first engaged portion is released is larger than an angle by which the output portion rotates while the support member is moved from the second position to the predetermined position.

10. The image forming apparatus according to claim 1, wherein the sensor is configured such that the signal changes in accordance with a movement of the transmission unit.

11. The image forming apparatus according to claim 10, wherein the transmission unit includes a rotary member configured to rotate about a rotation axis, and wherein the sensor is configured such that the signal changes in accordance with a rotation of the rotary member.

12. The image forming apparatus according to claim 11, wherein a rotational angle of the rotary member during movement of the support member from the first position to the second position is less than 360°.

* * * * *